United States Patent
Wiig et al.

(10) Patent No.: US 9,704,119 B2
(45) Date of Patent: *Jul. 11, 2017

(54) SYSTEM AND METHOD OF A REQUIREMENT, COMPLIANCE AND RESOURCE MANAGEMENT

(71) Applicants: Rex Wiig, Chino, CA (US); Angel Martinez, Anaheim, CA (US)

(72) Inventors: Rex Wiig, Chino, CA (US); Angel Martinez, Anaheim, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/544,314

(22) Filed: Dec. 22, 2014

(65) Prior Publication Data
US 2017/0068911 A1    Mar. 9, 2017

Related U.S. Application Data

(63) Continuation-in-part of application No. 13/815,843, filed on Mar. 15, 2013, which is a continuation-in-part of application No. 13/573,634, filed on Sep. 28, 2012, now Pat. No. 8,990,308.

(60) Provisional application No. 61/848,015, filed on Dec. 19, 2012.

(51) Int. Cl.
  *G06F 15/16* (2006.01)
  *G06Q 10/06* (2012.01)
  *G06F 17/30* (2006.01)

(52) U.S. Cl.
  CPC ..... *G06Q 10/067* (2013.01); *G06F 17/30657* (2013.01)

(58) Field of Classification Search
  CPC .................................................. H04L 29/08072
  USPC .......................................................... 709/205
  See application file for complete search history.

(56) References Cited

U.S. PATENT DOCUMENTS

| | | | |
|---|---|---|---|
| 7,509,185 B2* | 3/2009 | Popp ................... | G05B 23/0224 700/109 |
| 8,407,073 B2* | 3/2013 | Bagheri ......... | G06Q 10/063112 705/7.11 |
| 2004/0117234 A1* | 6/2004 | Lindsay-Scott .... | G06Q 10/0637 705/7.36 |
| 2009/0138860 A1* | 5/2009 | Fusegawa ................. | G06F 8/70 717/131 |
| 2010/0076835 A1* | 3/2010 | Silverman .............. | G06Q 10/06 705/14.33 |
| 2013/0035992 A1* | 2/2013 | Silverman .......... | G06Q 30/0233 705/14.1 |

* cited by examiner

*Primary Examiner* — Guang Li

(57) ABSTRACT

A system and/or a method based on a scalable requirement, compliance and resource management methodology for designing a product/service, optimizing relevant processes and enhancing real time and/or near real time collaboration between many users is disclosed. The requirement, compliance and resource management methodology is further integrated with a fuzzy/neuro-fuzzy logic algorithm module and/or statistical algorithm module and/or weighting logic algorithm module and enhanced with a graphical user interface.

25 Claims, 116 Drawing Sheets

REQUIREMENT COUNT PER EVENT NUMBER

100D

| Event Number Title | Number of Requirements | | | | | | | | | |
|---|---|---|---|---|---|---|---|---|---|---|
| | Analysis | | Inspection | | Demo | | Test | | Total | |
| | Alloc Verif Status | | Alloc Verif Status | | Alloc Verif Status | | Alloc Verif Status | | Alloc Verif Status | |
| 1000-00 System A Mission Countdown Test | 6 | 2 | 33.3% | 3 | 0 | 0.0% | 0 | 0.0% | 0 | 1 | 0.0% | 9 | 3 | 0.0% |
| 1001-00 System A Software | 4 | 2 | 50.0% | 1 | 0 | 0.0% | 0 | 0.0% | 0 | 0 | 0.0% | 5 | 2 | 0.0% |
| 1002-00 System A End-To-End Test | 4 | 0 | 0.0% | 0 | 0 | 0.0% | 0 | 0.0% | 0 | 0 | 0.0% | 4 | 0 | 0.0% |
| 1003-00 System A Mass Properties | 3 | 0 | 0.0% | 1 | 0 | 0.0% | 1 | 0.0% | 0 | 0 | 0.0% | 5 | 0 | 0.0% |
| 1004-00 System B Functional Test | 2 | 0 | 0.0% | 2 | 0 | 0.0% | 2 | 0.0% | 0 | 0 | 0.0% | 6 | 0 | 0.0% |
| 1005-00 System B Software Qualification | 0 | 0 | 0.0% | 0 | 0 | 0.0% | 0 | 0.0% | 3 | 0 | 0.0% | 3 | 0 | 0.0% |
| 1006-00 System B Reliability | 4 | 0 | 0.0% | 0 | 0 | 0.0% | 2 | 0.0% | 0 | 0 | 0.0% | 6 | 0 | 0.0% |
| 1007-00 System B Mass Properties | 2 | 0 | 0.0% | 2 | 0 | 0.0% | 0 | 0.0% | 0 | 0 | 0.0% | 4 | 0 | 0.0% |
| 1008-00 System B Thermal Test | 2 | 0 | 0.0% | 2 | 0 | 0.0% | 0 | 0.0% | 0 | 0 | 0.0% | 4 | 0 | 0.0% |

FIG. 5B1

REQUIREMENT COUNT PER EVENT NUMBER
100D

Number of Requirements

| Event Number Title | Analysis | | Inspection | | Demo | | Test | | Total | |
|---|---|---|---|---|---|---|---|---|---|---|
| | Alloc Verif Status | | Alloc Verif Status | | Alloc Verif Status | | Alloc Verif Status | | Alloc Verif Status | |
| 1009-00 System B Design and Construction | 2 | 0.0% | 2 | 0.0% | 1 | 0.0% | 0 | 0.0% | 5 | 0.0% |
| 1010-00 System C Power Up Test | 3 | 0.0% | 1 | 0.0% | 0 | 0.0% | 0 | 0.0% | 4 | 0.0% |
| 1011-00 System C Data Transmission | 1 | 0.0% | 0 | 0.0% | 2 | 0.0% | 2 | 0.0% | 5 | 0.0% |
| 1012-00 System C Mass Properties | 0 | 0.0% | 0 | 0.0% | 2 | 0.0% | 2 | 0.0% | 4 | 0.0% |
| 1013-00 System C Reliability | 3 | 0.0% | 0 | 0.0% | 1 | 0.0% | 0 | 0.0% | 4 | 0.0% |
| 1014-00 System C Thermal | 2 | 0.0% | 2 | 0.0% | 0 | 0.0% | 0 | 0.0% | 4 | 0.0% |
| 1015-00 System C Design and Construction | 1 | 0.0% | 0 | 0.0% | 1 | 0.0% | 3 | 0.0% | 5 | 0.0% |
| Total | 39 | 10.3% | 16 | 0.0% | 12 | 0.0% | 10 | 0.0% | 77 | 0.0% |
| | 4 | | 0 | | 0 | | 1 | | 5 | |

FIG. 5B2

VERIFICATION STATUS BY SPECIFICATION
100D

| Specification Number/ Name | Analysis | | Inspection | | Demo | | Test | | Total | |
|---|---|---|---|---|---|---|---|---|---|---|
| | Alloc Verif Status | | Alloc Verif Status | | Alloc Verif Status | | Alloc Verif Status | | Alloc Verif Status | |
| 1. A- Spec | 8 | 1 | 12.5% | 7 | 1 | 14.3% | 10 | 0 | 0.0% | 30 | 2 | 6.7% | 55 | 4 | 7.3% |
| 2. B-1 Spec | 10 | 3 | 30.0% | 5 | 0 | 0.0% | 0 | 0 | 0.0% | 0 | 0 | 0.0% | 17 | 3 | 17.6% |
| 3. B-2 Spec | 0 | 0 | 0.0% | 0 | 0 | 0.0% | 0 | 0 | 0.0% | 0 | 0 | 0.0% | 0 | 0 | 0.0% |
| 4. ICD 123 | 0 | 0 | 0.0% | 0 | 0 | 0.0% | 2 | 0 | 0.0% | 0 | 0 | 0.0% | 0 | 0 | 0.0% |
| Total | 18 | 4 | 22.2% | 12 | 1 | 8.3% | 12 | 0 | 0.0% | 30 | 2 | 6.7% | 72 | 7 | 9.7% |

Number of Requirements

FIG. 5C1

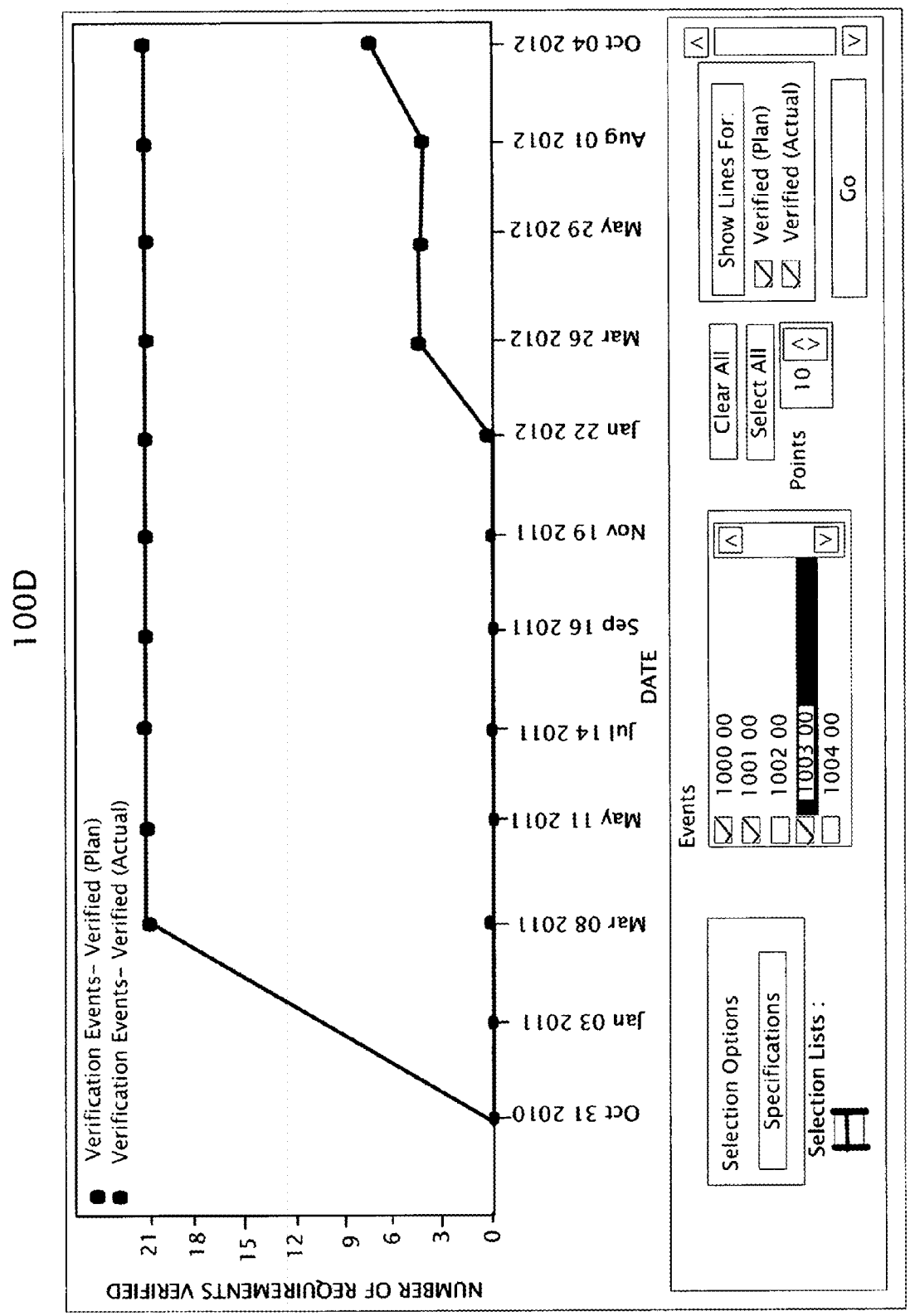
FIG. 5C2

Link Verification Event summary Sheet to Requirements

Specifications: [1) A-Spec]

Select a Requirement

Record [1 of 56]
Requirement: A-001
DOORS ID:
Name: System A Built In Test
Description: System A shall perform self test/BIT Record [2 of 56]
Requirement: A-002
DOORS ID:
Name: System A BIT Duration
Description: BIT Duration (per activation) for System A tests shall be no greater than <D1/Ti> seconds.

Record [2 of 56]
Requirement: A-003
DOORS ID:
Name: System A BIT Timeline
Description: System A shall provide the capability to perform BIT during the prelaunch timeline to verify that the payload is operational prior to launch ....

Update   Refresh   Close

FIG. 5E2

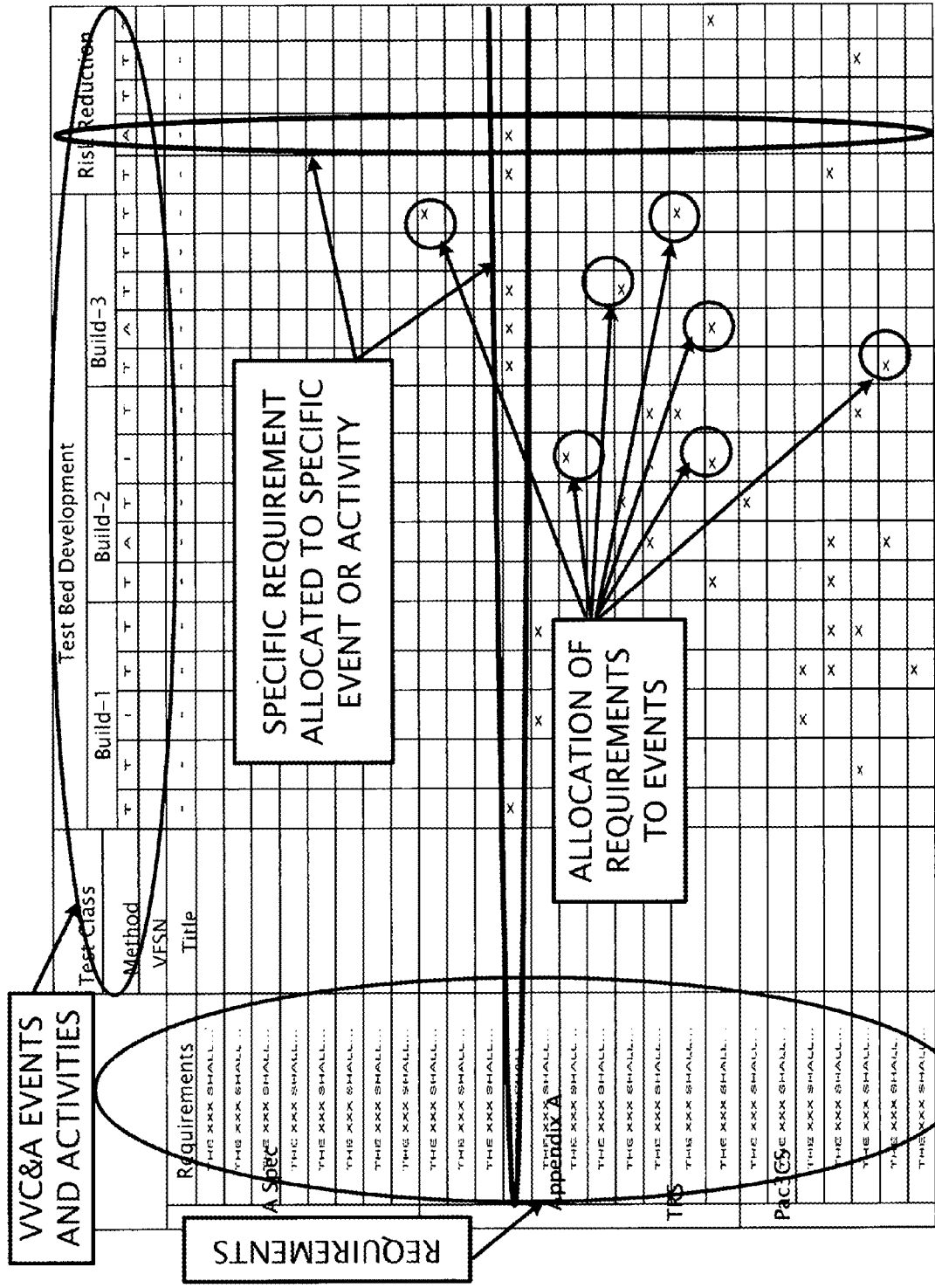
FIG. 5F1

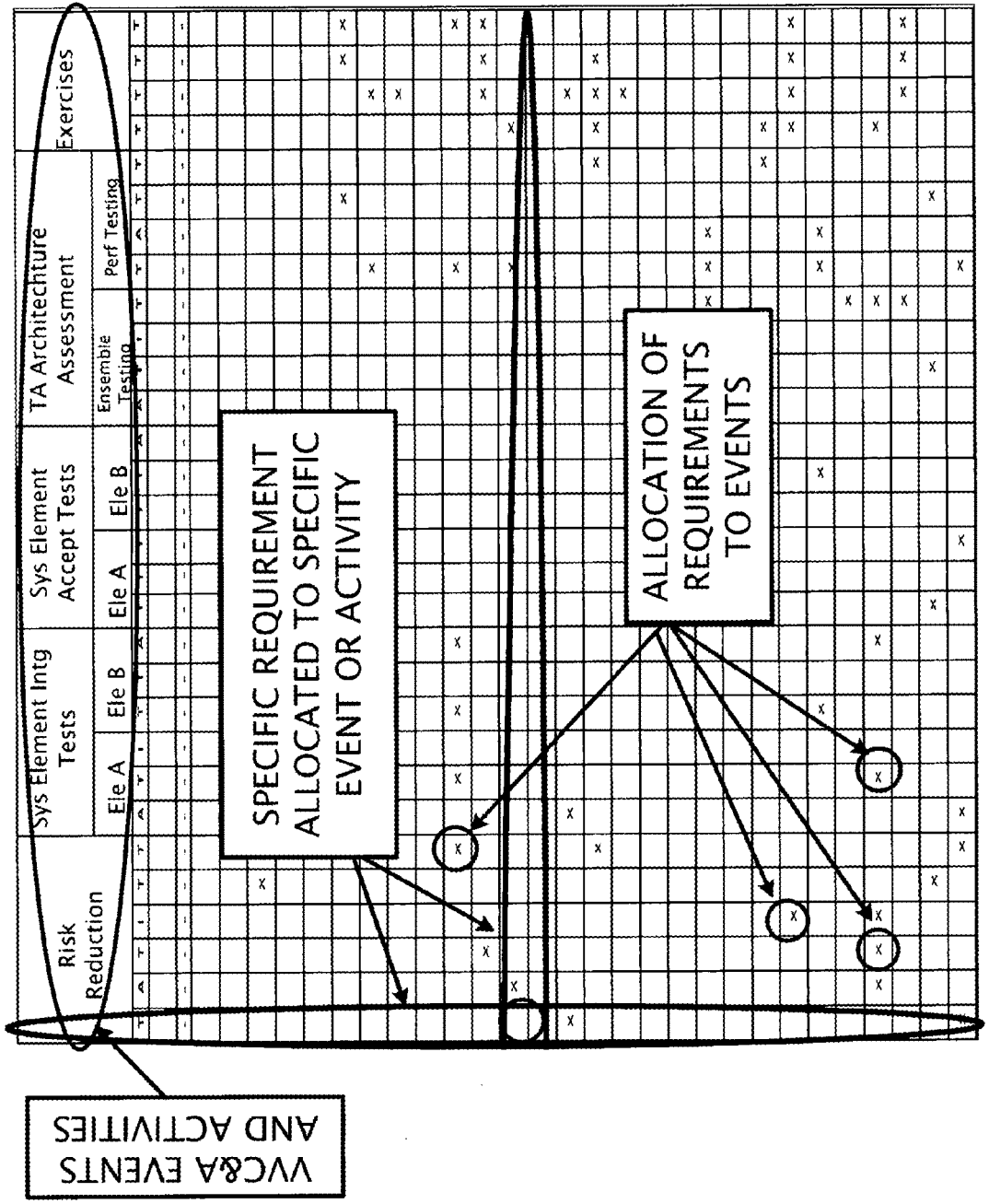
FIG. 5F2

REQUIREMENT, COMPLIANCE AND RESOURCE MANAGEMENT METHODOLOGY 100

| FEATURES | BENEFITS |
|---|---|
| SPECIFICATION CREATION AND REQUIREMENTS MANAGEMENT. | PROVIDES SINGLE, CONFIGURATION CONTROLLED TRUE RELATIONAL DATABASE TO MANAGE SPECIFICATIONS AND REQUIREMENTS. |
| PARENT/CHILD, SOURCE LIFE CYCLE TRACEABILITY. | ALLOWS FOR QUICK AND EASY IMPACT ASSESSMENT IN THE EVENT OF REQUIREMENT CHANGES. |
| EMAIL NOTIFICATION FOR REQUIREMENT CHANGES. | FASTER RESPONSE TIME FOR PROGRAM CHANGE ASSESSMENT AND IMPLEMENTATION. |
| CUSTOMIZABLE, FILTERABLE REQUIREMENT CATEGORIES. | ALLOWS FOR QUICK AND EASY REQUIREMENTS FILTERING/SORTING FOR ITEMS OF INTEREST. |
| KEYWORD SEARCH CAPABILITY. | ALLOWS FOR QUICK ACCESS TO REQUIREMENTS AND ITEMS OF INTEREST. SEARCHES ENTIRE DATABASE WITH SINGLE QUERY. |
| EMBEDDED CONFIGURATION MANAGEMENT. | ENSURES REQUIREMENTS BASELINE IS UNDER STRICT CONFIGURATION CONTROL. MAINTAINS DETAILED HISTORY OF ALL CHANGES AGAINST SPECIFIC REQUIREMENT ATTRIBUTES. |

REQUIREMENT, COMPLIANCE AND RESOURCE MANAGEMENT METHODOLOGY 100

| | FEATURES | BENEFITS |
|---|---|---|
| 100A | SPECIFICATION AUTHOR "BOOK BOSS" ASSIGNMENTS. | PROVIDES ABILITY TO ASSIGN PERSONNEL WITH READ/WRITE ACCESS TO SPECIFICATIONS AND REQUIREMENTS. |
| 100B | IMPORT LEGAL/REGULARITY REQUIREMENTS (i.e., HIPPA). | SINGLE SOURCE FOR LEGAL/REGULATORY REQUIREMENT IN A TRUE RELATIONAL DATABASE. |
| 100C | IMPORT CUSTOMER REQUIREMENTS FROM MS WORD/MS EXCEL/PDF INTO DATABASE. | SEAMLESS IMPORT ALLOWS USERS TO CONSOLIDATE REQUIREMENTS INTO SINGLE, TRUE RELATIONAL DATABASE. |
| | INCORPORATES NON-TEXTUAL OBJECTS AND IMAGES INTO DATABASE. | ALLOWS NON-TEXTUAL OBJECTS TO BE ASSOCIATED WITH REQUIREMENTS OBJECTS. |
| 100D | TPM, RISK, CRITICAL ISSUE TRACKING AND CONTROL. | INSIGHTFUL REPORTING CAPABILITY PROVIDES VISIBILITY TO CRITICAL ISSUES AND UNRESOLVED ACTIONS, ENABLING EFFICIENT RESOURCE ALLOCATION. |
| | OVERALL PROJECT COMPLETION STATUS. | SIMPLE DASHBOARD METRICS WHICH PROVIDE COMPLETION STATUS AT ALL LEVELS OF INTEGRATION UP TO FINAL END-ITEM DELIVERY. |

FIG. 6B

REQUIREMENT, COMPLIANCE AND RESOURCE MANAGEMENT METHODOLOGY 100

| | FEATURES | BENEFITS |
|---|---|---|
| 100D | OPEN ACTION STATUS. | QUICK AND EASY ACCESS TO PROGRAM ACTION ITEMS AND COMPLETION STATUS. |
| | PROGRAM USAGE STATISTICS. | REAL-TIME METRICS WHICH DISPLAY IRIS USER STATISTICS SUCH AS USER FREQUENCY AND DURATION. |
| | HARDWARE/SOFTWARE RESOURCE MANAGEMENT. | ALLOWS FOR QUICK AND EASY RESERVATION OF HARDWARE/SOFTWARE COMPONENTS NEEDED TO PERFORM VERIFICATION ACTIVITIES IN SPECIFIC FACILITIES/LOCATIONS. FLAGS USER IF A HARDWARE/SOFTWARE SCHEDULING CONFLICT EXISTS. PROVIDES RESOURCE TIME AND COST FOR EACH EVENT. |
| 100E | PERSONNEL RESOURCE MANAGEMENT. | ALLOWS FOR QUICK AND EASY RESERVATION OF PERSONNEL AND SUBJECT MATTER EXPERTS NEEDED TO PERFORM VERIFICATION ACTIVITIES IN SPECIFIC FACILITIES/LOCATIONS. FLAGS USER IF A PERSONNEL SCHEDULING CONFLICT EXISTS. PROVIDES RESOURCE TIME AND COST FOR EACH EVENT. |

FIG. 6C

REQUIREMENT, COMPLIANCE AND RESOURCE MANAGEMENT METHODOLOGY 100

| | FEATURES | BENEFITS |
|---|---|---|
| 100F | ALLOCATION OF REQUIREMENTS TO VERIFICATION EVENTS. | PROVIDES REAL-TIME VISIBILITY TO VERIFICATION STRATEGIES, CONFIGURATION AND OBJECTIVES THEREBY PROVIDING PROGRAMS THE ABILITY TO LEVERAGE VERIFICATION ACTIVITIES IN SUPPORT OF AGILE ACQUISITION INITIATIVES. INSTITUTES AN ENVIRONMENT OF COLLABORATION ENSURING EARLY IDENTIFICATION OF RISKS. |
| | CUSTOMIZABLE VERIFICATION EVENT COORDINATION MATRIX. | CUSTOMIZABLE EVENT COORDINATION MATRIX (ECM) GENERATOR WHICH ALLOWS USERS TO ORGANIZE AND GROUP EVENTS BY END-ITEM DELIVERABLES AND ENGINEERING DISCIPLINES. PROVIDES ABILITY FOR USERS TO SEE IF THEY CAN MOVE REQUIREMENTS TO ANOTHER EVENT AND THE EVENT IN QUESTION MAY ALSO ELIMINATED THEREBY STREAMLINING VERIFICATION ACTIVITIES. |
| | EVENT RESOURCE MANAGEMENT. | TIGHTLY COUPLES REQUIRED VERIFICATION EVENT RESOURCES TO INTEGRATED SCHEDULES TO BETTER COORDINATE RESOURCES. |
| | EVENT CONFIGURATION CONTROL AND CHANGE HISTORY. | ENSURES VERIFICATION BASELINE IS UNDER STRICT CONFIGURATION CONTROL. MAINTAINS DETAILED HISTORY OF ALL CHANGES AGAINST SPECIFIC VERIFICATION ACTIVITIES. |

FIG. 6D

REQUIREMENT, COMPLIANCE AND RESOURCE MANAGEMENT METHODOLOGY 100

| | FEATURES | BENEFITS |
|---|---|---|
| 100F | TRACEABILITY FROM REQUIREMENTS TO COMPLIANCE DATA ARTIFACTS. | PROVIDES CLOSED-LOOP AUTOMATED HYPERLINKS WHICH PROVIDE QUICK ACCESS TO REQUIREMENTS COMPLIANCE DATA AND RELATED ARTIFACTS. |
| 100F | VERIFICATION ACTIVITY LINKAGE TO MS PROJECT SCHEDULES. | TIGHTLY COUPLES VERIFICATION ACTIVITIES WITH PROGRAM MILESTONES TO ENSURE TIMELY END-ITEM DELIVERY. |
| 100F | ELECTRONIC SIGNATURE (EVENT PLANNING AND COMPLETION). | ELECTRONIC SIGNATURE CAPABILITY DRAMATICALLY REDUCES TEST ACTIVITY APPROVAL CYCLE. |
| 100F | ENTERPRISE INTEGRATION WITH EXTERNAL DATA SOURCES. | ALLOWS FOR CORRELATION OF DATA ELEMENTS ACROSS THE ENTERPRISE DRAMATICALLY IMPROVING COLLABORATION, INCREASING WORK FORCE EFFICIENCY AND REDUCING COST. |
| 100A1 | SIMPLE AND INTUITIVE GUI USER INTERFACE. | SIMPLE, INTUITIVE INTERFACE PROVIDES POWERFUL CAPABILITIES FOR IMPORTING, LINKING, ANALYZING, REPORTING AND MANAGING REQUIREMENTS, INCLUDING TRACEABILITY TO ASSOCIATED PROJECT VERIFICATION EVENTS AND TEAM ASSIGNMENTS. REQUIRES MINIMAL USER TRAINING. |
| 100A1 | READY FOR USE UPON INSTALLATION. | NO CUSTOM SCRIPTING REQUIRED RESULTS IN LOWER IMPLEMENTATION COST, FASTER USAGE. MAY BE TAILORED TO SUPPORT SPECIFIC PROJECT PROCESSES. |

FIG. 6E

REQUIREMENT, COMPLIANCE AND RESOURCE MANAGEMENT METHODOLOGY 120

| | FEATURES | BENEFITS |
|---|---|---|
| 100A | SPECIFICATION CREATION AND REQUIREMENTS MANAGEMENT. | PROVIDES SINGLE, CONFIGURATION CONTROLLED TRUE RELATIONAL DATABASE TO MANAGE SPECIFICATIONS AND REQUIREMENTS. |
| | PARENT/CHILD, SOURCE LIFE CYCLE TRACEABILITY. | ALLOWS FOR QUICK AND EASY IMPACT ASSESSMENT IN THE EVENT OF REQUIREMENT CHANGES. |
| | EMAIL NOTIFICATION FOR REQUIREMENT CHANGES. | FASTER RESPONSE TIME FOR PROGRAM CHANGE ASSESSMENT AND IMPLEMENTATION. |
| | CUSTOMIZABLE, FILTERABLE REQUIREMENT CATEGORIES. | ALLOWS FOR QUICK AND EASY REQUIREMENTS FILTERING/SORTING FOR ITEMS OF INTEREST. |
| | KEYWORD SEARCH CAPABILITY. | ALLOWS FOR QUICK ACCESS TO REQUIREMENTS AND ITEMS OF INTEREST. SEARCHES ENTIRE DATABASE WITH SINGLE QUERY. |
| | EMBEDDED CONFIGURATION MANAGEMENT. | ENSURES REQUIREMENT'S BASELINE IS UNDER STRICT CONFIGURATION CONTROL. MAINTAINS DETAILED HISTORY OF ALL CHANGES AGAINST SPECIFIC REQUIREMENT ATTRIBUTES. |
| | SPECIFICATION AUTHOR "BOOK BOSS" ASSIGNMENTS. | PROVIDES ABILITY TO ASSIGN PERSONNEL WITH READ/WRITE ACCESS TO SPECIFICATIONS AND REQUIREMENTS. |

FIG. 8A

REQUIREMENT, COMPLIANCE AND RESOURCE MANAGEMENT METHODOLOGY 120

| | FEATURES | BENEFITS |
|---|---|---|
| 100B | IMPORT LEGAL/REGULARITY REQUIREMENTS (i.e., HIPPA). | SINGLE SOURCE FOR LEGAL/REGULATORY REQUIREMENT IN A TRUE RELATIONAL DATABASE. |
| 100C | IMPORT CUSTOMER REQUIREMENTS FROM MS WORD/MS EXCEL/PDF INTO DATABASE. | SEAMLESS IMPORT ALLOWS USERS TO CONSOLIDATE REQUIREMENTS INTO SINGLE, TRUE RELATIONAL DATABASE. |
| | INCORPORATES NON-TEXTUAL OBJECTS AND IMAGES INTO DATABASE. | ALLOWS NON-TEXTUAL OBJECTS TO BE ASSOCIATED WITH REQUIREMENTS OBJECTS. |
| | TPM, RISK, CRITICAL ISSUE TRACKING AND CONTROL. | INSIGHTFUL REPORTING CAPABILITY PROVIDES VISIBILITY TO CRITICAL ISSUES AND UNRESOLVED ACTIONS, ENABLING EFFICIENT RESOURCE ALLOCATION. |
| 100D | OVERALL PROJECT COMPLETION STATUS. | SIMPLE DASHBOARD METRICS WHICH PROVIDE COMPLETION STATUS AT ALL LEVELS OF INTEGRATION UP TO FINAL END-ITEM DELIVERY. |
| | OPEN ACTION STATUS. | QUICK AND EASY ACCESS TO PROGRAM ACTION ITEMS AND COMPLETION STATUS. |

FIG. 8B

REQUIREMENT, COMPLIANCE AND RESOURCE MANAGEMENT METHODOLOGY 120

| | FEATURES | BENEFITS |
|---|---|---|
| 100D | PROGRAM USAGE STATISTICS. | REAL-TIME METRICS WHICH DISPLAY IRIS USER STATISTICS SUCH AS USER FREQUENCY AND DURATION. |
| 100E | HARDWARE/SOFTWARE RESOURCE MANAGEMENT. | ALLOWS FOR QUICK AND EASY RESERVATION OF HARDWARE/SOFTWARE COMPONENTS NEEDED TO PERFORM VERIFICATION ACTIVITIES IN SPECIFIC FACILITIES/LOCATIONS.<br>FLAGS USER IF A HARDWARE/SOFTWARE SCHEDULING CONFLICT EXISTS.<br>PROVIDES RESOURCE TIME AND COST FOR EACH EVENT. |
| | PERSONNEL RESOURCE MANAGEMENT. | ALLOWS FOR QUICK AND EASY RESERVATION OF PERSONNEL AND SUBJECT MATTER EXPERTS NEEDED TO PERFORM VERIFICATION ACTIVITIES IN SPECIFIC FACILITIES/LOCATIONS.<br>FLAGS USER IF A PERSONNEL SCHEDULING CONFLICT EXISTS.<br>PROVIDE RESOURCE TIME AND COST FOR EACH EVENT. |
| 100F | ALLOCATION OF REQUIREMENTS TO VERIFICATION EVENTS. | PROVIDES REAL-TIME VISIBILITY TO VERIFICATION STRATEGIES, CONFIGURATION AND OBJECTIVES THEREBY PROVIDING PROGRAMS THE ABILITY TO LEVERAGE VERIFICATION ACTIVITIES IN SUPPORT OF AGILE ACQUISITION INITIATIVES.<br>INSTITUTES AN ENVIRONMENT OF COLLABORATION ENSURING EARLY IDENTIFICATION OF RISKS. |

FIG. 8C

REQUIREMENT, COMPLIANCE AND RESOURCE MANAGEMENT METHODOLOGY 120

| FEATURES | BENEFITS |
|---|---|
| CUSTOMIZABLE VERIFICATION EVENT COORDINATION MATRIX. | CUSTOMIZABLE EVENT COORDINATION MATRIX (ECM) GENERATOR WHICH ALLOWS USERS TO ORGANIZE AND GROUP EVENTS BY END-ITEM DELIVERABLES AND ENGINEERING DISCIPLINES. PROVIDES ABILITY FOR USERS TO SEE IF THEY CAN BE MOVE REQUIREMENTS TO ANOTHER EVENT AND THE EVENT IN QUESTION MAY ALSO ELIMINATED THEREBY STREAMLINING VERIFICATION ACTIVITIES. |
| EVENT RESOURCE MANAGEMENT. | TIGHTLY COUPLES REQUIRED VERIFICATION EVENT RESOURCES TO INTEGRATED SCHEDULES TO BETTER COORDINATE RESOURCES. |
| EVENT CONFIGURATION CONTROL AND CHANGE HISTORY. | ENSURES VERIFICATION BASELINE IS UNDER STRICT CONFIGURATION CONTROL. MAINTAINS DETAILED HISTORY OF ALL CHANGES AGAINST SPECIFIC VERIFICATION ACTIVITIES. |
| TRACEABILITY FROM REQUIREMENTS TO COMPLIANCE DATA ARTIFACTS. | PROVIDES CLOSED-LOOP AUTOMATED HYPERLINKS WHICH PROVIDE QUICK ACCESS TO REQUIREMENTS COMPLIANCE DATA AND RELATED ARTIFACTS. |
| VERIFICATION ACTIVITY LINKAGE TO MS PROJECT SCHEDULES. | TIGHTLY COUPLES VERIFICATION ACTIVITIES WITH PROGRAM MILESTONES TO ENSURE TIMELY END-ITEM DELIVERY. |

REQUIREMENT, COMPLIANCE AND RESOURCE MANAGEMENT METHODOLOGY 120

| | FEATURES | BENEFITS |
|---|---|---|
| 100F | ELECTRONIC SIGNATURE (EVENT PLANNING AND COMPLETION). | ELECTRONIC SIGNATURE CAPABILITY DRAMATICALLY REDUCES TEST ACTIVITY APPROVAL CYCLE. |
| | ENTERPRISE INTEGRATION WITH EXTERNAL DATA SOURCES. | ALLOWS FOR CORRELATION OF DATA ELEMENTS ACROSS THE ENTERPRISE DRAMATICALLY IMPROVING COLLABORATION, INCREASING WORK FORCE EFFICIENCY AND REDUCING COST. |
| 100A1 | SIMPLE AND INTUITIVE GUI USER INTERFACE. | SIMPLE, INTUITIVE INTERFACE PROVIDES POWERFUL CAPABILITIES FOR IMPORTING, LINKING, ANALYZING, REPORTING AND MANAGING REQUIREMENTS, INCLUDING TRACEABILITY TO ASSOCIATED PROJECT VERIFICATION EVENTS AND TEAM ASSIGNMENTS. |
| | READY FOR USE UPON INSTALLATION. | NO CUSTOM SCRIPTING REQUIRED RESULTS IN LOWER IMPLEMENTATION COST, FASTER USAGE. MAY BE TAILORED TO SUPPORT SPECIFIC PROJECT PROCESSES. |
| 100C1 | PROJECT SETUP QUESTION AND ANSWER. | STEP-BY-STEP QUESTION AND ANSWER THAT ALLOWS USER TO QUICKLY AND EASILY SET UP A NEW PROJECT. |
| | DECISION BASED ON FUZZY APPROXIMATION. | ENABLES PROGRAM DECISION MAKERS TO ASSESS WHEN VERIFICATION IS GOOD ENOUGH. |
| 100F1 | "REQUIREMENT GOODNESS" CHECK. | EVALUATES REQUIREMENT GOODNESS THEREBY REDUCING REQUIREMENT REWORK AND VERIFICATION RESOURCE WASTE. |

FIG. 8E

5-YEAR GROWTH INPUT DISTRIBUTION INPUT TO A MONTE CARLO SIMULATION

REQUIREMENT, COMPLIANCE AND RESOURCE MANAGEMENT METHODOLOGY 140

| FEATURES | BENEFITS |
|---|---|
| SPECIFICATION CREATION AND REQUIREMENTS MANAGEMENT. | PROVIDES SINGLE, CONFIGURATION CONTROLLED TRUE RELATIONAL DATABASE TO MANAGE SPECIFICATIONS AND REQUIREMENTS. |
| PARENT/CHILD, SOURCE LIFE CYCLE TRACEABILITY. | ALLOWS FOR QUICK AND EASY IMPACT ASSESSMENT IN THE EVENT OF REQUIREMENT CHANGES. |
| EMAIL NOTIFICATION FOR REQUIREMENT CHANGES. | FASTER RESPONSE TIME FOR PROGRAM CHANGE ASSESSMENT AND IMPLEMENTATION. |
| CUSTOMIZABLE, FILTERABLE REQUIREMENT CATEGORIES. | ALLOWS FOR QUICK AND EASY REQUIREMENTS FILTERING/SORTING FOR ITEMS OF INTEREST. |
| KEYWORD SEARCH CAPABILITY. | ALLOWS FOR QUICK ACCESS TO REQUIREMENTS AND ITEMS OF INTEREST. SEARCHES ENTIRE DATABASE WITH SINGLE QUERY. |
| EMBEDDED CONFIGURATION MANAGEMENT. | ENSURES REQUIREMENTS BASELINE IS UNDER STRICT CONFIGURATION CONTROL. MAINTAINS DETAILED HISTORY OF ALL CHANGES AGAINST SPECIFIC REQUIREMENT ATTRIBUTES. |

REQUIREMENT, COMPLIANCE AND RESOURCE MANAGEMENT METHODOLOGY 140

| | FEATURES | BENEFITS |
|---|---|---|
| 100A | SPECIFICATION AUTHOR "BOOK BOSS" ASSIGNMENTS. | PROVIDES ABILITY TO ASSIGN PERSONNEL WITH READ/WRITE ACCESS TO SPECIFICATIONS AND REQUIREMENTS. |
| 100B | IMPORT LEGAL/REGULARITY REQUIREMENTS (i.e., HIPPA). | SINGLE SOURCE FOR LEGAL/REGULATORY REQUIREMENT IN A TRUE RELATIONAL DATABASE. |
| 100C | IMPORT CUSTOMER REQUIREMENTS FROM MS WORD/MS EXCEL/PDF INTO DATABASE. | SEAMLESS IMPORT ALLOWS USERS TO CONSOLIDATE REQUIREMENTS INTO SINGLE, TRUE RELATIONAL DATABASE. |
| | INCORPORATES NON-TEXTUAL OBJECTS AND IMAGES INTO DATABASE. | ALLOWS NON-TEXTUAL OBJECTS TO BE ASSOCIATED WITH REQUIREMENTS OBJECTS. |
| | TPM, RISK, CRITICAL ISSUE TRACKING AND CONTROL. | INSIGHTFUL REPORTING CAPABILITY PROVIDES VISIBILITY TO CRITICAL ISSUES AND UNRESOLVED ACTIONS, ENABLING EFFICIENT RESOURCE ALLOCATION. |
| 100D | OVERALL PROJECT COMPLETION STATUS. | SIMPLE DASHBOARD METRICS WHICH PROVIDE COMPLETION STATUS AT ALL LEVELS OF INTEGRATION UP TO FINAL END-ITEM DELIVERY. |
| | OPEN ACTION STATUS. | QUICK AND EASY ACCESS TO PROGRAM ACTION ITEMS AND COMPLETION STATUS. |

FIG. 10B

REQUIREMENT, COMPLIANCE AND RESOURCE MANAGEMENT METHODOLOGY 140

| | FEATURES | BENEFITS |
|---|---|---|
| 100D | PROGRAM USAGE STATISTICS. | REAL-TIME METRICS WHICH DISPLAY IRIS USER STATISTICS SUCH AS USER FREQUENCY AND DURATION. |
| 100E | HARDWARE/SOFTWARE RESOURCE MANAGEMENT. | ALLOWS FOR QUICK AND EASY RESERVATION OF HARDWARE/SOFTWARE COMPONENTS NEEDED TO PERFORM VERIFICATION ACTIVITIES IN SPECIFIC FACILITIES/LOCATIONS.<br>FLAGS USER IF A HARDWARE/SOFTWARE SCHEDULING CONFLICT EXISTS.<br>PROVIDES RESOURCE TIME AND COST FOR EACH EVENT. |
| | PERSONNEL RESOURCE MANAGEMENT. | ALLOWS FOR QUICK AND EASY RESERVATION OF PERSONNEL AND SUBJECT MATTER EXPERTS NEEDED TO PERFORM VERIFICATION ACTIVITIES IN SPECIFIC FACILITIES/LOCATIONS.<br>FLAGS USER IF A PERSONNEL SCHEDULING CONFLICT EXISTS.<br>PROVIDE RESOURCE TIME AND COST FOR EACH EVENT. |
| 100F | ALLOCATION OF REQUIREMENTS TO VERIFICATION EVENTS. | PROVIDES REAL-TIME VISIBILITY TO VERIFICATION STRATEGIES, CONFIGURATION AND OBJECTIVES THEREBY PROVIDING PROGRAMS THE ABILITY TO LEVERAGE VERIFICATION ACTIVITIES IN SUPPORT OF AGILE ACQUISITION INITIATIVES.<br>INSTITUTES AN ENVIRONMENT OF COLLABORATION ENSURING EARLY IDENTIFICATION OF RISKS. |

FIG. 10C

REQUIREMENT, COMPLIANCE AND RESOURCE MANAGEMENT METHODOLOGY 140

| FEATURES | BENEFITS |
|---|---|
| CUSTOMIZABLE VERIFICATION EVENT COORDINATION MATRIX. | CUSTOMIZABLE EVENT COORDINATION MATRIX (ECM) GENERATOR WHICH ALLOWS USERS TO ORGANIZE AND GROUP EVENTS BY END-ITEM DELIVERABLES AND ENGINEERING DISCIPLINES. PROVIDES ABILITY FOR USERS TO SEE IF THEY CAN BE MOVE REQUIREMENTS TO ANOTHER EVENT AND THE EVENT IN QUESTION MAY ALSO ELIMINATED THEREBY STREAMLINING VERIFICATION ACTIVITIES. |
| EVENT RESOURCE MANAGEMENT. | TIGHTLY COUPLES REQUIRED VERIFICATION EVENT RESOURCES TO INTEGRATED SCHEDULES TO BETTER COORDINATE RESOURCES. |
| EVENT CONFIGURATION CONTROL AND CHANGE HISTORY. | ENSURES VERIFICATION BASELINE IS UNDER STRICT CONFIGURATION CONTROL. MAINTAINS DETAILED HISTORY OF ALL CHANGES AGAINST SPECIFIC VERIFICATION ACTIVITIES. |
| TRACEABILITY FROM REQUIREMENTS TO COMPLIANCE DATA ARTIFACTS. | PROVIDES CLOSED-LOOP AUTOMATED HYPERLINKS WHICH PROVIDE QUICK ACCESS TO REQUIREMENTS COMPLIANCE DATA AND RELATED ARTIFACTS. |
| VERIFICATION ACTIVITY LINKAGE TO MS PROJECT SCHEDULES | TIGHTLY COUPLES VERIFICATION ACTIVITIES WITH PROGRAM MILESTONES TO ENSURE TIMELY END-ITEM DELIVERY. |

REQUIREMENT, COMPLIANCE AND RESOURCE MANAGEMENT METHODOLOGY 140

| | FEATURES | BENEFITS |
|---|---|---|
| 100F | ELECTRONIC SIGNATURE (EVENT PLANNING AND COMPLETION). | ELECTRONIC SIGNATURE CAPABILITY DRAMATICALLY REDUCES TEST ACTIVITY APPROVAL CYCLE. |
| | ENTERPRISE INTEGRATION WITH EXTERNAL DATA SOURCES. | ALLOWS FOR CORRELATION OF DATA ELEMENTS ACROSS THE ENTERPRISE DRAMATICALLY IMPROVING COLLABORATION, INCREASING WORK FORCE EFFICIENCY AND REDUCING COST. |
| 100A1 | SIMPLE AND INTUITIVE GUI USER INTERFACE. | SIMPLE, INTUITIVE INTERFACE PROVIDES POWERFUL CAPABILITIES FOR IMPORTING, LINKING, ANALYZING, REPORTING AND MANAGING REQUIREMENTS, INCLUDING TRACEABILITY TO ASSOCIATED PROJECT VERIFICATION EVENTS AND TEAM ASSIGNMENTS. |
| | READY FOR USE UPON INSTALLATION | NO CUSTOM SCRIPTING REQUIRED RESULTS IN LOWER IMPLEMENTATION COST, FASTER USAGE. MAY BE TAILORED TO SUPPORT SPECIFIC PROJECT PROCESSES. |
| 100C1 | PROJECT SETUP QUESTION AND ANSWER. | STEP-BY-STEP QUESTION AND ANSWER THAT ALLOWS USER TO QUICKLY AND EASILY SET UP A NEW PROJECT. |

FIG. 10E

REQUIREMENT, COMPLIANCE AND RESOURCE MANAGEMENT METHODOLOGY 140

| | FEATURES | BENEFITS |
|---|---|---|
| 100F1 | DECISION BASED ON FUZZY APPROXIMATION. | ENABLES PROGRAM DECISION MAKERS TO ASSESS WHEN VERIFICATION IS "GOOD ENOUGH". |
| | "REQUIREMENT GOODNESS" CHECK. | EVALUATES REQUIREMENT GOODNESS THEREBY REDUCING REQUIREMENT REWORK AND VERIFICATION RESOURCE WASTE. |
| 100F2 | VARIABILITY MEASUREMENT. | PROVIDES STATISTICAL ESTIMATING CAPABILITY FOR EMPIRICAL RESULTS THAT REQUIRE STATISTICAL MODELING TO ASSESS PERFORMANCE VARIABILITY. |
| 100F3 | TPM CALCULATOR (WEIGHTING LOGIC). | ALLOWS PROGRAM TO CALCULATE VALUE OF TPM THROUGHOUT INTEGRATION PROCESS. |

FIG. 10F

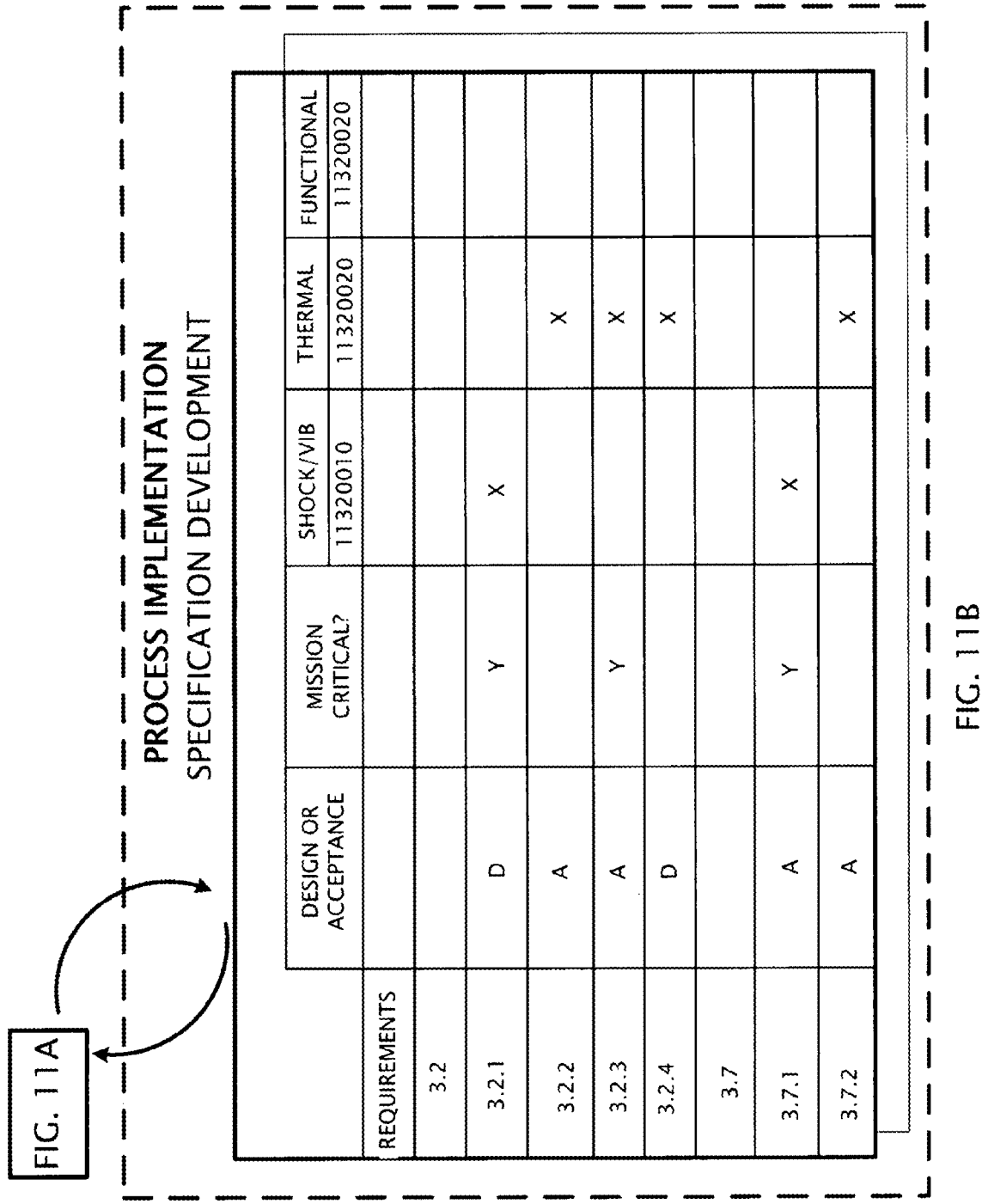

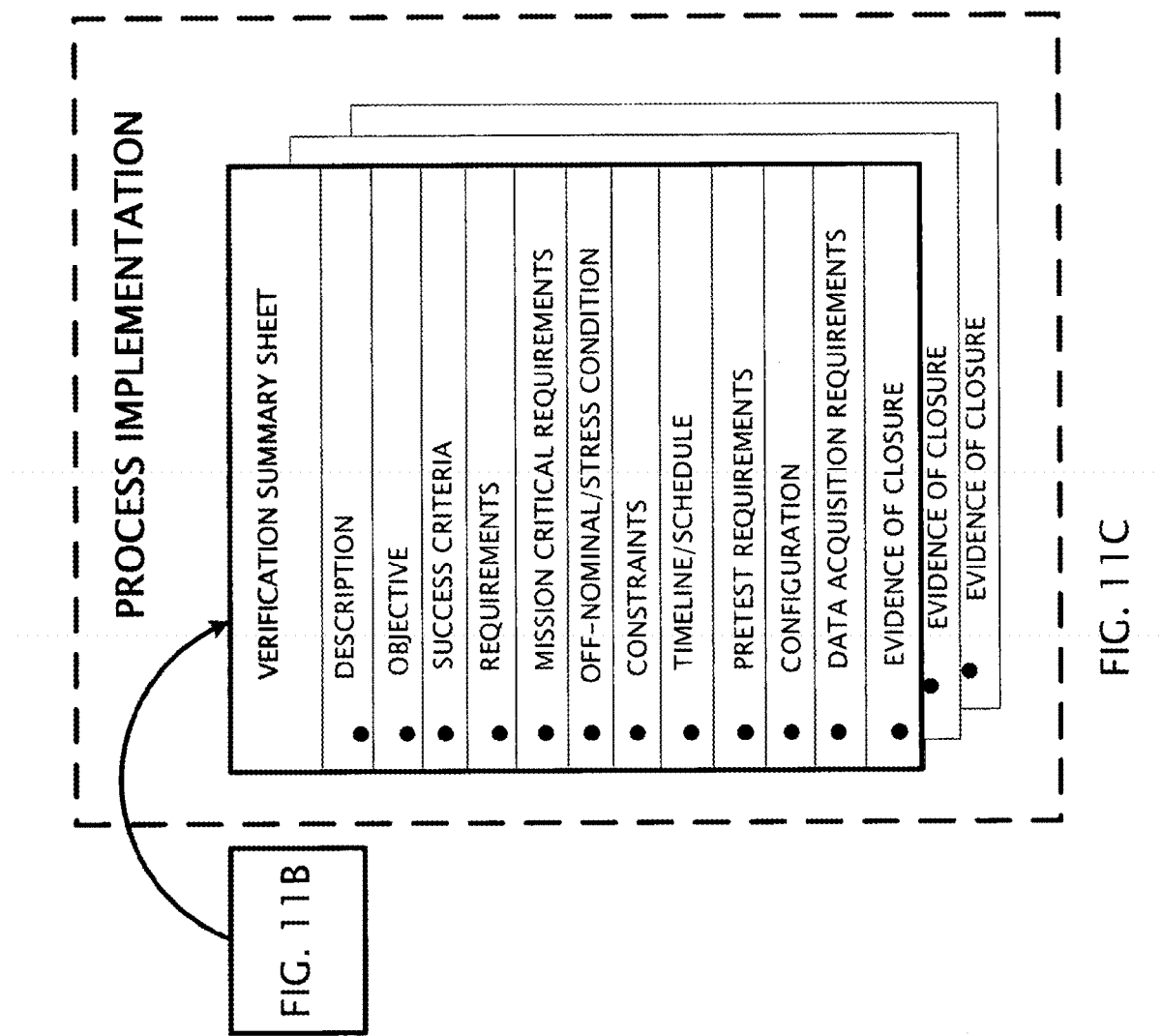

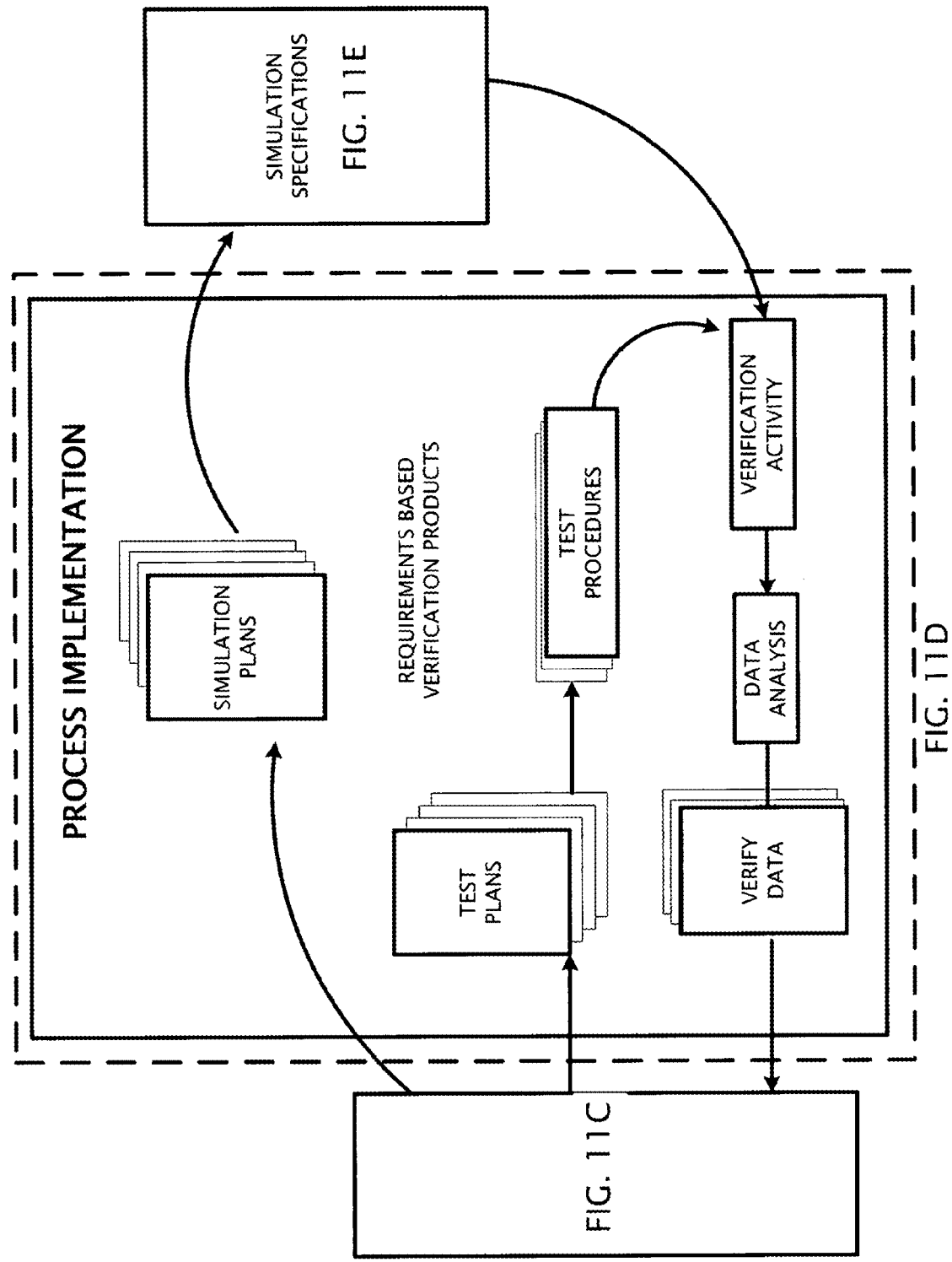

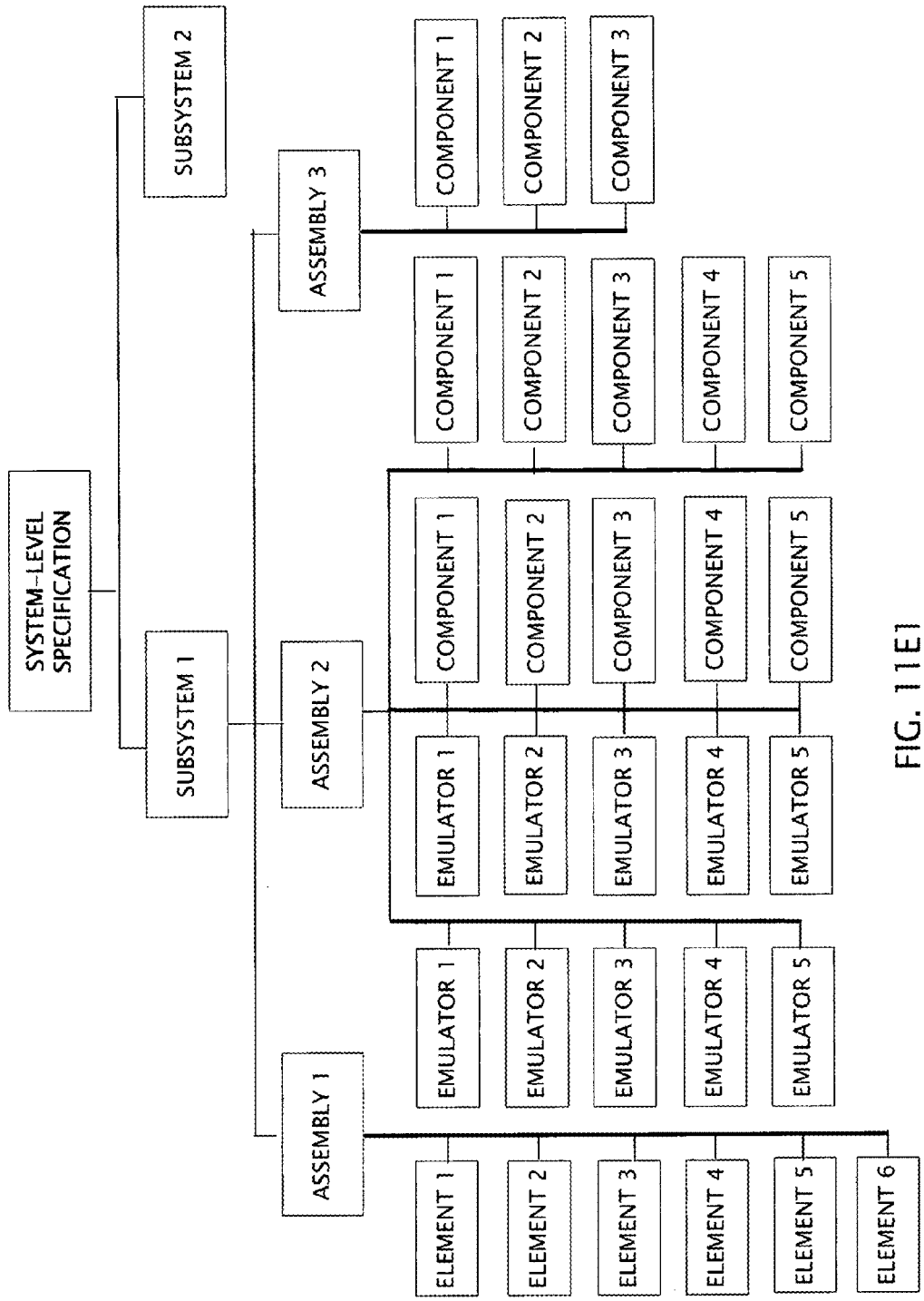
FIG. 11E1

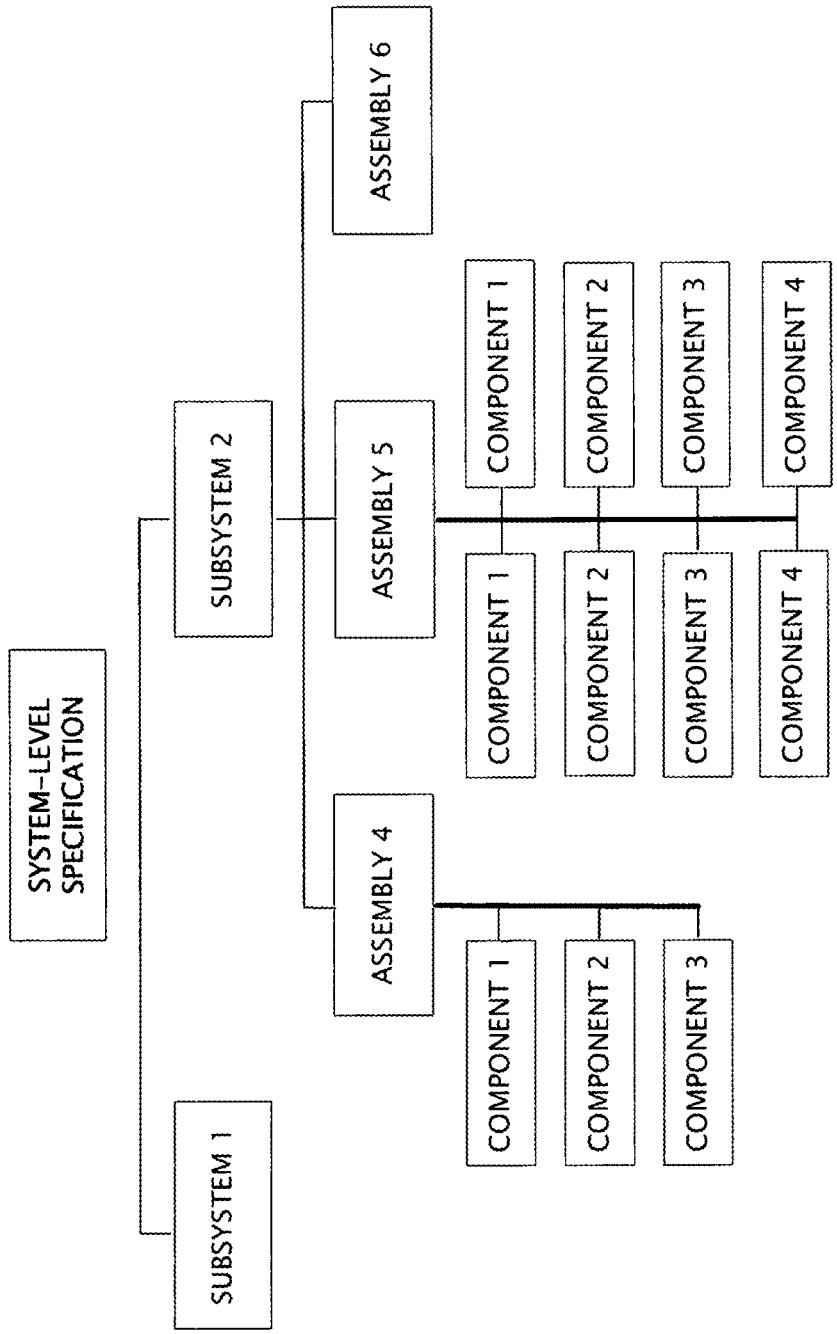
FIG. 11E2

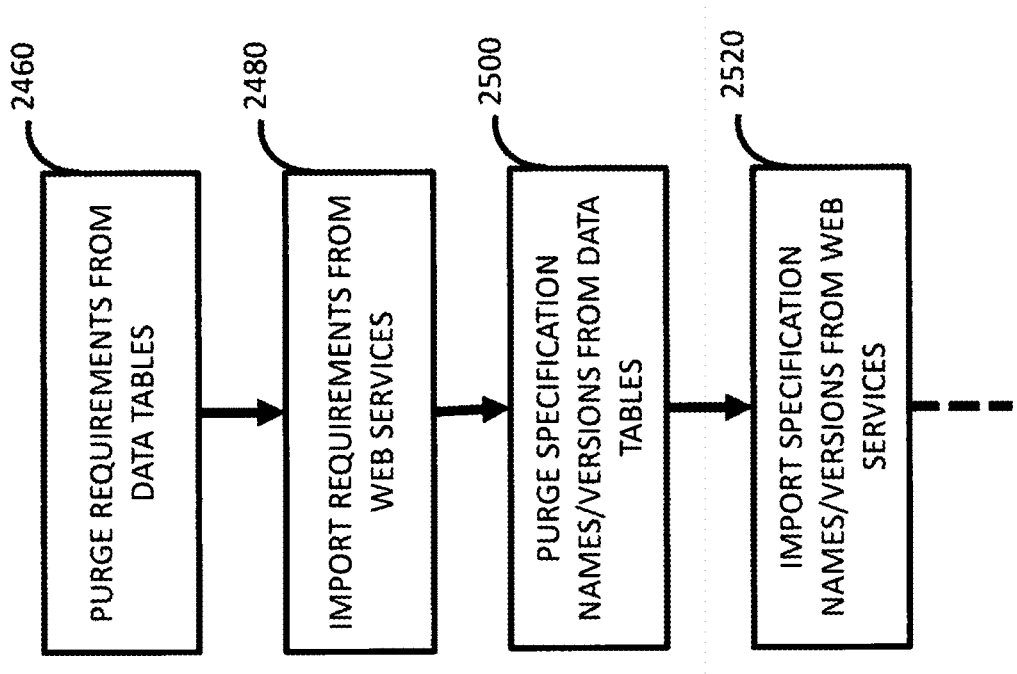

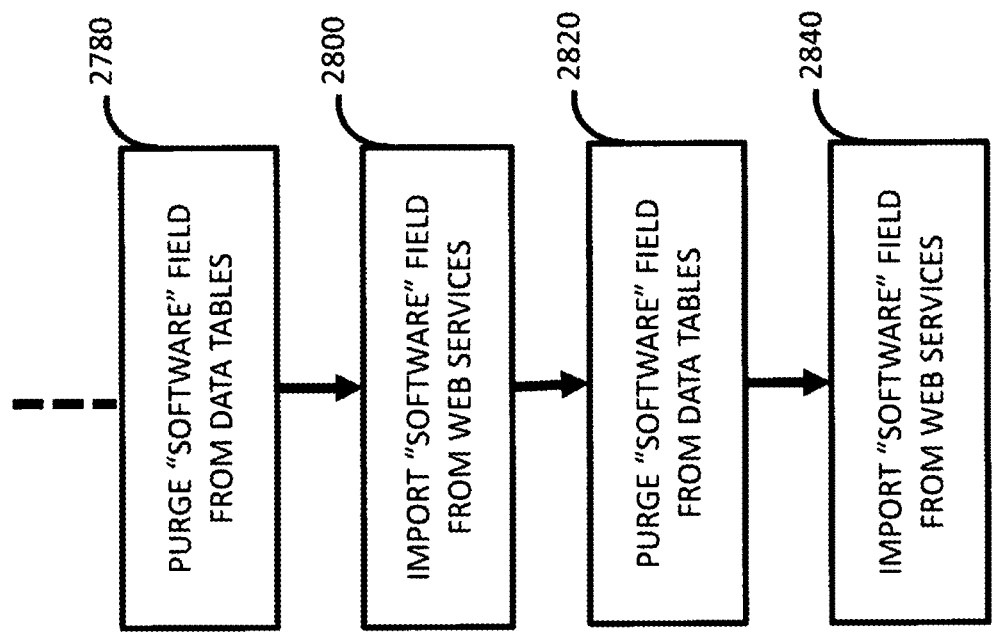

| | | VERIFICATION EVENTS | | |
|---|---|---|---|---|
| | | SUBSYSTEM 1 | ••• | SUBSYSTEM n |
| VERIFICATION NUMBER | | Ⓐ | Ⓑ | Ⓒ |
| VERIFICATION TITLE | | Ⓓ | Ⓔ | Ⓕ |
| EIS DEVELOPER | | | | |
| EIS CONDUCTOR | | | | |
| REQUIREMENT COUNT | Ⓖ | Ⓗ | Ⓘ | Ⓙ |

| VERIFICATION TITLE | VERIFICATION NUMBER | SUBSYSTEM 1 |
|---|---|---|
| EVENT TITLE 1 | EVENT ID #1 | |
| EVENT TITLE 2 | EVENT ID #2 | |
| EVENT TITLE 3 | EVENT ID #3 | |
| EVENT TITLE 4 | EVENT ID #4 | |
| EVENT TITLE 5 | EVENT ID #5 | |
| • | • | |
| • | • | |
| • | • | |
| EVENT TITLE n | EVENT ID #n | |

| VERIFICATION TITLE | VERIFICATION NUMBER | SUBSYSTEM #2 |
|---|---|---|
| EVENT TITLE 1 | EVENT ID #1 | |
| EVENT TITLE 2 | EVENT ID #2 | |
| EVENT TITLE 3 | EVENT ID #3 | |
| EVENT TITLE 4 | EVENT ID #4 | |
| EVENT TITLE 5 | EVENT ID #5 | |
| ● | ● | |
| ● | ● | |
| ● | ● | |
| EVENT TITLE n | EVENT ID # n | |

FIG. 25C

| SUBSYSTEM # 3 | VERIFICATION TITLE | VERIFICATION NUMBER |
|---|---|---|
| | EVENT TITLE 1 | EVENT ID #1 |
| | EVENT TITLE 2 | EVENT ID #2 |
| | EVENT TITLE 3 | EVENT ID #3 |
| | EVENT TITLE 4 | EVENT ID #4 |
| | EVENT TITLE 5 | EVENT ID #5 |
| | • | • |
| | • | • |
| | • | • |
| | EVENT TITLE n | EVENT ID # n |

FIG. 25D

| SUBSYSTEM # 1 | | |
|---|---|---|
| EIS DEVELOPER | EIS CONDUCTOR | REQUIREMENT COUNT |
| JANE DOE 1 | JOHN DOE 1 | 40 |
| JANE DOE 2 | JOHN DOE 2 | 39 |
| JOHN DOE 1 | JOHN DOE 3 | 57 |
| JIM SMITH 1 | JANE DOE 1 | 52 |
| JANE DOE 3 | JANE SMITH 1 | 198 |
| ● | ● | 87 |
| ● | ● | 314 |
| ● | ● | 27 |
| JANE DOE n | Jane Smith n | 234 |

FIG. 25E

| SUBSYSTEM # 2 | EIS DEVELOPER | EIS CONDUCTOR | REQUIREMENT COUNT |
|---|---|---|---|
| | JANE DOE 1 | JOHN DOE 1 | 40 |
| | JANE DOE 2 | JOHN DOE 2 | 39 |
| | JOHN DOE 1 | JOHN DOE 3 | 57 |
| | JIM SMITH 1 | JANE DOE 1 | 52 |
| | JANE DOE 3 | JANE SMITH 1 | 198 |
| | ● | ● | 87 |
| | ● | ● | 314 |
| | ● | ● | 27 |
| | JANE DOE n | Jane Smith n | 234 |

FIG. 25F

| SUBSYSTEM # 3 | EIS CONDUCTOR | EIS DEVELOPER | REQUIREMENT COUNT |
|---|---|---|---|
| | JOHN DOE 1 | JANE DOE 1 | 40 |
| | JOHN DOE 2 | JANE DOE 2 | 39 |
| | JOHN DOE 3 | JOHN DOE 1 | 57 |
| | JANE DOE 1 | JIM SMITH 1 | 52 |
| | JANE SMITH 1 | JANE DOE 3 | 198 |
| | ● | ● | 87 |
| | ● | ● | 314 |
| | ● | ● | 27 |
| | JANE SMITH N | JANE DOE N | 234 |

FIG. 25G

| SPEC A | RQT-1 | REQUIREMENT 1 TITLE | CAT 1 | N | S |
|--------|-------|---------------------|-------|---|---|
| SPEC A | RQT-2 | REQUIREMENT 2 TITLE | CAT 1 | N | S |
| SPEC A | RQT-3 | REQUIREMENT 3 TITLE | CAT 1 | N | S |
| SPEC A | RQT-4 | REQUIREMENT 4 TITLE | CAT 1 | N | S |
| SPEC A | RQT-5 | REQUIREMENT 5 TITLE | CAT 1 | N | S |
| SPEC A | • | • | CAT 1 | N | S |
| SPEC A | • | • | CAT 1 | N | S |
| SPEC A | • | • | CAT 1 | N | S |
| SPEC A | RQT-n | REQUIREMENT n TITLE | CAT 1 | N | S |

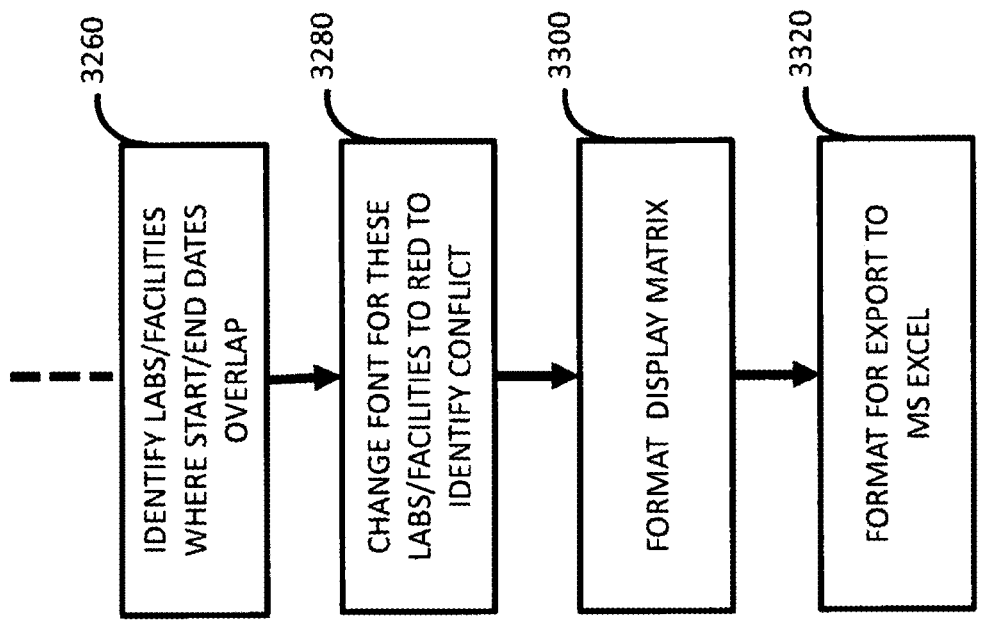

RESOURCE INVENTORY

3340

| Hardware | Software | Personnel | Events |

Labs/Facilities

| Facilities List | Facilities Reservations |

Lab/Facility Reservation List

| Lab/Facility | Site | Start Date | Verification Number |
|---|---|---|---|
| Facility 1 | Global | 5/19/2014 12:00:00 AM | Event 1 |
| Facility 2 | Global | 8/12/2014 12:00:00 AM | Event 2 |
| ••• | ••• | ••• | ••• |
| Facility n | Global | 8/12/2014 12:00:00 AM | Event n |

Export  Print

New  Edit  Delete

FIG. 26E

RESOURCE INVENTORY

| Labs/Facilities | Hardware | Software | Personnel | Events |

Personnel List | Personnel Reservations

Personnel Reservation List

| Name | Start Date | End Date | Verification Number |
|---|---|---|---|
| John Doe 1 | 6/24/2014 12:00:00 am | 7/22/2014 12:00:00 AM | Event 1 |
| John Doe 2 | 6/24/2014 12:00:00 am | 7/23/2014 12:00:00 AM | Event 2 |
| ... | ... | ... | ... |
| John Doe n | 6/30/2014 12:00:00 am | 7/25/2014 12:00:00 AM | Event n |

Export | Print

New | Edit | Delete

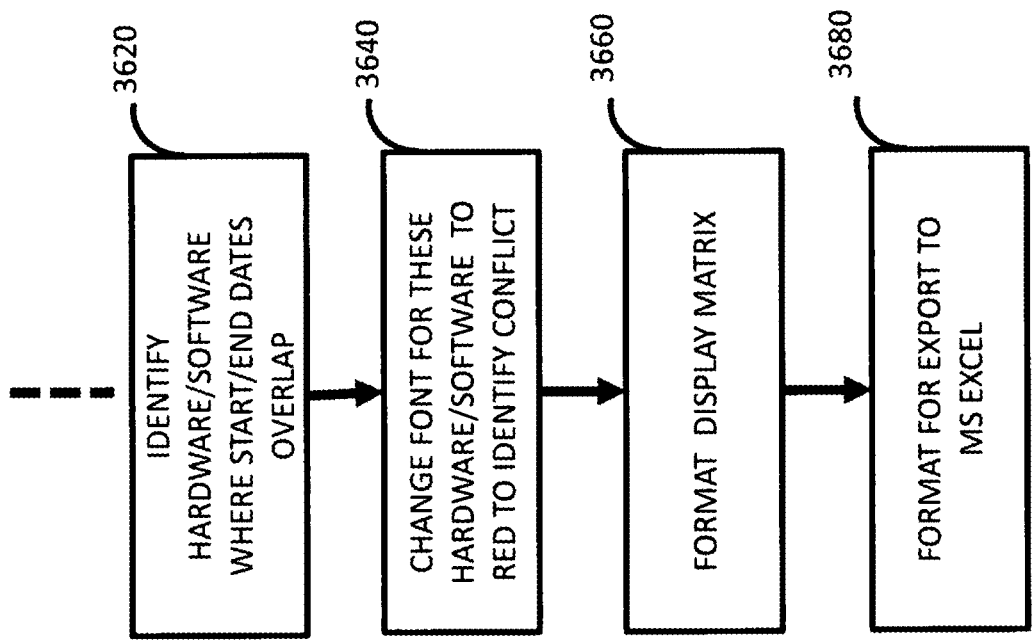

RESOURCE INVENTORY

| Labs/Facilities | Hardware | Software | Personnel | Events |

HW/SW List | HW/SW Reservations

Hardware/Software Reservation List

| Hardware/Software | Site | End Date | Verification Number |
|---|---|---|---|
| Hardware 1 | Global | 7/22/2014 12:00:00 AM | Event 1 |
| Software 1 | Global | 7/23/2014 12:00:00 AM | Event 2 |
| ... | ... | ... | ... |
| Hardware n | Global | 7/25/2014 12:00:00 AM | Event n |

Export | Print

New | Edit | Delete

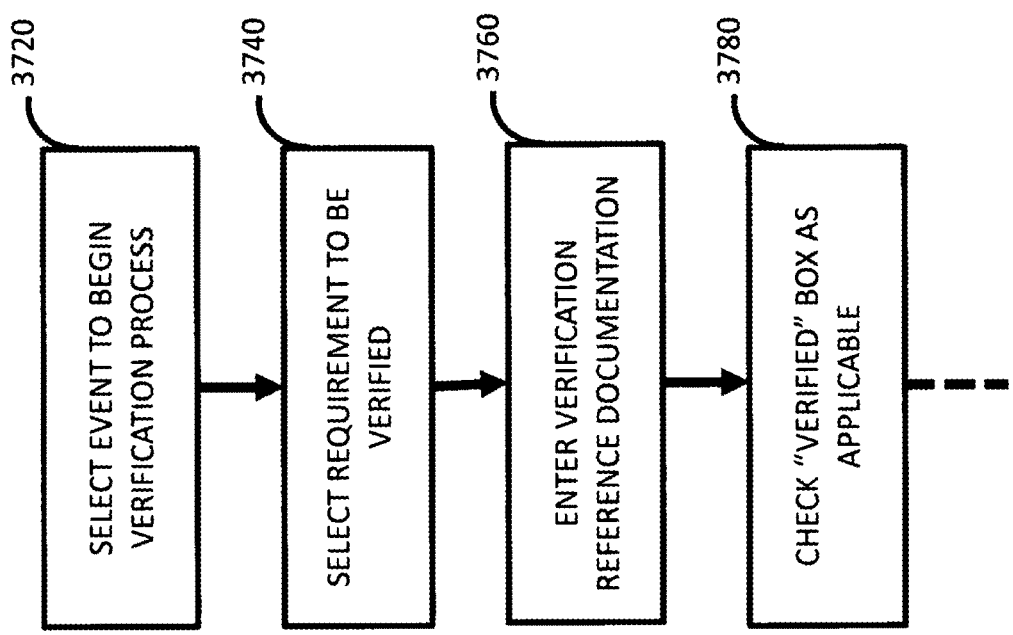

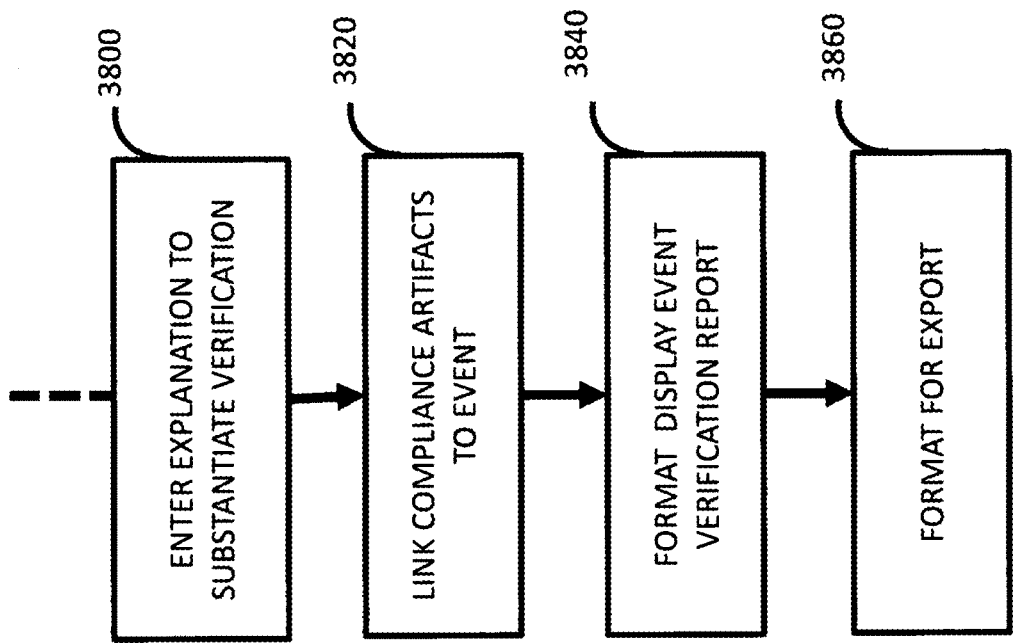

| VERIFICATION RESULTS FOR: | Event #1 | System ABC | | |
|---|---|---|---|---|
| 46 REQUIREMENTS | | | | |
| Requirement Number | ABC | External ID | ABC-1 | Name | Requirement 123 |

Description

Subsystem ABC shall...

| Verified ☐ | Specification | Spec 123 | DR Number: | |
|---|---|---|---|---|
| Reference Doc | | | Waiver | |

Explanation

Links to result Documents and Information

| Description | Hyperlink | | | |
|---|---|---|---|---|
| Requirement Number | DEF | External ID | Def-1 | Name | Requirement 456 |

Description

Subsystem ABC shall...

| Verified ☐ | Specification | Spec 123 | DR Number: | |
|---|---|---|---|---|
| Reference Doc | | | Waiver | |

Explanation

Links to result Documents and Information

| Description | Hyperlink |
|---|---|

SYSTEM AND METHOD OF A REQUIREMENT, COMPLIANCE AND RESOURCE MANAGEMENT

CROSS REFERENCE OF RELATED APPLICATIONS

The present application is a continuation-in-part (CIP) of U.S. Non-Provisional patent application Ser. No. 13/815,843 entitled, "SYSTEM AND METHOD OF A REQUIREMENT, COMPLIANCE AND RESOURCE MANAGEMENT" filed on Mar. 15, 2013.

Furthermore, U.S. Non-Provisional patent application Ser. No. 13/815,843 entitled, "SYSTEM AND METHOD OF A REQUIREMENT, COMPLIANCE AND RESOURCE MANAGEMENT" filed on Mar. 15, 2013, claims priority to U.S. Provisional Patent Application No. 61/848,015 entitled, "SYSTEM AND METHOD OF A REQUIREMENT, COMPLIANCE AND RESOURCE MANAGEMENT METHODOLOGY" filed on Dec. 19, 2012.

Furthermore, U.S. Non-Provisional patent application Ser. No. 13/815,843 entitled, "SYSTEM AND METHOD OF A REQUIREMENT, COMPLIANCE AND RESOURCE MANAGEMENT" filed on Mar. 15, 2013, is a continuation-in-part (CIP) of U.S. Non-Provisional patent application Ser. No. 13/573,634 entitled, "SYSTEM AND METHOD OP A REQUIREMENT, COMPLIANCE AND RESOURCE MANAGEMENT METHODOLOGY" filed on Sep. 28, 2012.

FIELD OF THE INVENTION

The present invention is related to a system and/or a method based on a scalable requirement, compliance and resource management methodology.

The requirement, compliance and resource management methodology of the present invention is intended for (a) designing a product/service, (b) scoping end-to-end process steps, which are required for designing the product/service, (c) identifying critical constrains for designing the product/service, (d) optimizing relevant processes for designing the product/service, (e) evaluating requirement specifications of each process step for designing the product/service, (f) allocating resources (human capital and/or investment capital) for each process step for designing the product/service and (g) enhancing near real time and/or real time collaboration between users.

DESCRIPTION OF PRIOR ART

One currently available product IBM Rational DOORS® software program enables to capture, trace, analyze and manage changes to requirements.

IBM Rational DOORS® can demonstrate compliance to regulations and standards.

IBM Rational DOORS® software allows all stakeholders to actively participate in the requirements process. It has ability to manage changing requirements with scalability. Its life cycle traceability can help teams align the methods and processes and also measure the impact of such methods and processes.

BACKGROUND OF THE INVENTION

In sharp contrast to IBM Rational DOORS®, the requirement, compliance and resource management methodology of the present invention is uniquely enhanced with mathematical algorithms (e.g., fuzzy logic, statistics and weighting logic) to account for any inherent approximation, variability and uncertainty in a process step and/or all cumulative process steps.

Above is a significant innovation compared to IBM Rational DOORS®.

Furthermore, the requirement, compliance and resource management methodology of the present invention synthesizes optimization of relevant process steps, requirements, resources and critical constraints for near real time and/or real time collaboration.

BRIEF DESCRIPTION OF THE FIGURES

FIGS. 5B (schematic chart), 5C (schematic chart), 5D (schematic chart) and 5E (schematic chart) describe various embodiments of 100D of the requirement, compliance and resource management methodology 100 in FIG. 5A. FIGS. 5E (schematic chart) and 5F (schematic chart) describe various embodiments of 100A1 of the requirement, compliance and resource management methodology 100 in FIG. 5A.

Figure 5A:
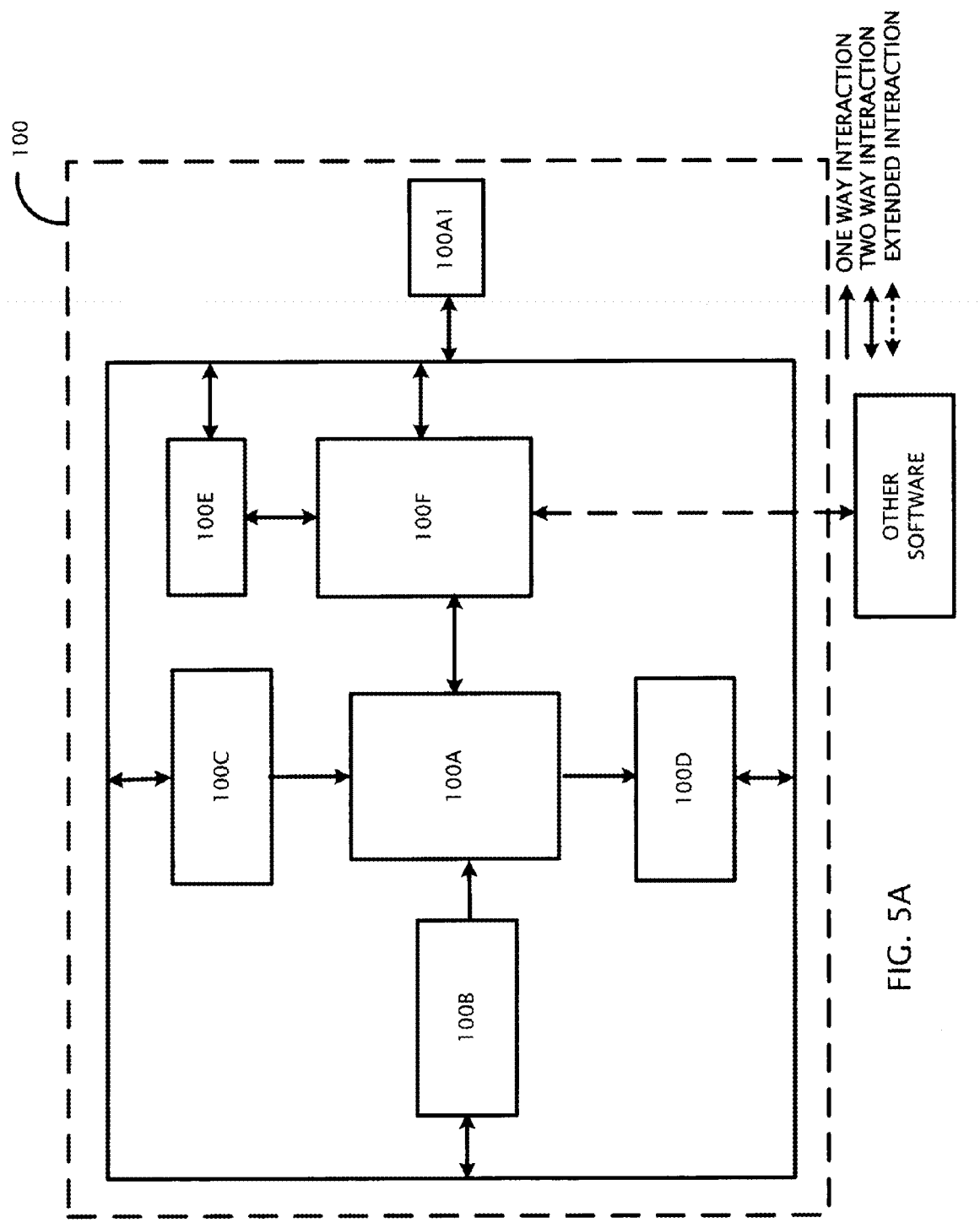
FIG. 5A (block diagram) describes one embodiment of the requirement, compliance and resource management methodology 100.
Figure 5D:
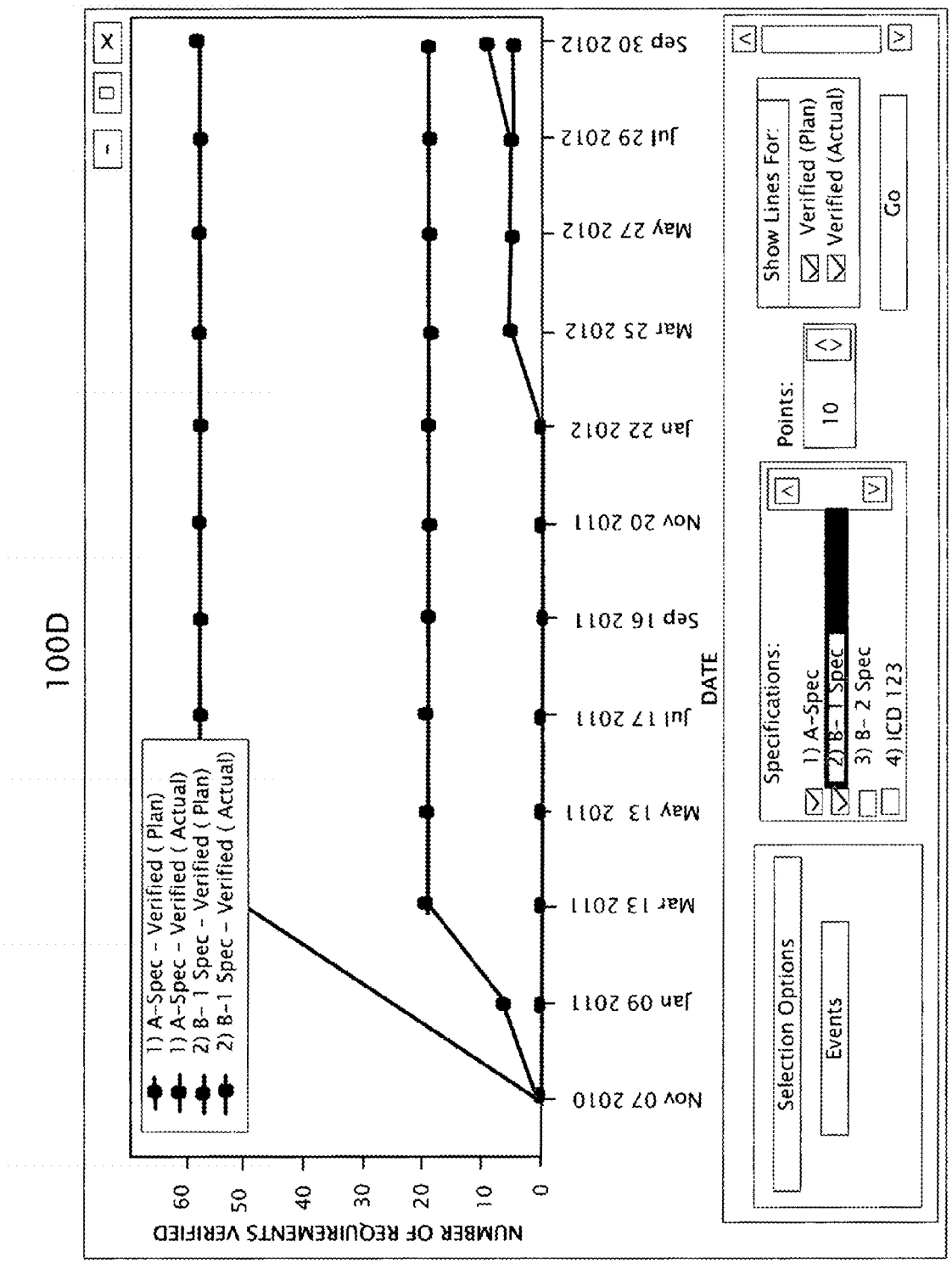
FIG. 5B consists of FIG. 5B1 and FIG. 5B2.
FIG. 5C consists of FIG. 5C1 and FIG. 5C2.
FIG. 5E consists of FIG. 5E1 and FIG. 5E2.
FIG. 5F consists of FIG. 5F1 and FIG. 5F2.

Tables 6A, 6B, 6C, 6D and 6E describe the features and benefits of the requirement, compliance and resource management methodology 100, as described in FIG. 5A. Features and benefits Table 6A describes specific features and benefits of 100A of the requirement, compliance and resource management methodology 100 in FIG. 5A. Features and benefits Table 6B describes specific features and benefits of 100A, 100B, 100C and 100D of the requirement, compliance and resource management methodology 100 in FIG. 5A. Features and benefits Table 6C describes specific features and benefits of 100D and 100E of the requirement, compliance and resource management methodology 100 in FIG. 5A. Features and benefits Table 6D describes specific features and benefits of 100F of the requirement, compliance and resource management methodology 100 in FIG. 5A.

Features and benefits Table 6E describes specific features and benefits of 100F and 100A1 of the requirement, compliance and resource management methodology 100 in FIG. 5A.

Figure 7A:
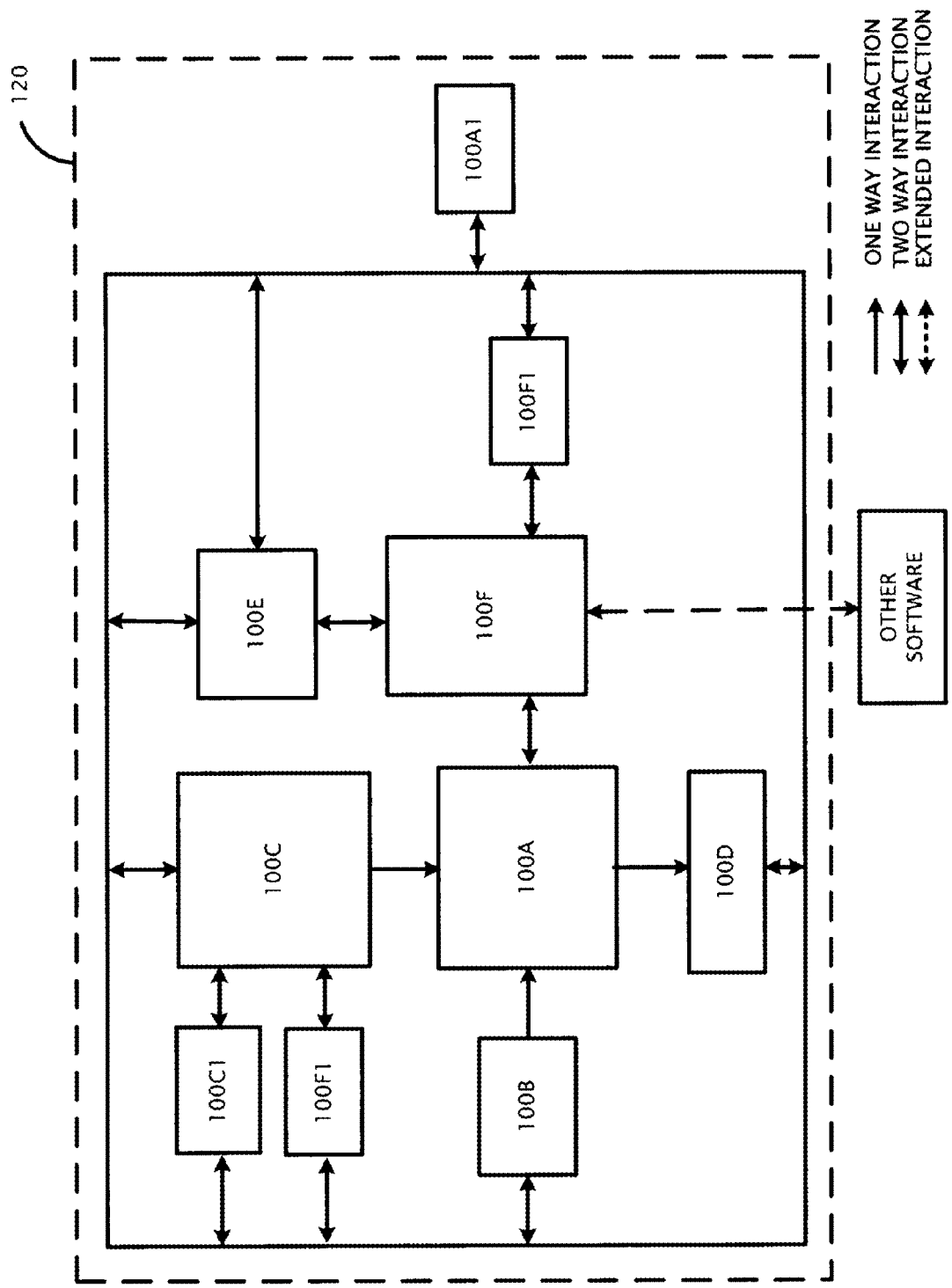

FIG. 7A (block diagram) describes another embodiment of the requirement, compliance and resource management methodology 120, further enhanced by a question/answer format of a requirement input module and a fuzzy logic algorithm module.

Figure 7B:
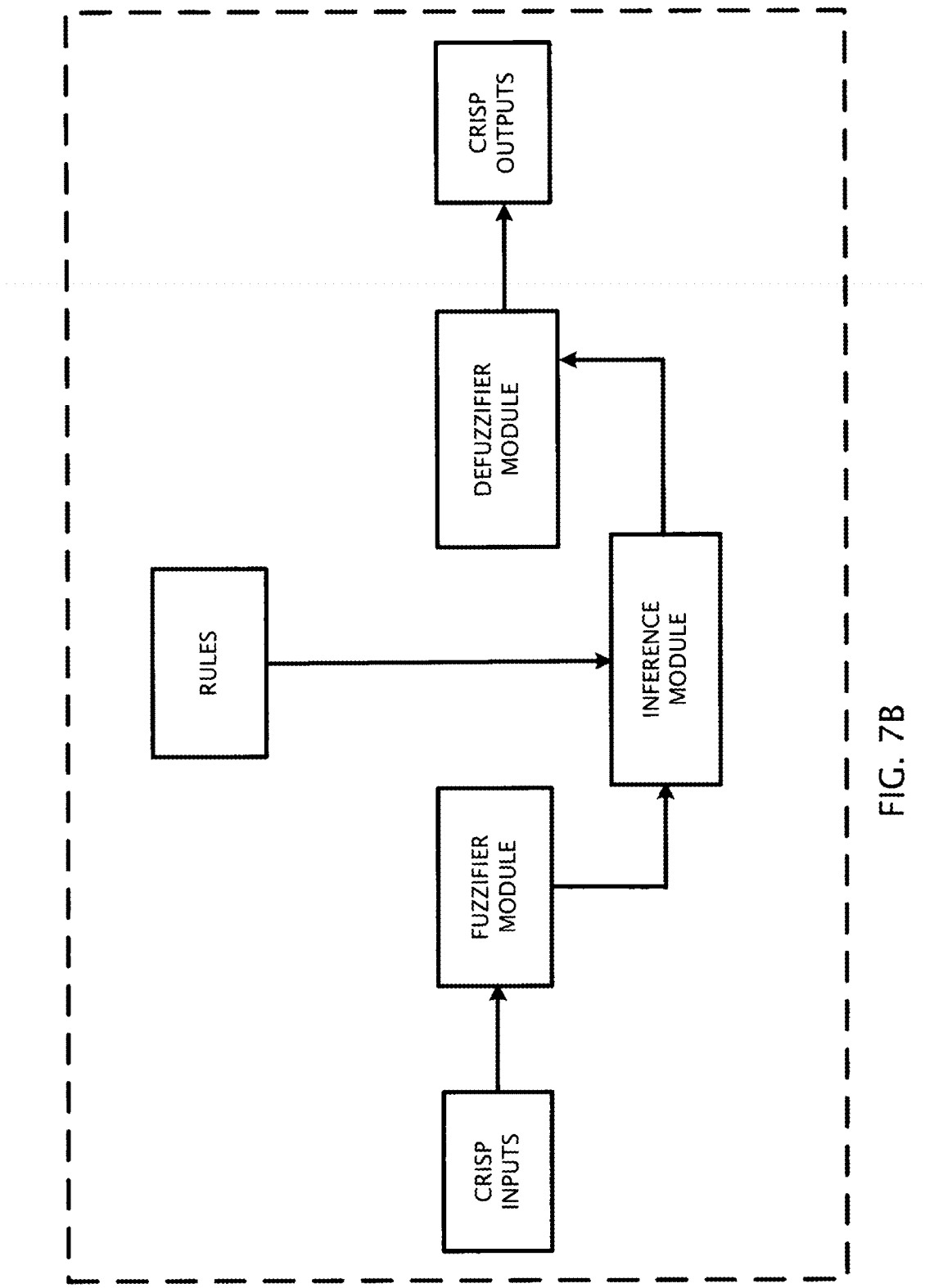

FIGS. 7B (schematic diagram) and 7C (schematic diagram) describe an application of the fuzzy logic module of the requirement, compliance and resource management methodology 120, as described in FIG. 7A.

Figure 7C:
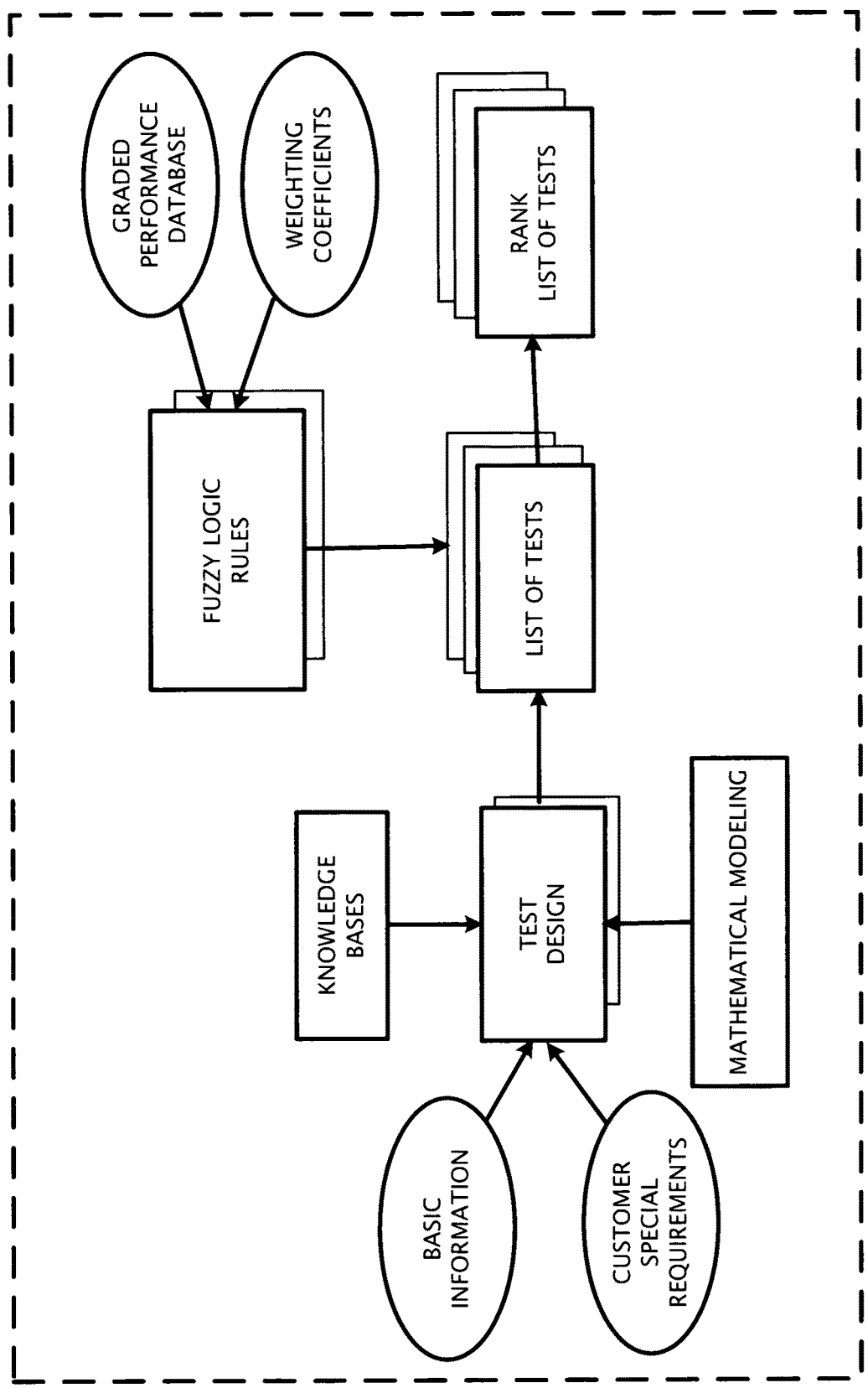
Figure 7D:
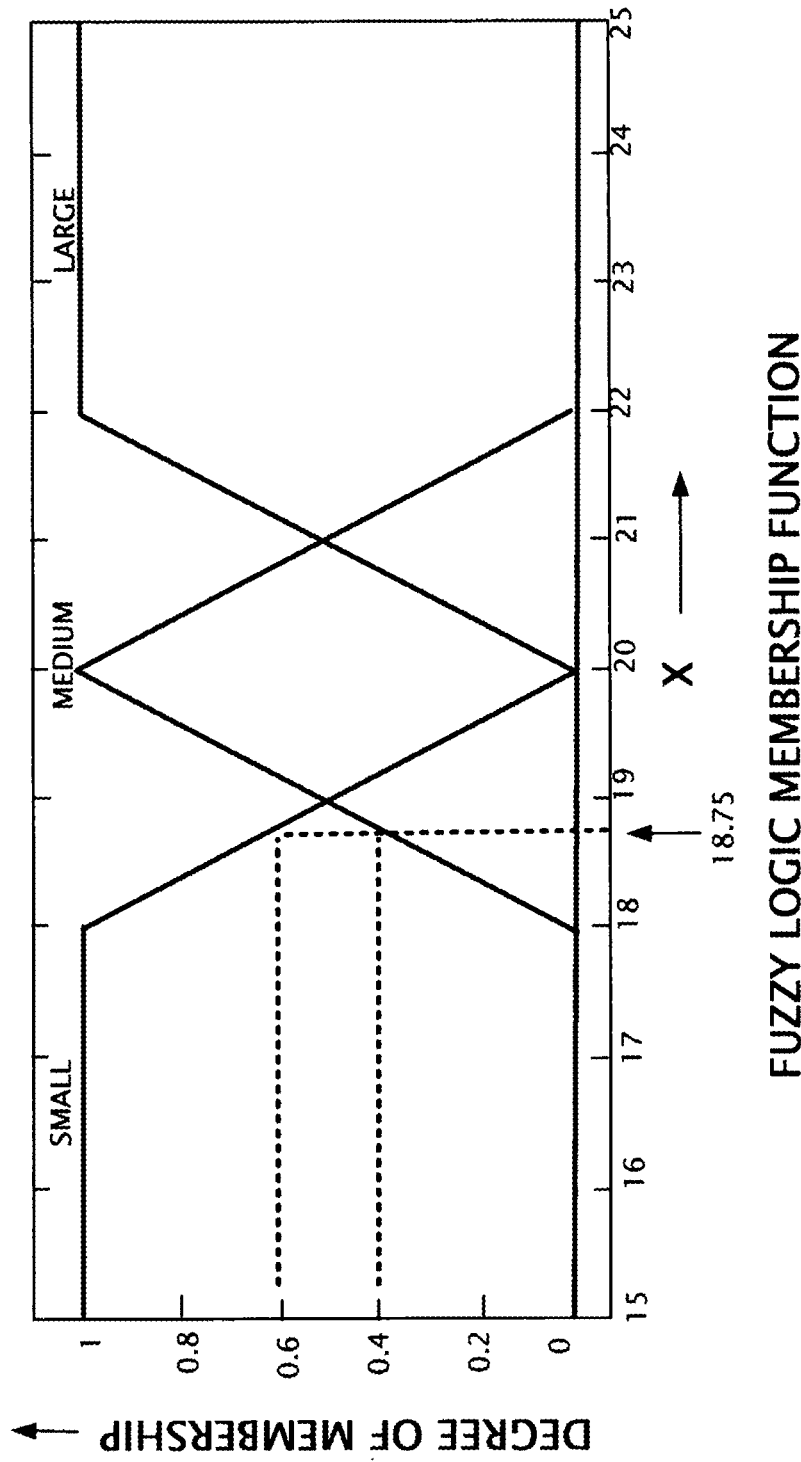

FIG. 7D describes a fuzzy logic membership function.

Figure 7E:
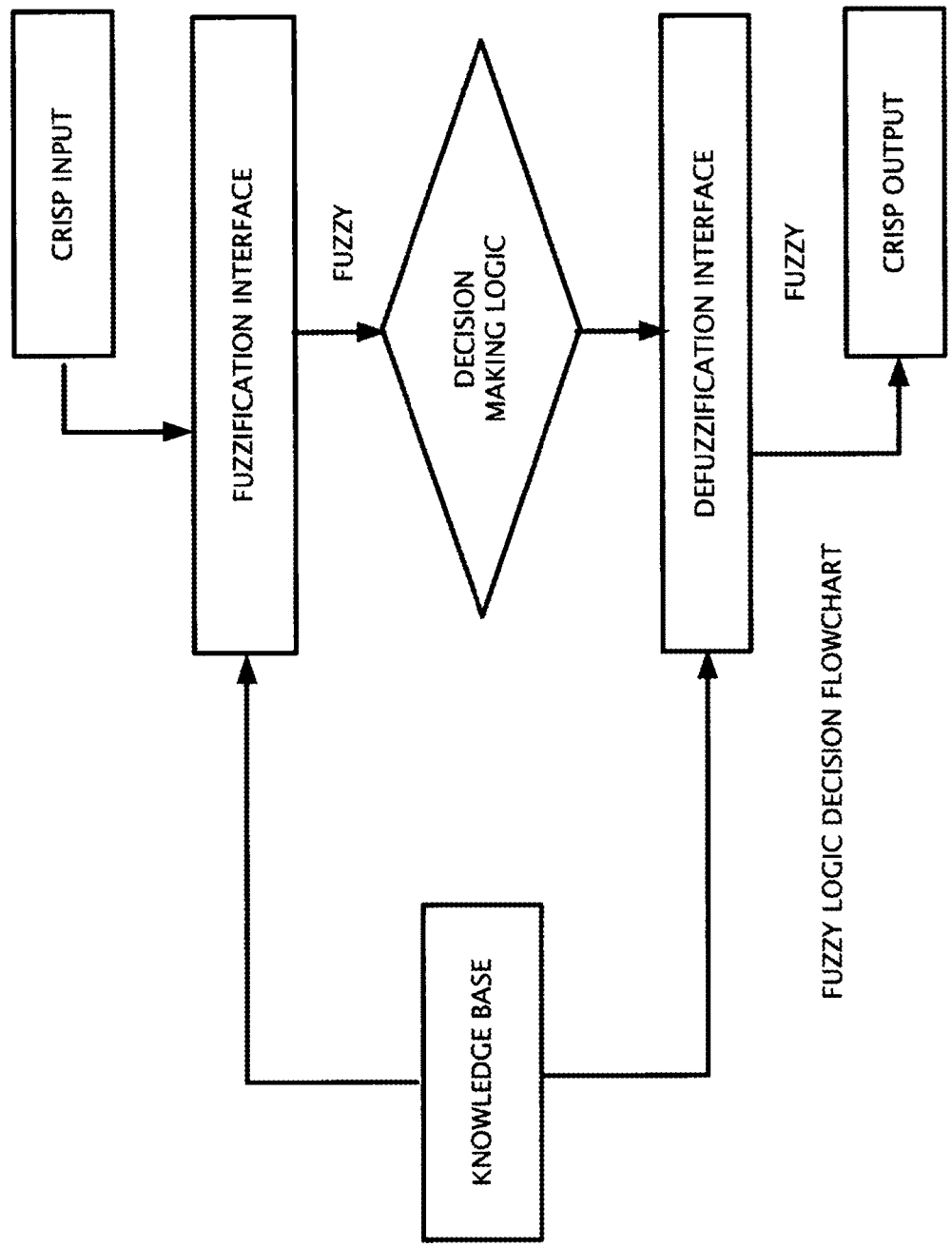

FIG. 7E describes a decision flow chart of the fuzzy logic algorithm module of the requirement, compliance and resource management methodology 120, as described in FIG. 7A.

Tables 8A, 8B, 8C, 8D and 8E describe the features and benefits of the requirement, compliance and resource management methodology 120, as described in FIG. 7A. Features and benefits Table 8A describes specific features and benefits of 100A of the requirement, compliance and resource management methodology 120 in FIG. 7A. Features and benefits Table 8B describes specific features and benefits of 100B, 100C and 100D of the requirement, compliance and resource management methodology 120 in FIG. 7A. Features and benefits Table 8C describes specific features and benefits of 100D, 100E and 100F of the requirement, compliance and resource management methodology 120 in FIG. 7A. Features and benefits Table 8D describes specific features and benefits of 100F of the requirement, compliance and resource management methodology 120 in FIG. 7A. Features and benefits Table 8E describes specific features and benefits of 100F, 100A1, 100C1 and 100F1 of the requirement, compliance and resource management methodology 120 in FIG. 7A.

Figure 9A:
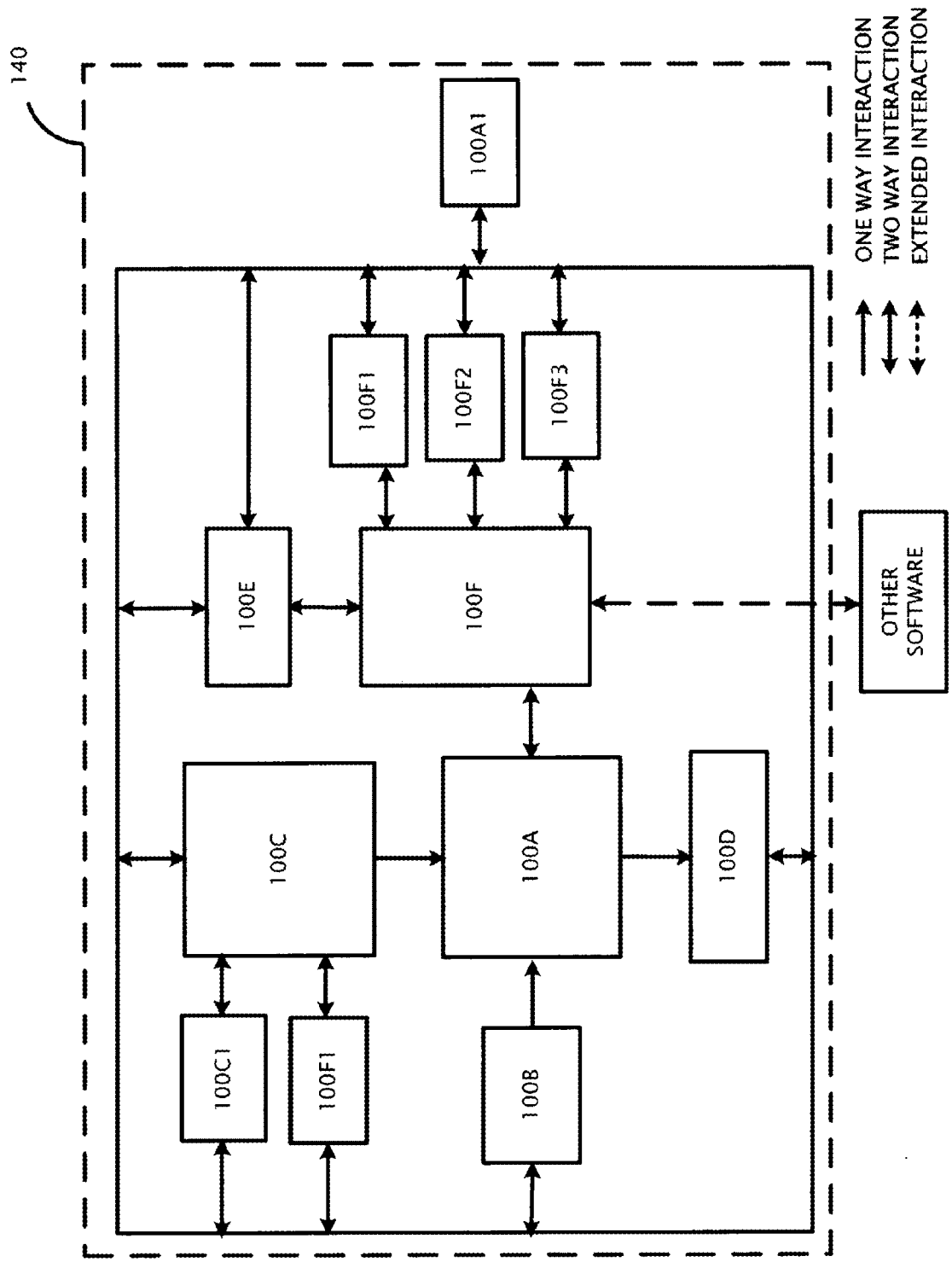

FIG. 9A (block diagram) describes another embodiment of the requirement, compliance and resource management methodology 140, further enhanced by a question/answer format of requirement input, a fuzzy logic algorithm module, a statistical algorithm module and a weighting logic algorithm module.

Figure 9B:
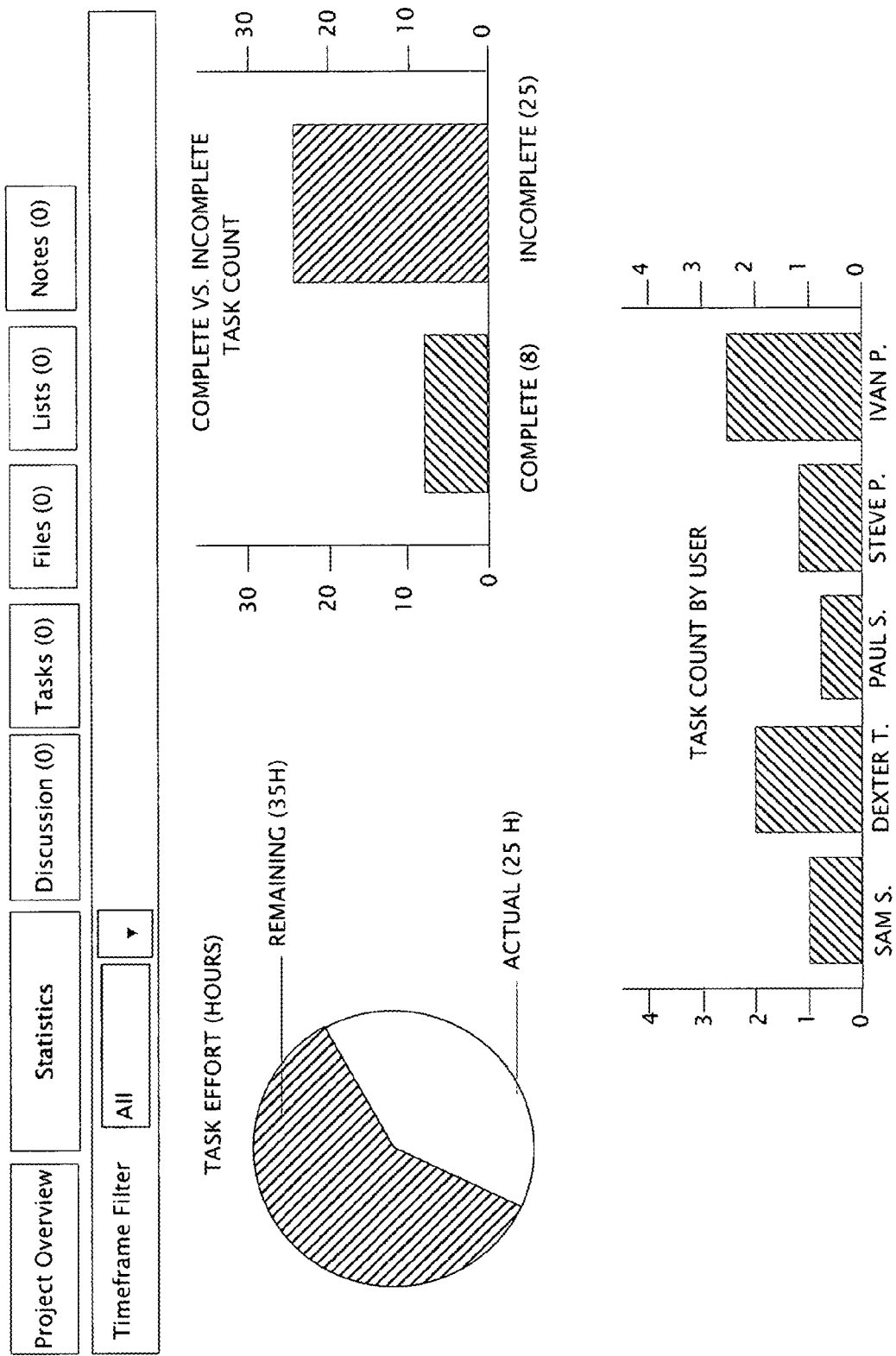

FIG. 9B describes an application of the statistical module of the requirement, compliance and resource management methodology 140, as described in FIG. 9A.

Figure 9C:
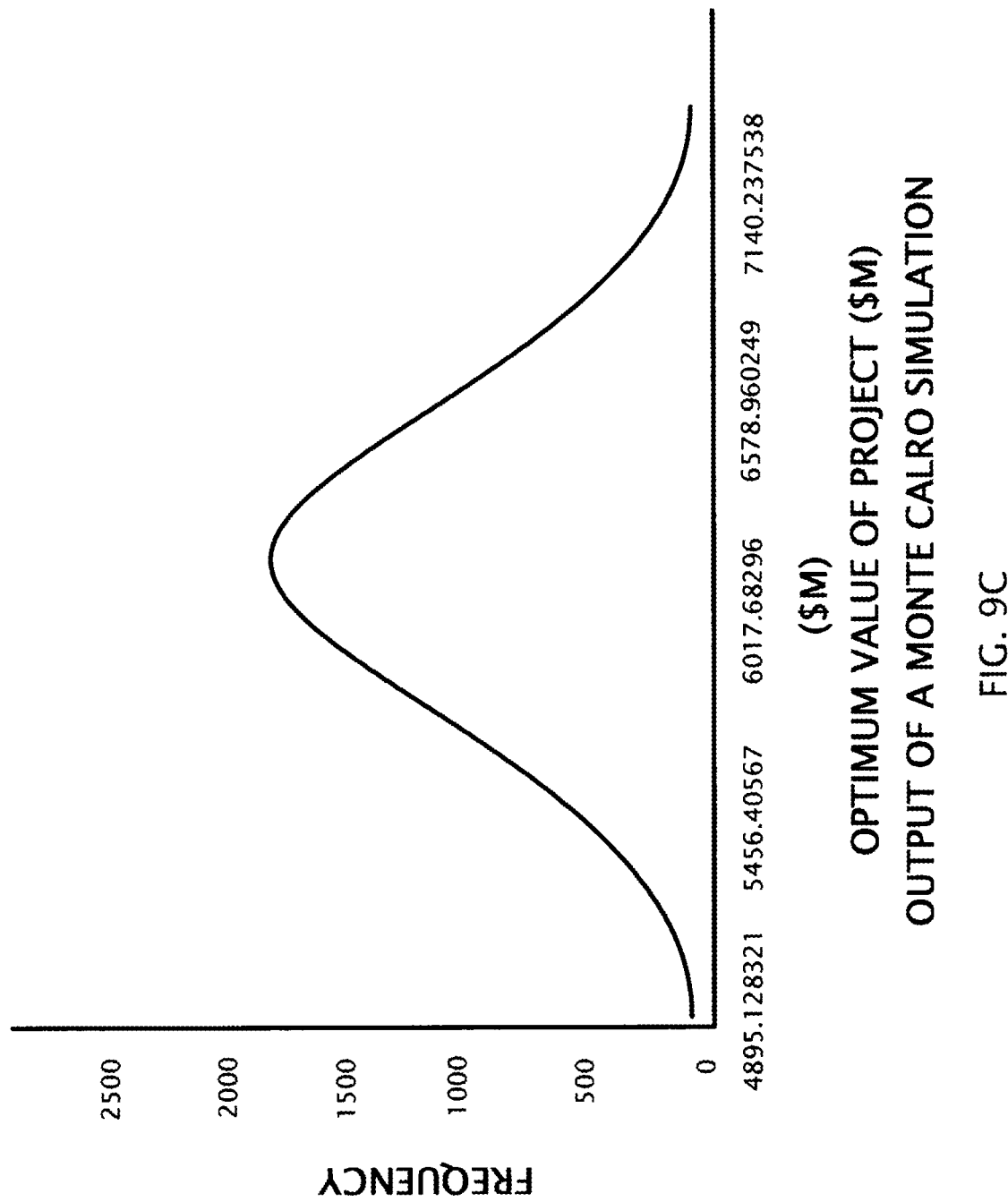
Figure 9D:
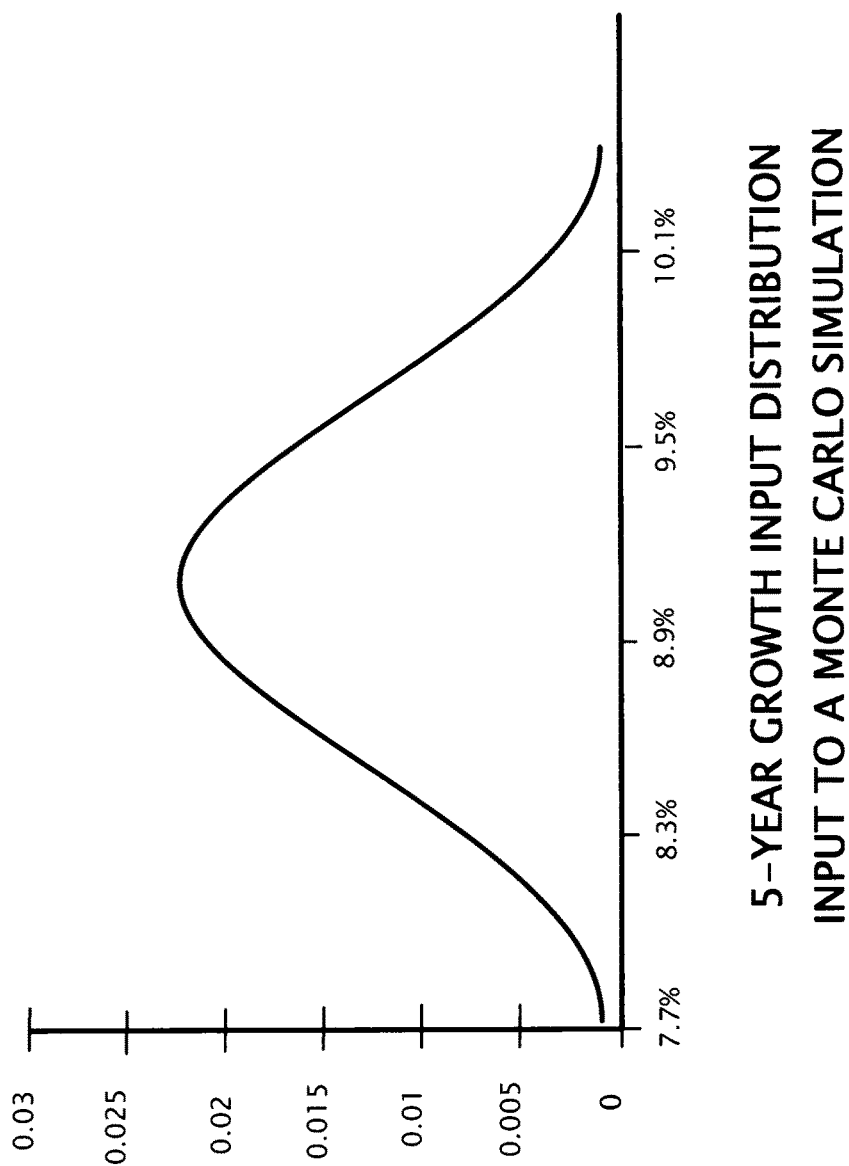
Figure 9E:
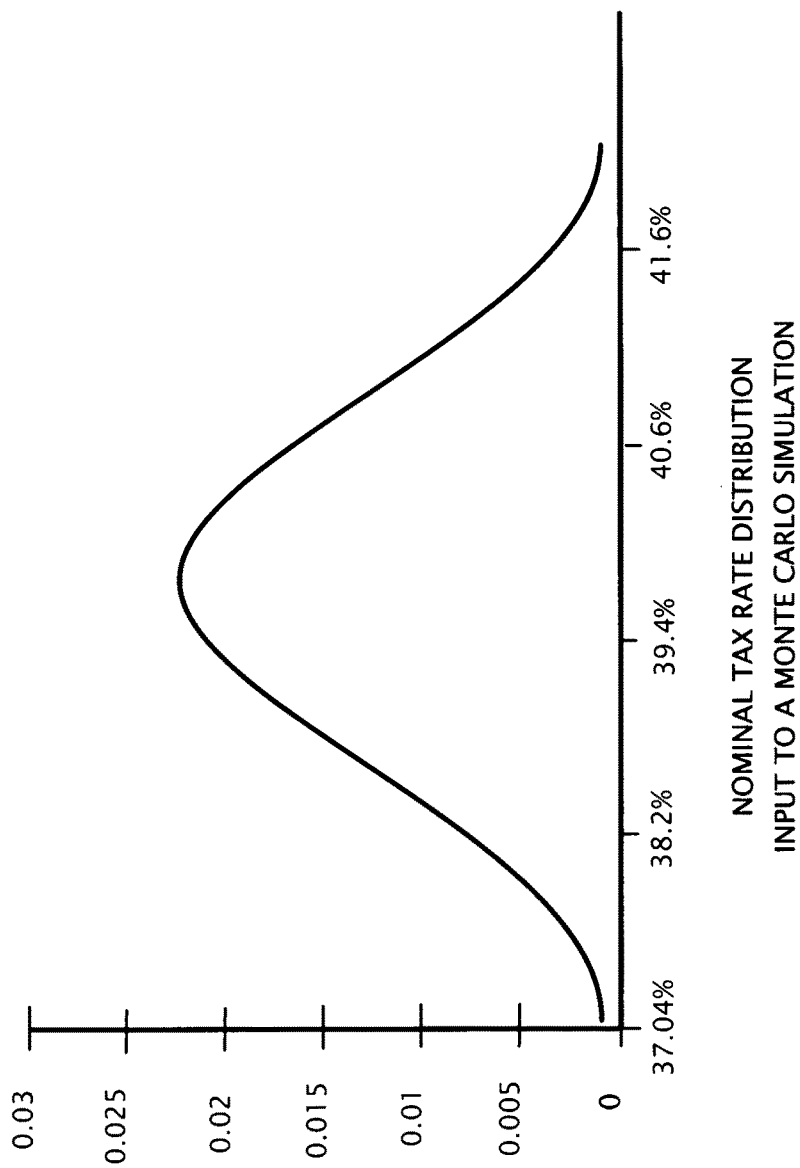
Figure 9F:
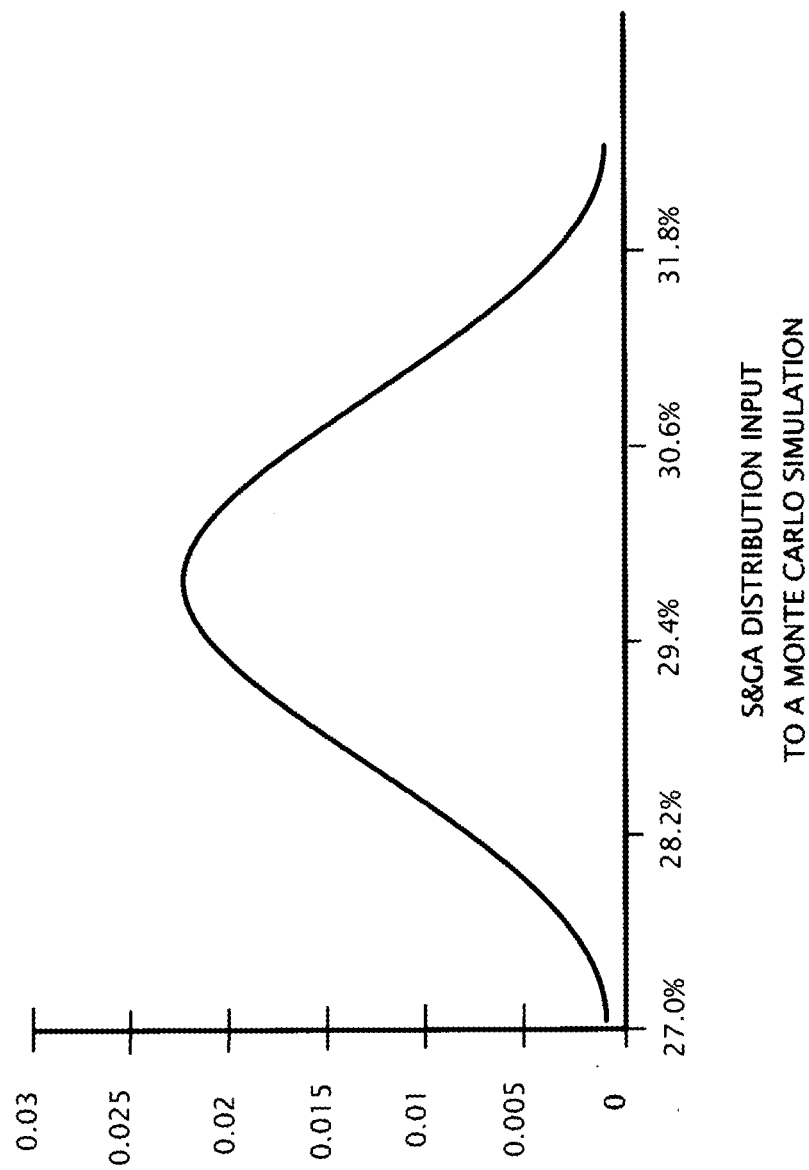

FIGS. 9C (statistical distribution plot), 9D (statistical distribution plot), 9E (statistical distribution plot) and 9F (statistical distribution plot) describe an application of a Monte Carlo simulation of the requirement, compliance and resource management methodology 140, as described in FIG. 9A. For example, FIG. 9C describes an optimum value distribution of a project, as an output of a Monte Carlo simulation. FIG. 9D describes a 5-year growth distribution, as an input to a Monte Carlo simulation. FIG. 9E describes a nominal tax distribution, as an input to a Monte Carlo simulation. FIG. 9F describes a sales and general/administrative expense (S&GA) distribution, as an input to a Monte Carlo simulation.

Figure 9G:
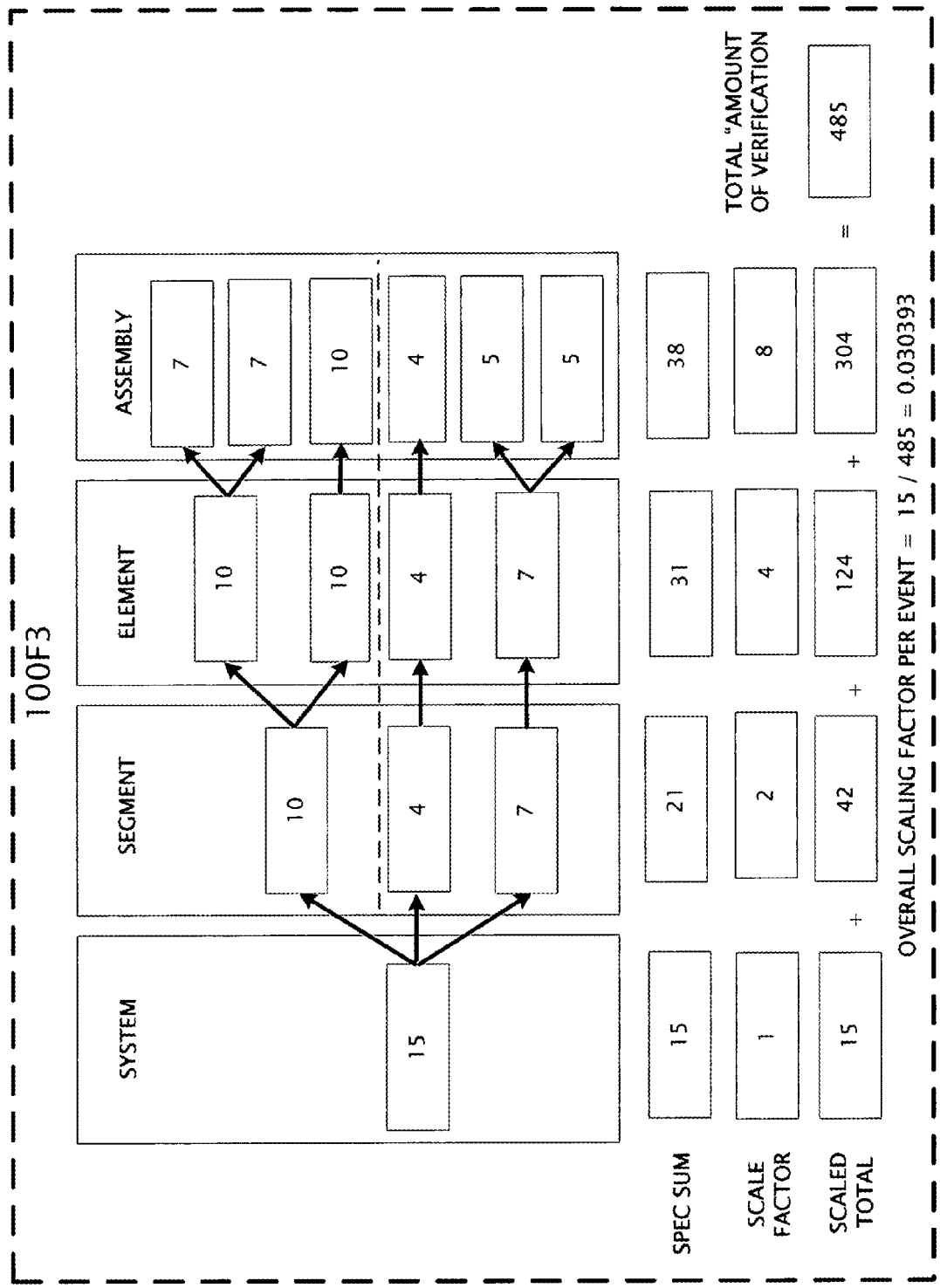
Figure 9H:
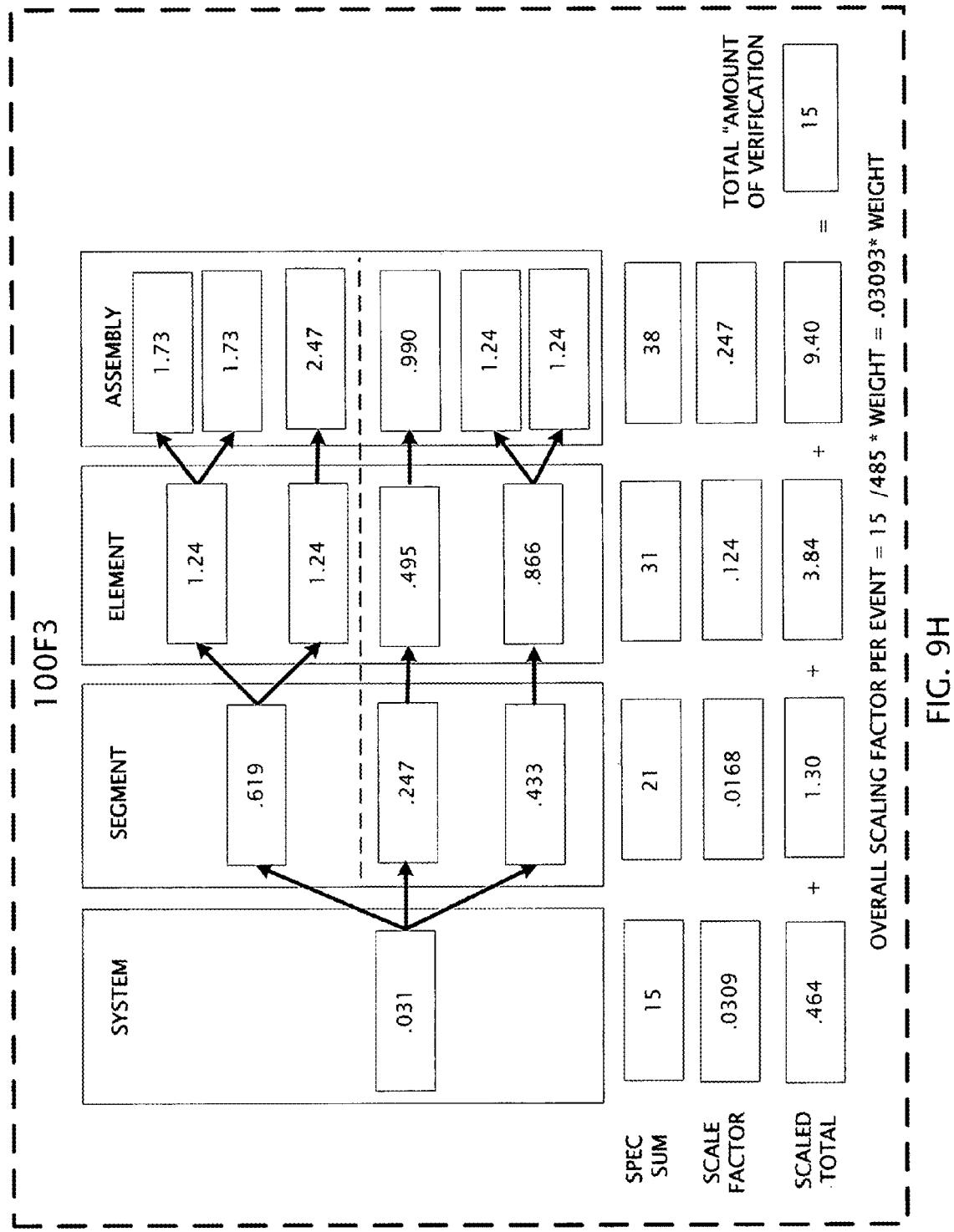
Figure 91:
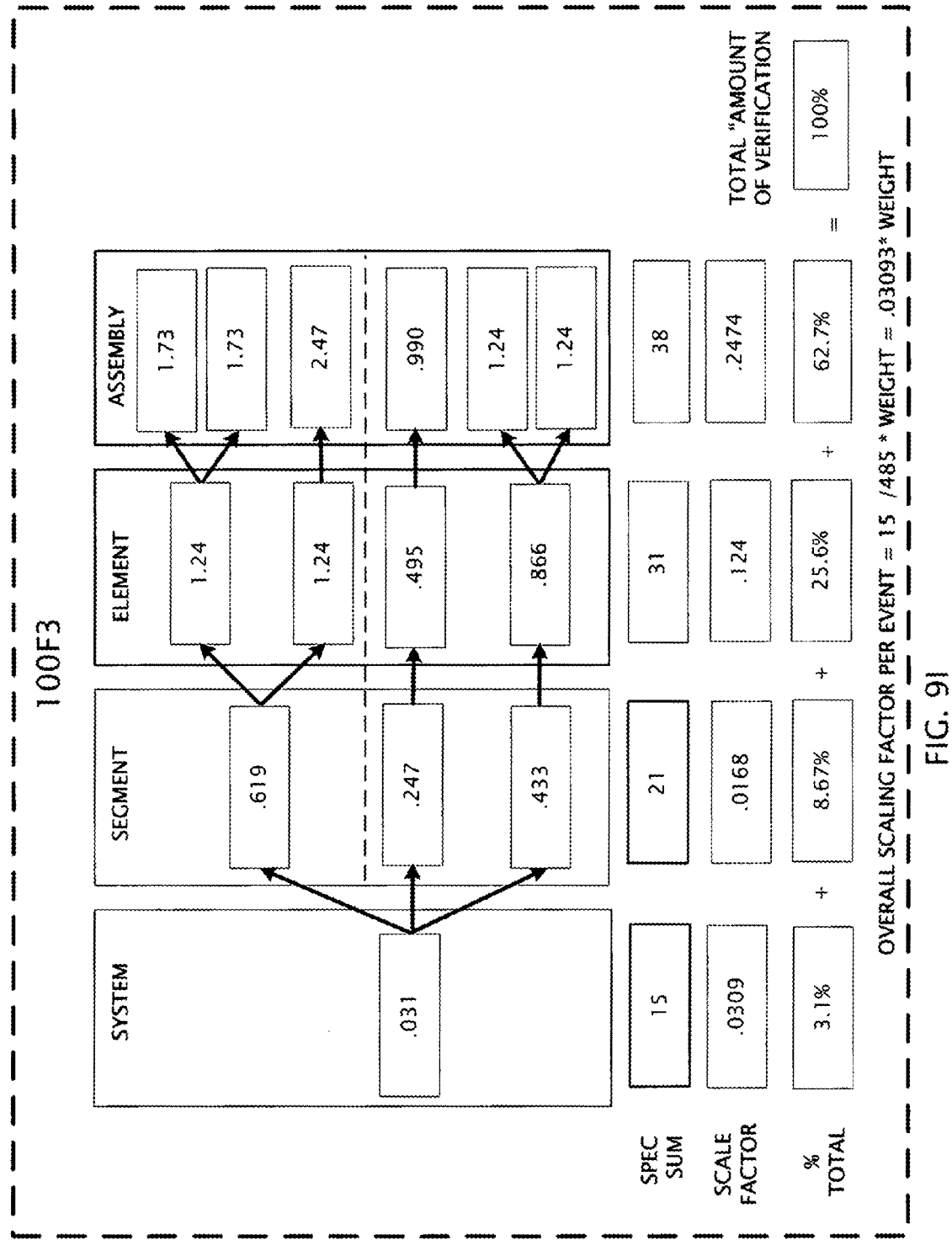

FIGS. 9G, 9H and 9I describe an embodiment of the weighting logic module of the requirement, compliance and resource management methodology 140, as described in FIG. 9A. For example, FIG. 9G describes a scaled total importance for an event (considering system, segment, element and assembly operations). FIG. 9H describes a scaled fraction for an event (considering system, segment, element and assembly operations). FIG. 9I describes a scaled % factor for an event (considering system, segment, element and assembly operations).

Tables 10A, 10B, 10C, 10D, 10E and 10F describe the features and benefits of the requirement, compliance and resource management methodology 140, as described in FIG. 9A. Features and benefits Table 10A describes specific features and benefits of 100A of the requirement, compliance and resource management methodology 140 in FIG. 9A. Features and benefits Table 10B describes specific features and benefits of 100A, 100B, 100C and 100D of the requirement, compliance and resource management methodology 140 in FIG. 9A. Features and benefits Table 10C describes specific features and benefits of 100D, 100E and 100F of the requirement, compliance and resource management methodology 140 in FIG. 9A. Features and benefits Table 10D describes specific features and benefits of 100F of the requirement, compliance and resource management methodology 140 in FIG. 9A. Features and benefits Table 10E describes specific features and benefits of 100F, 100A1 and 100C1 of the requirement, compliance and resource management methodology 140 in FIG. 9A. Features and benefits Table 10F describes specific features and benefits of 100F1, 100F2 and 100F3 of the requirement, compliance and resource management methodology 140 in FIG. 9A.

Figure 1:
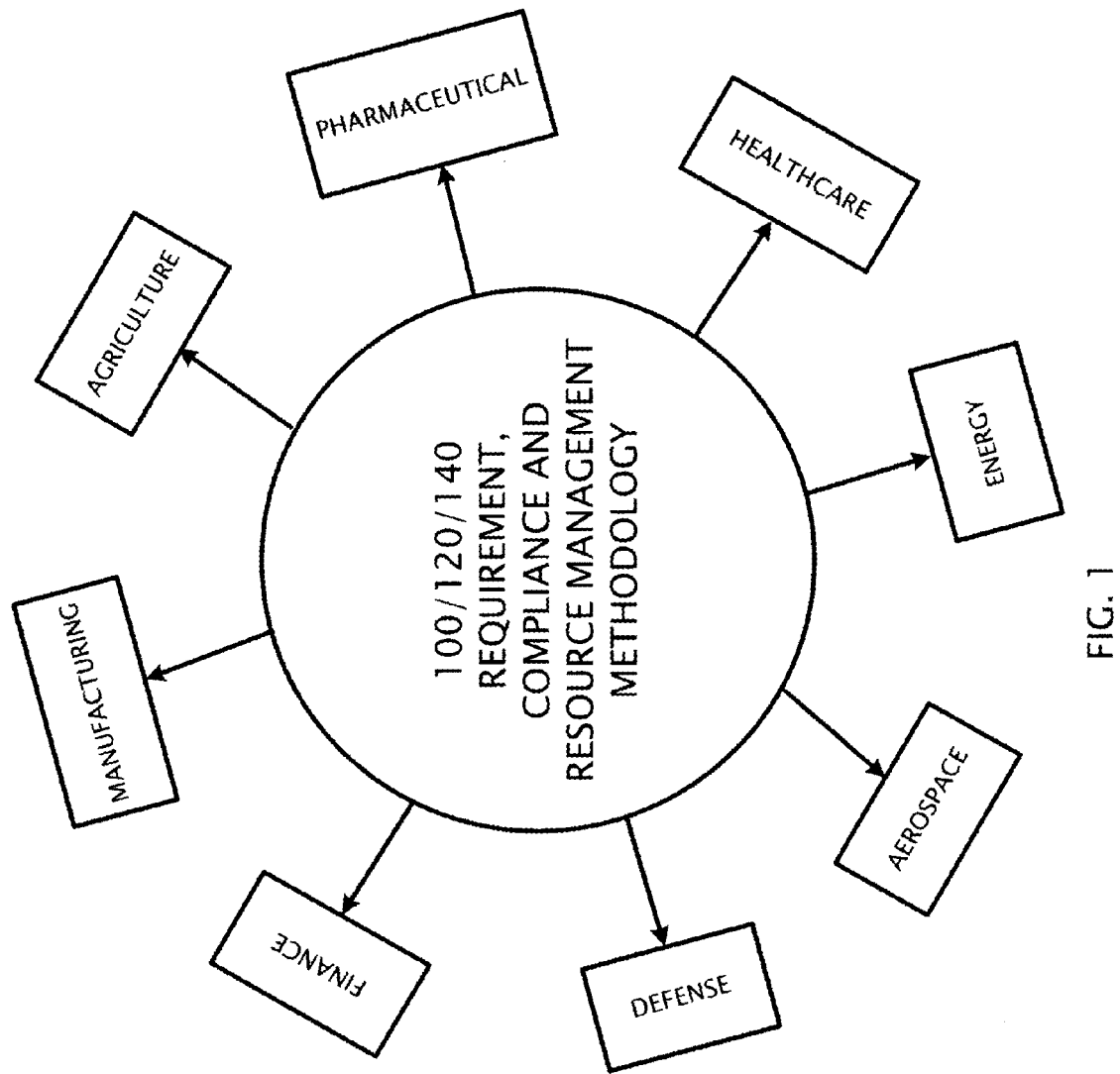
FIG. 1 (schematic diagram) describes various applications of the requirement, compliance and resource management methodology.
Figure 2:
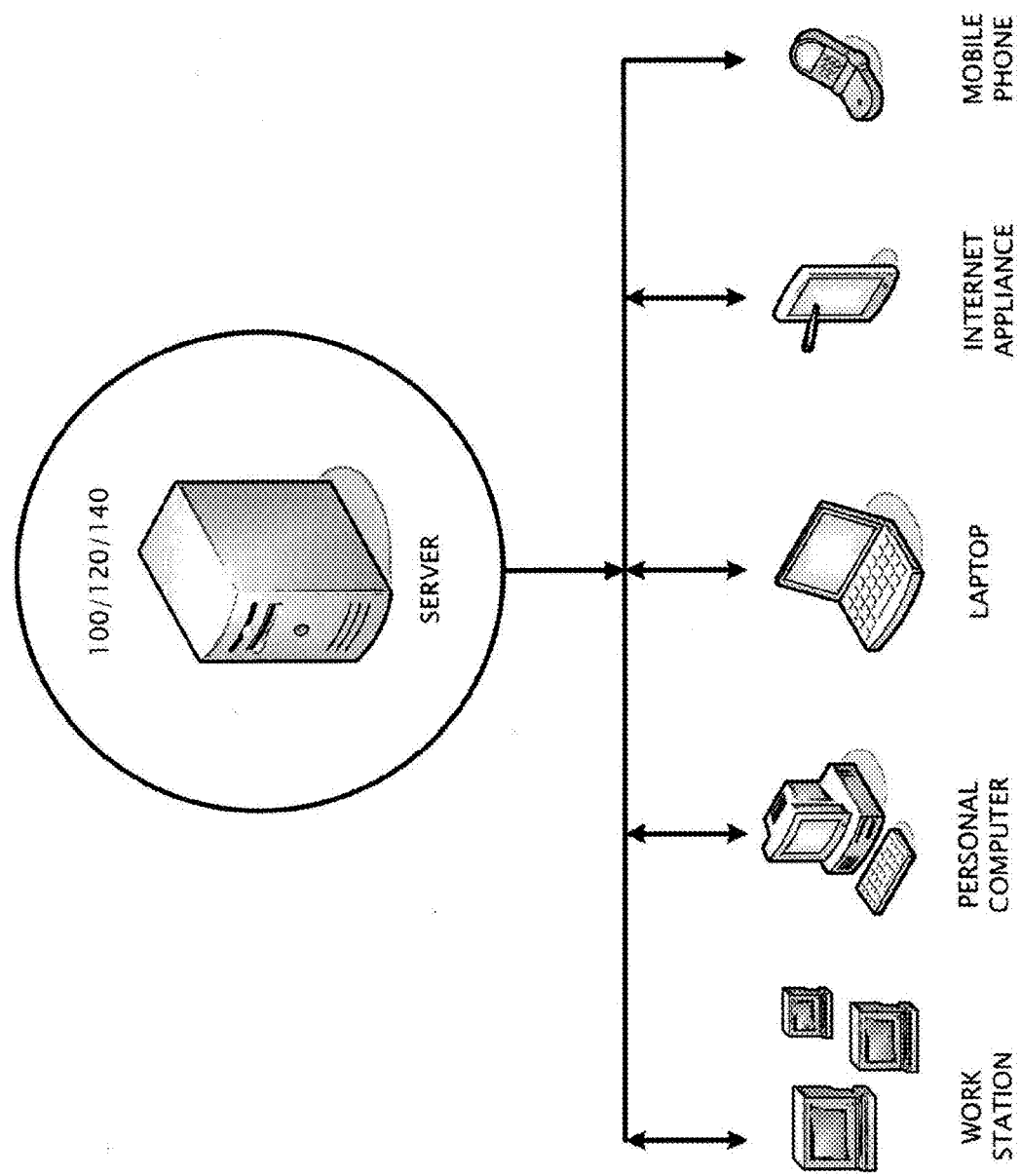
FIG. 2 (schematic diagram) describes the connectivity (both one-way and two-way connectivity) of the requirement, compliance and resource management methodology (located at an enterprise server) with other external systems and/or devices.
Figure 11A:
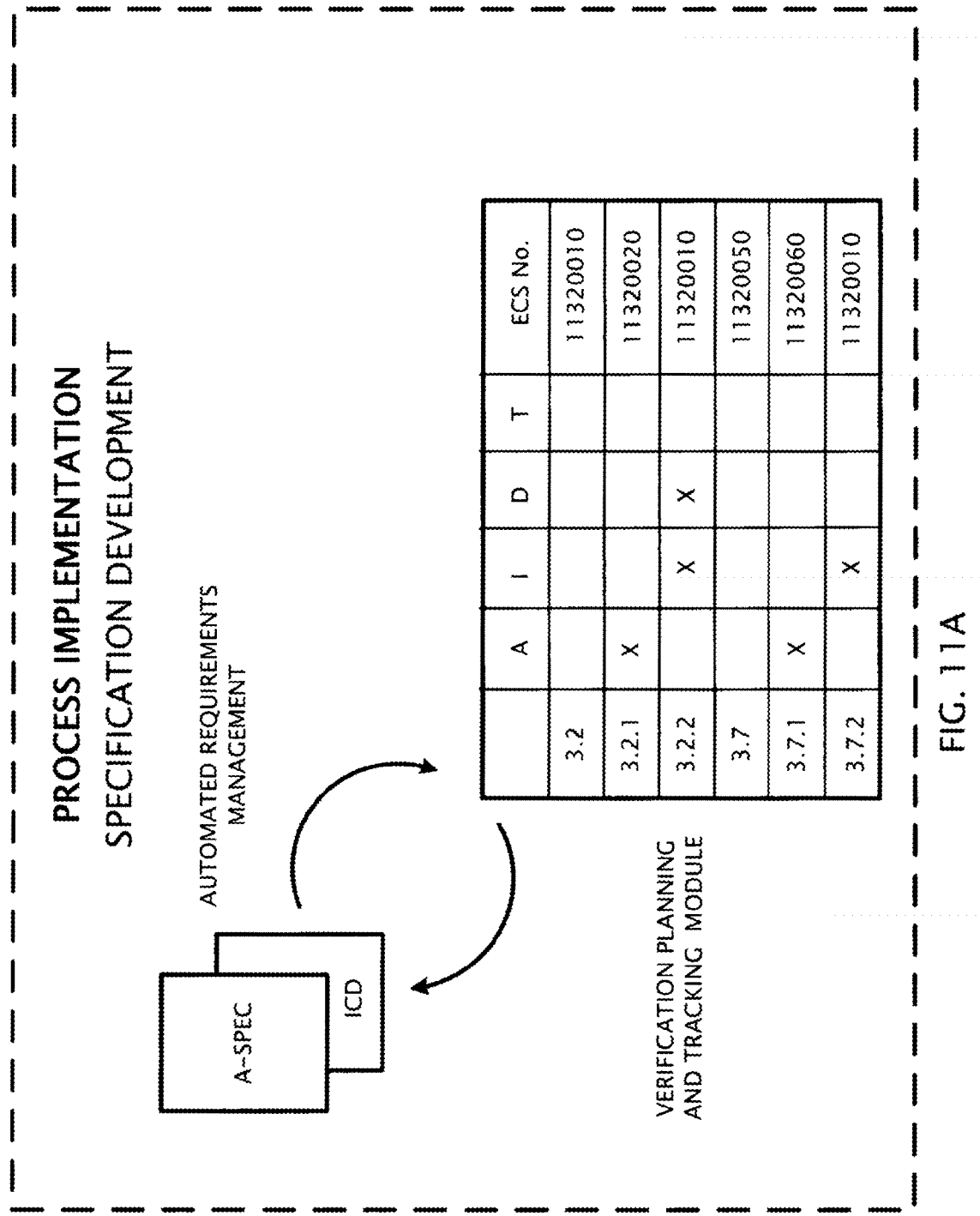
Figure 11F:
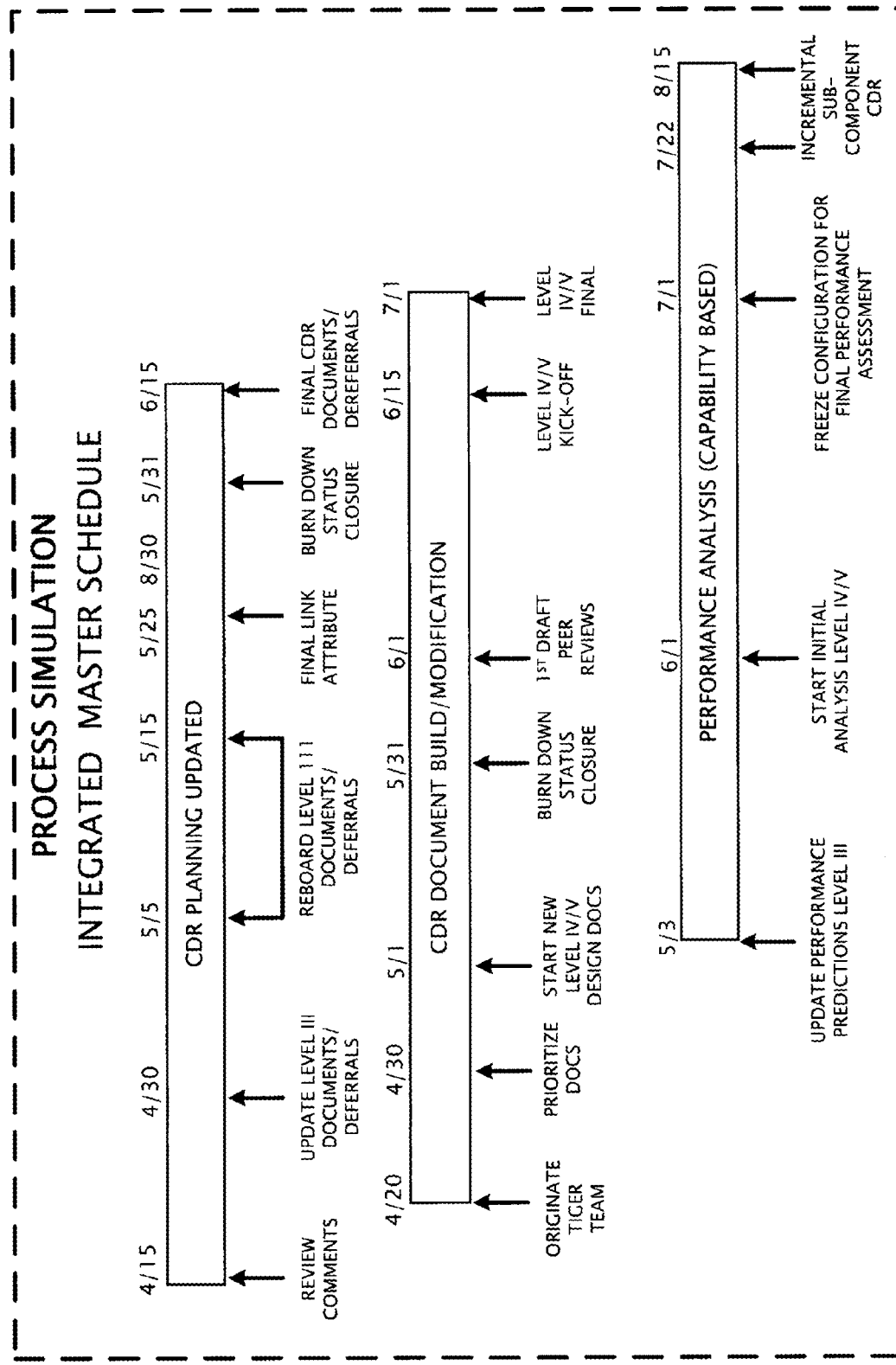
Figure 11G:
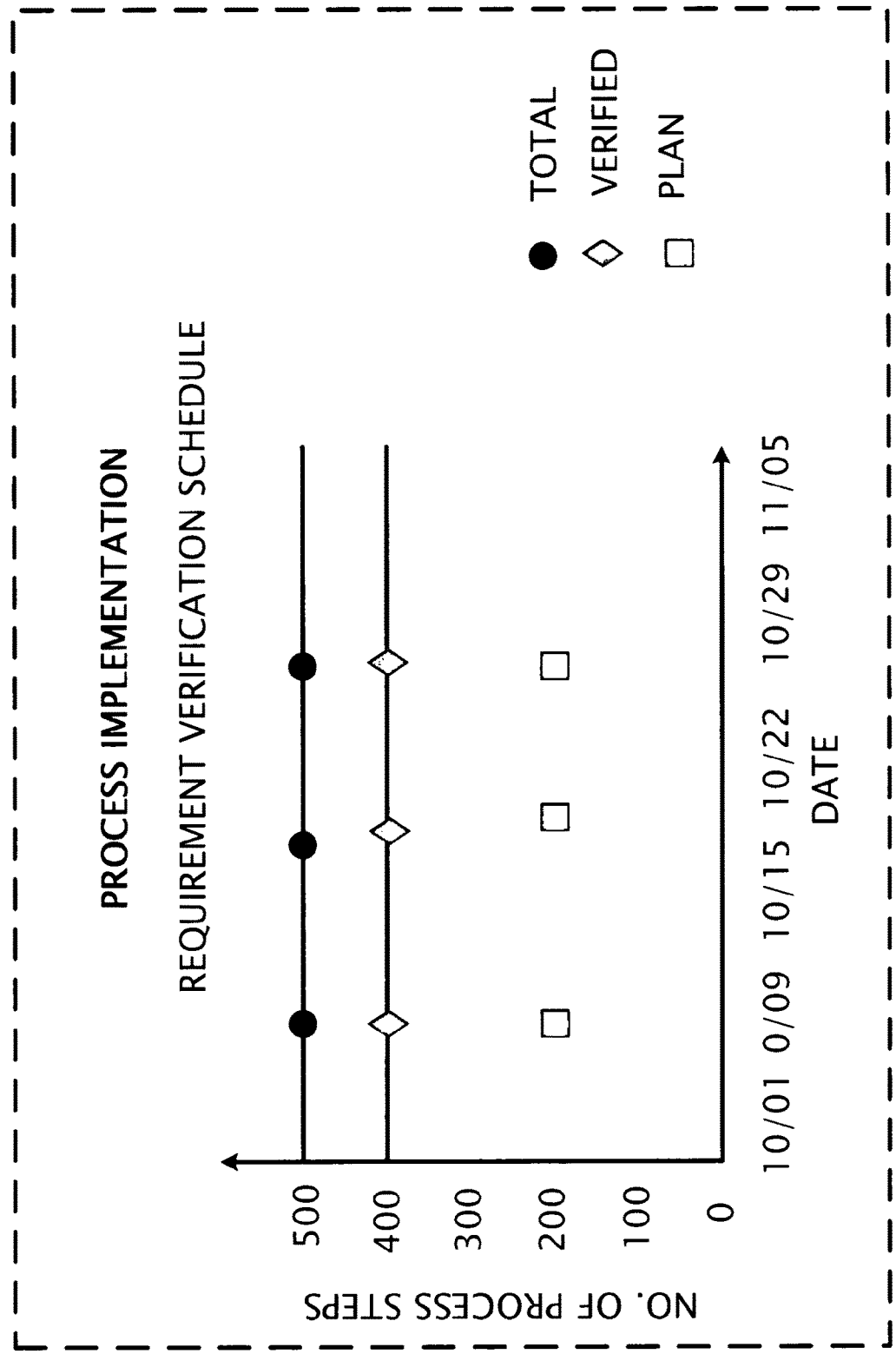

FIGS. 11A (schematic chart), 11B (schematic chart), 11C (schematic chart), 11D (schematic chart), 11E (schematic chart), 11F (schematic chart) and 11G (schematic chart) describe details of a typical process implementation. FIG. 11A describes an overview of a typical process implementation. FIG. 11B describes a granular view of a typical process implementation, connecting with FIG. 11A. FIG. 11C describes a granular view of a typical process implementation, connecting with FIG. 11B. FIG. 11D describes a granular view of a typical process implementation, connecting with FIGS. 11C and 11E (wherein FIG. 11E consists of FIG. 11E1 and FIG. 11E2). FIG. 11E1 describes simulator specification of an example subsystem 1. FIG. 11E2 describes simulator specification of an example subsystem 2. FIG. 11F describes an example integrated master schedule. FIG. 11G describes how a section of the integrated master schedule (e.g., a requirement verification schedule) compares with total process steps, verified process steps and planned process steps.

Figure 12A:
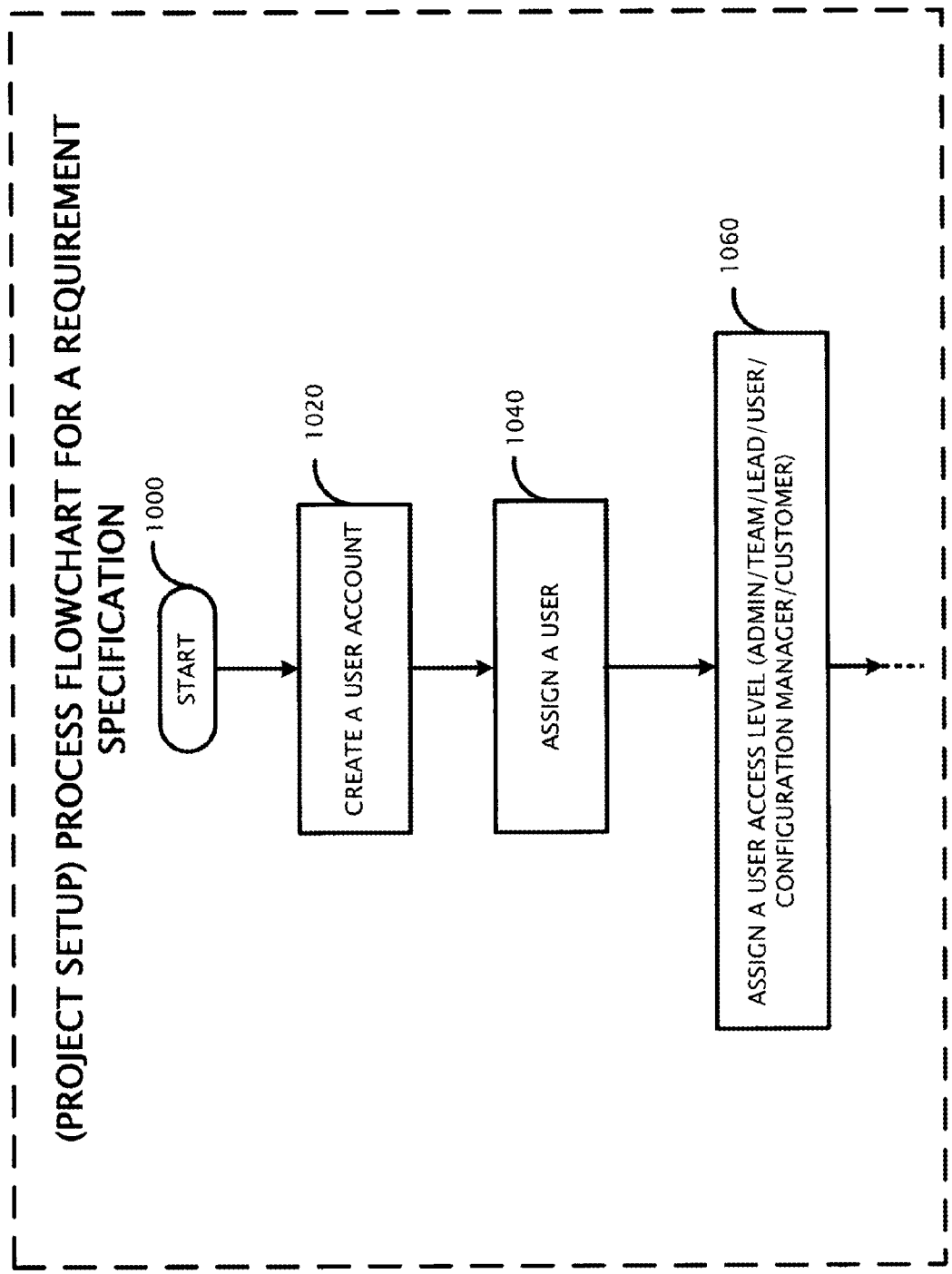
Figure 12B:
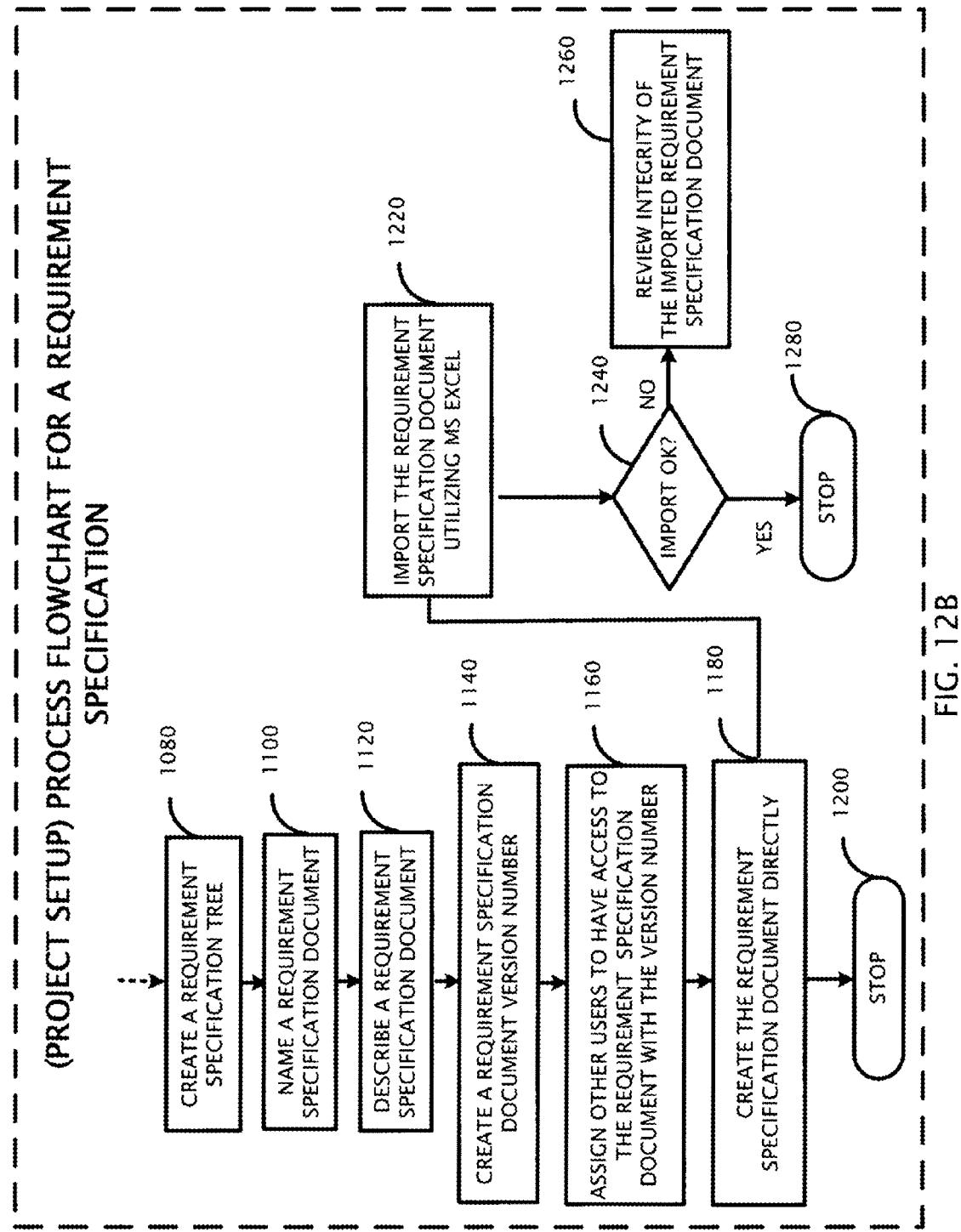

FIGS. 12A and 12B describe a process flowchart for a requirement specification within a project setup. FIG. 12B is continuation of FIG. 12A.

Figure 13:
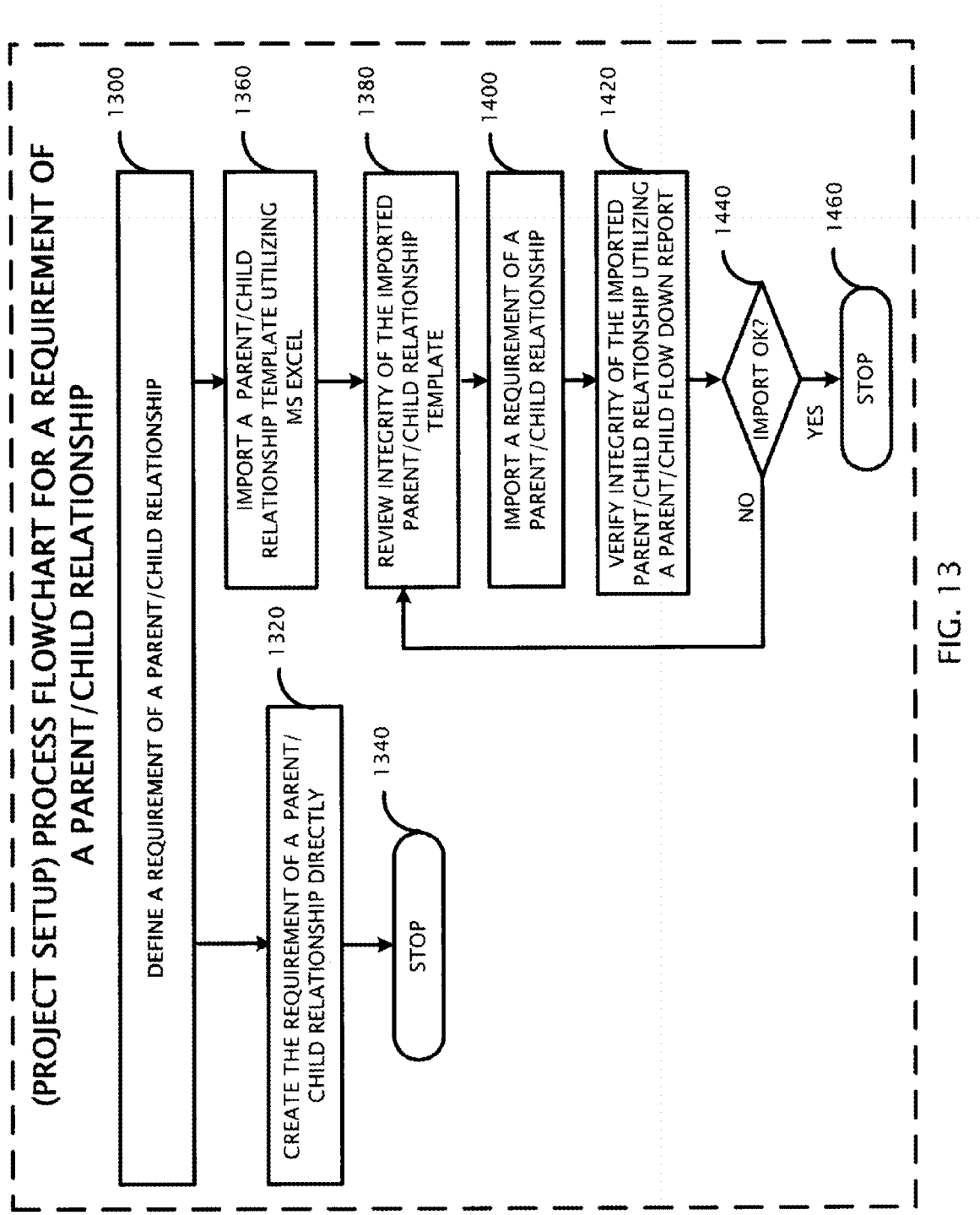

FIG. 13 describes a process flowchart for a requirement of a parent/child (also known as master/slave) relationship within a project setup.

Figure 14:
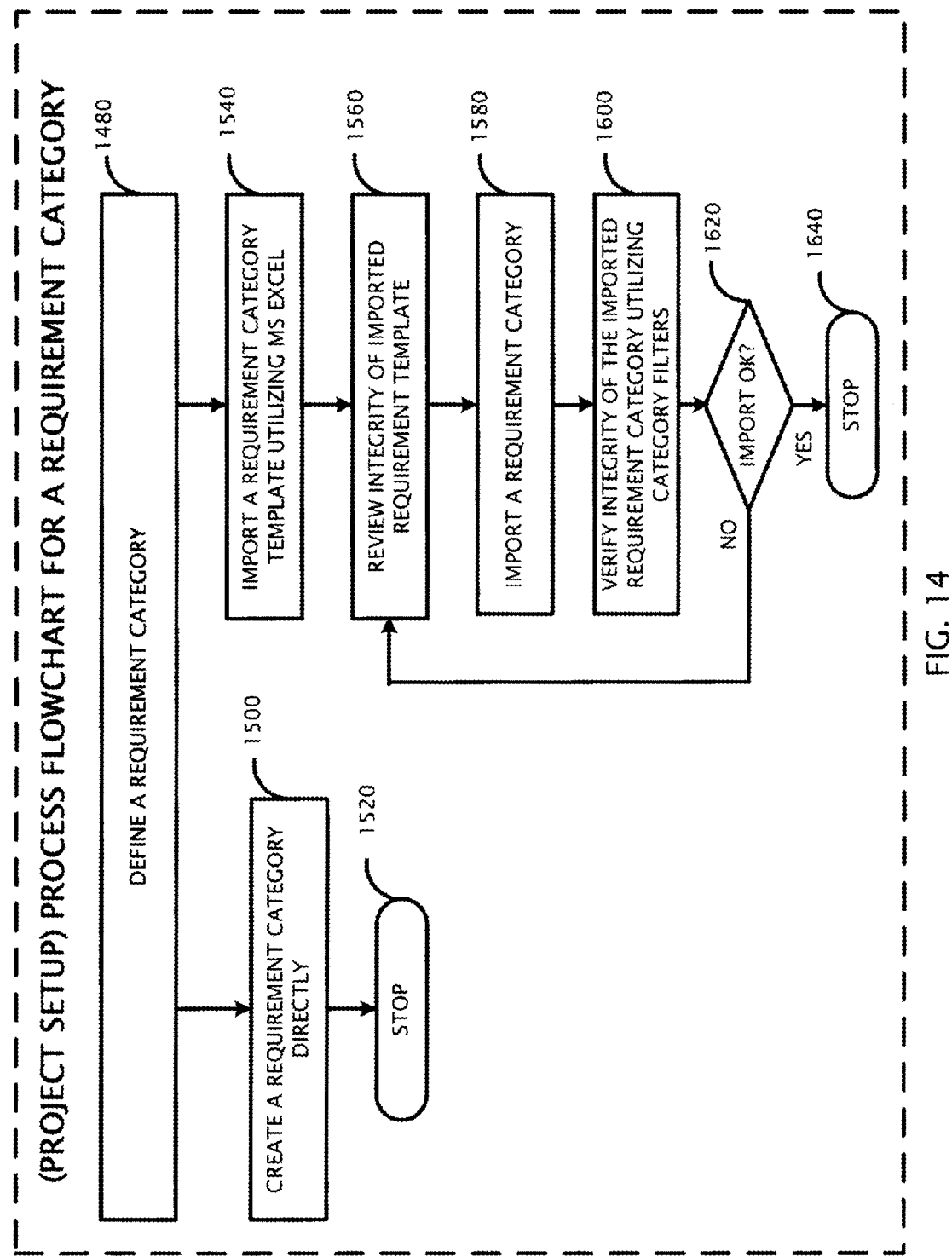

FIG. 14 describes a process flowchart for a requirement category within a project setup.

Figure 15:
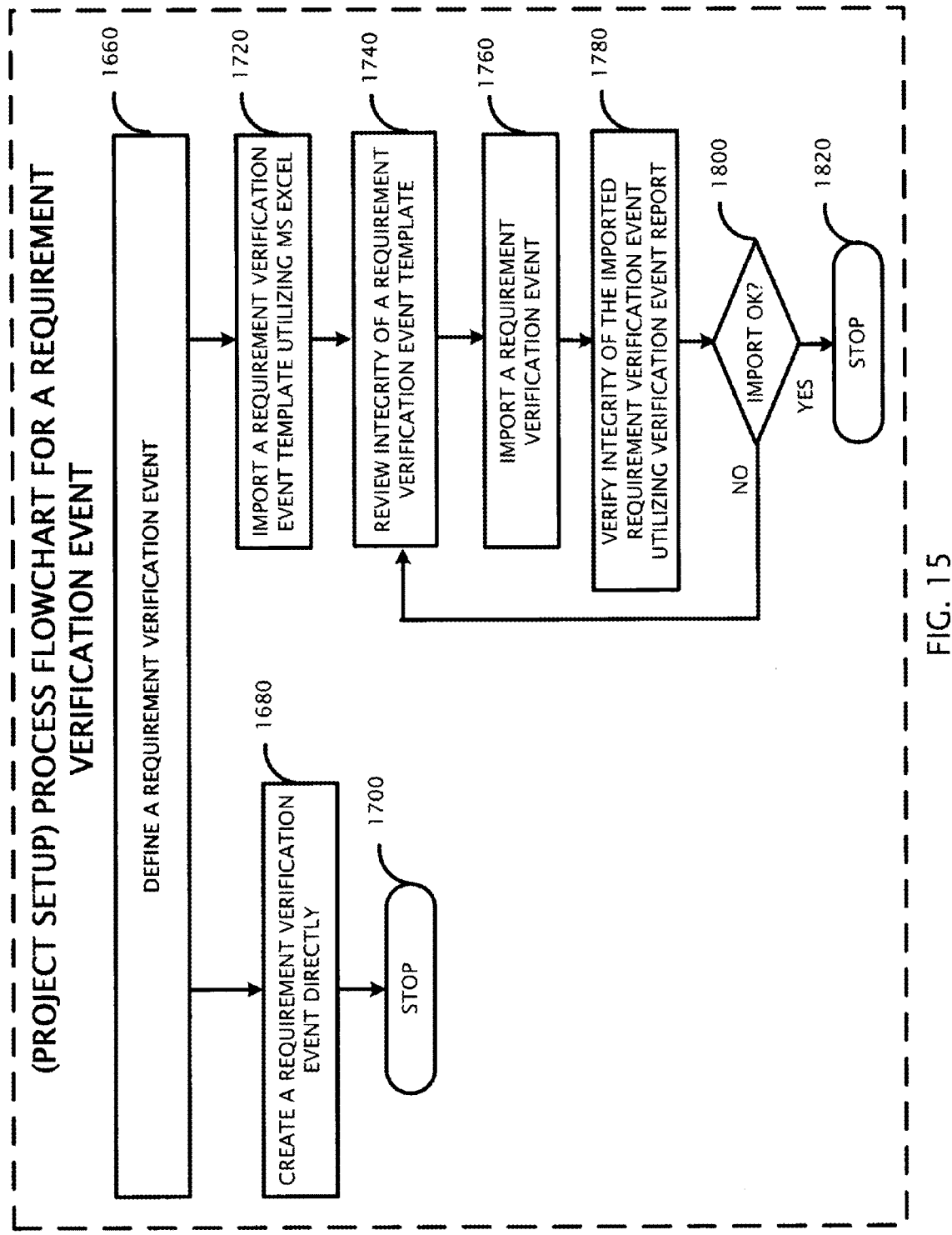

FIG. 15 describes a process flowchart for a requirement verification event within a project setup.

Figure 16:
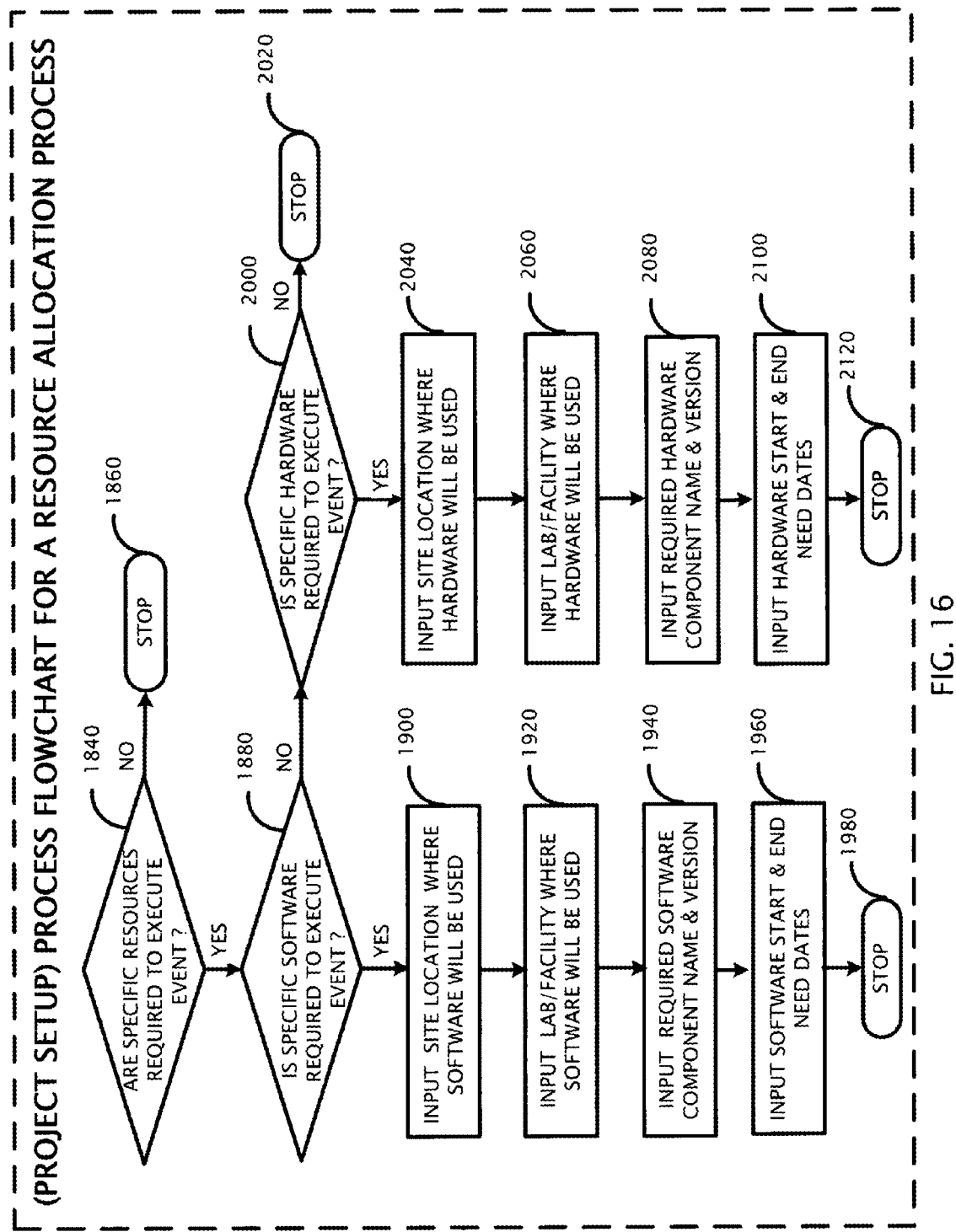

FIG. 16 describes a process flowchart for a resource allocation process within a project setup.

Figure 17A:
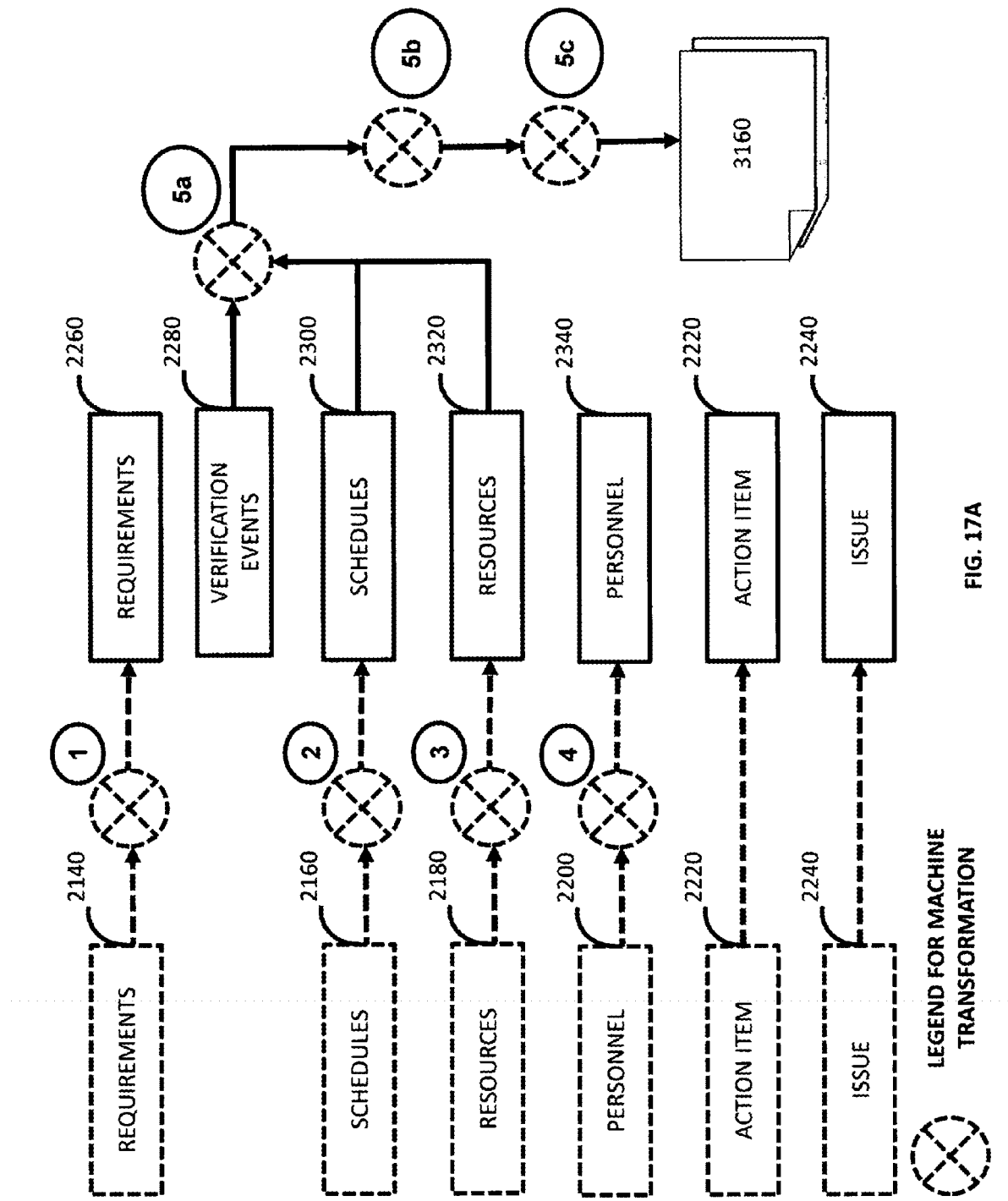

FIG. 17A describes requirements, schedules, resources and personnel before the machine transformation.

Figure 17B:
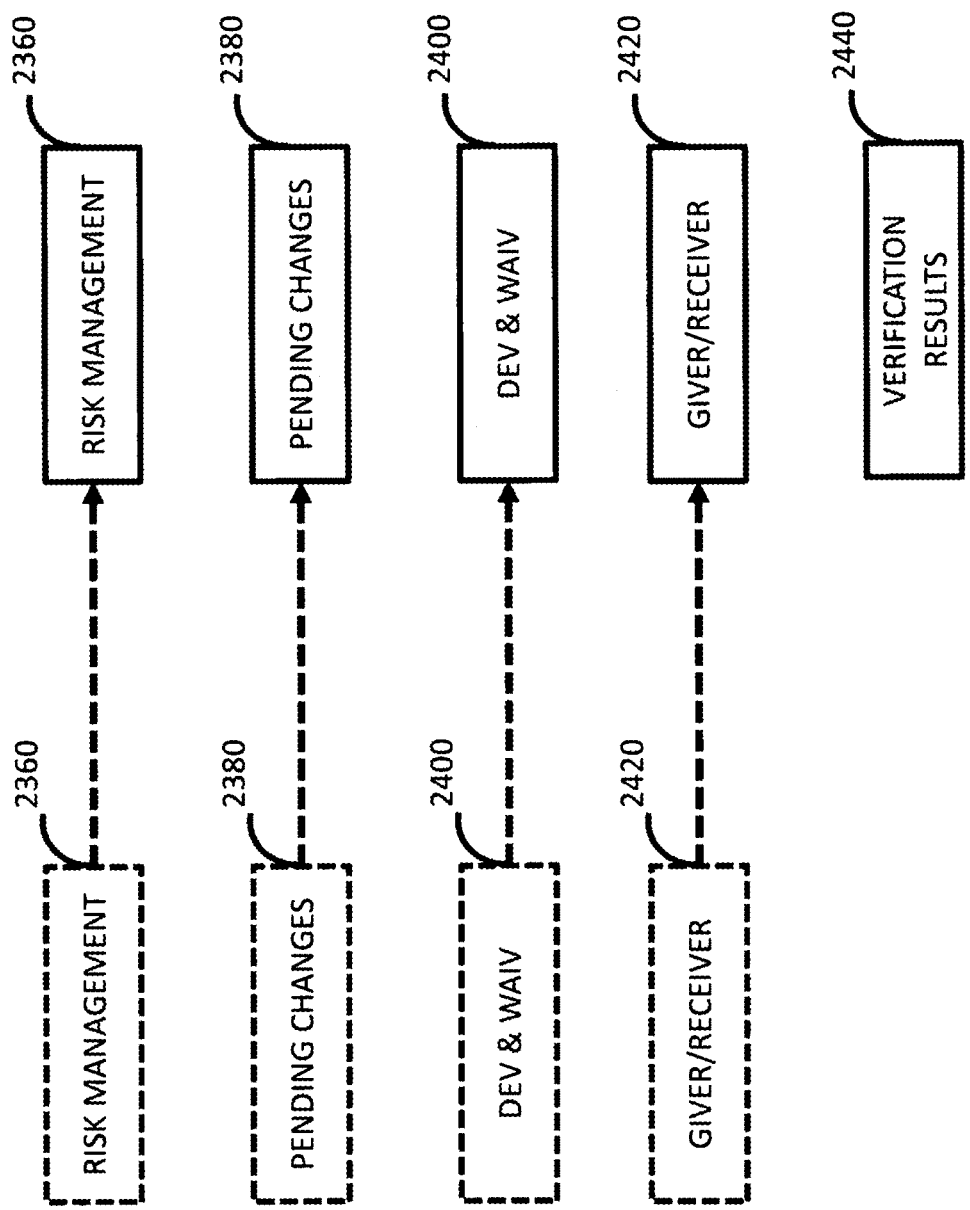

FIG. 17B describes risk management, pending changes, deviation and waiver ("dev & waiv"), giver/receiver and verification.

Figure 18B:
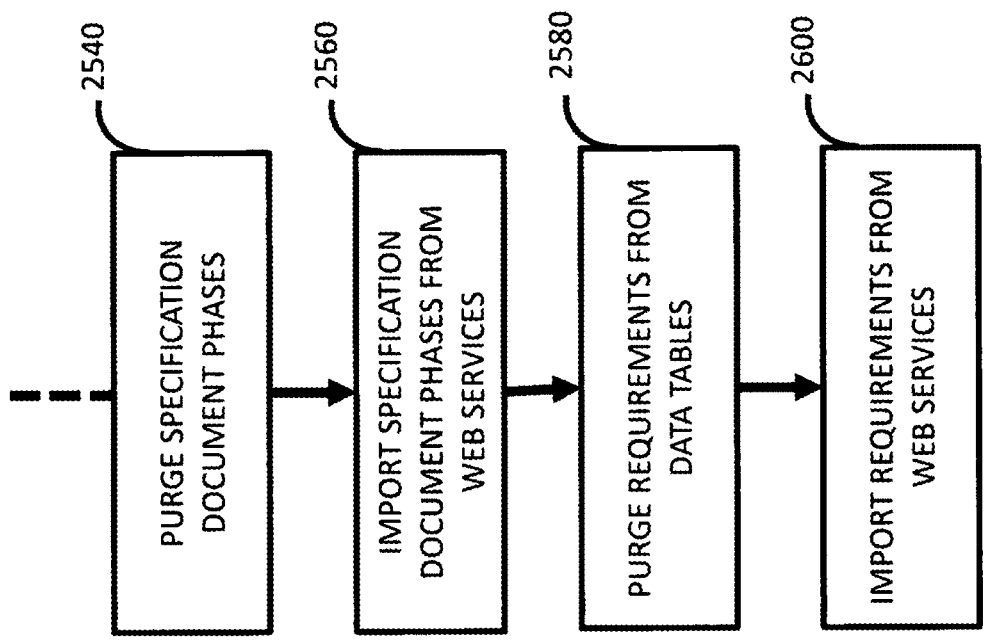

FIGS. 18A and 18B describe the machine transformation of requirements. FIG. 18B is the continuation of FIG. 18A.

Figure 19:
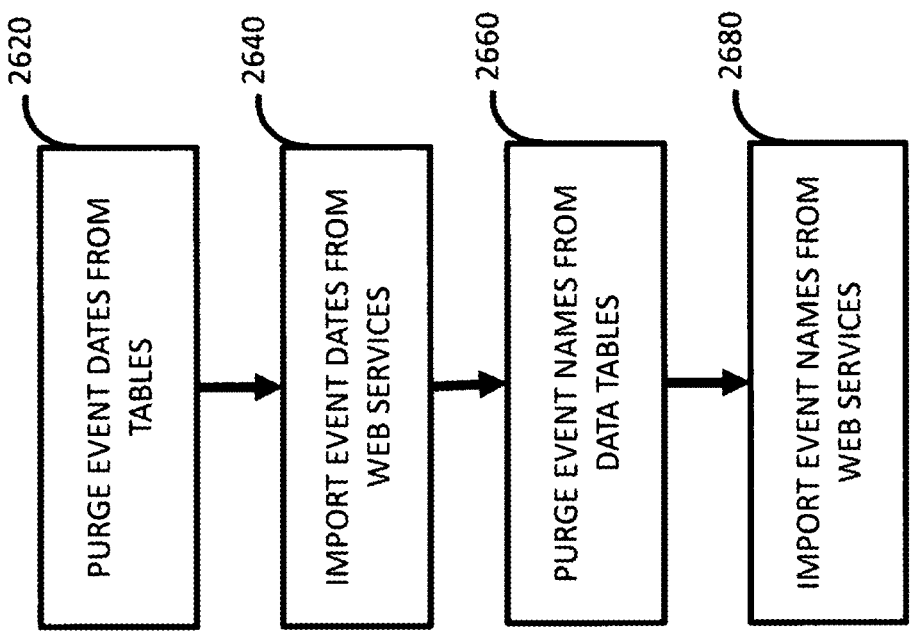

FIG. 19 describes the machine transformation of schedules.

Figure 20A:
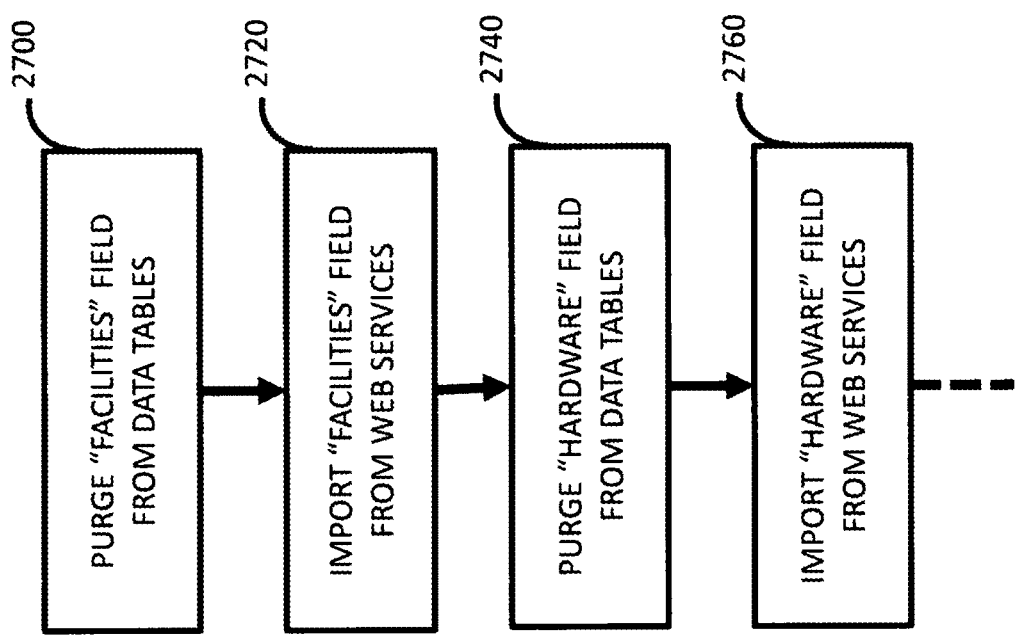

FIGS. 20A and 20B describe the machine transformation of resources. FIG. 20B is the continuation of FIG. 20A.

Figure 21:
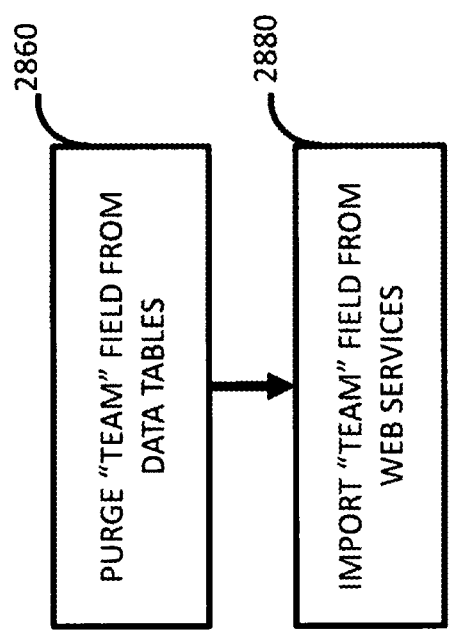

FIG. 21 describes the machine transformation of personnel.

Figure 22:
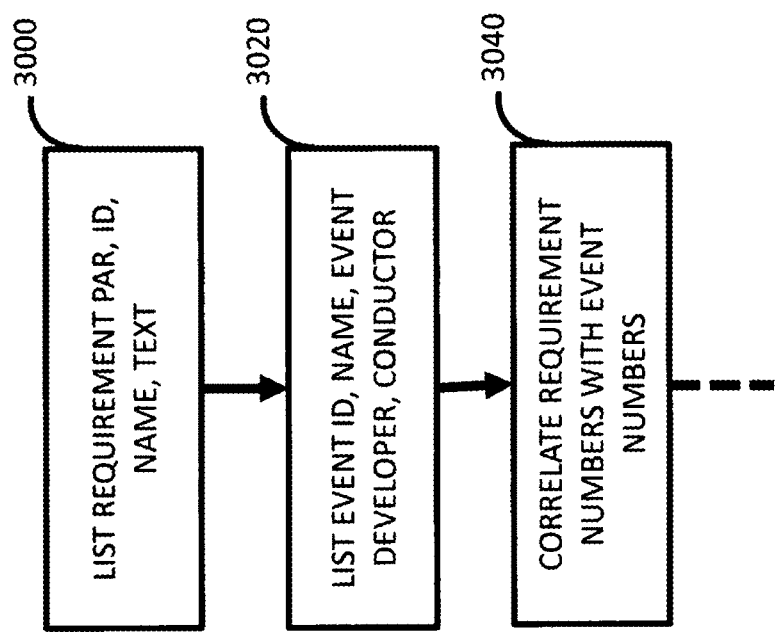

FIG. 22 describes the machine transformation, denoted as 5a (5a as in FIG. 17A). 5a denotes the first machine transformation of the verification event.

Figure 23:
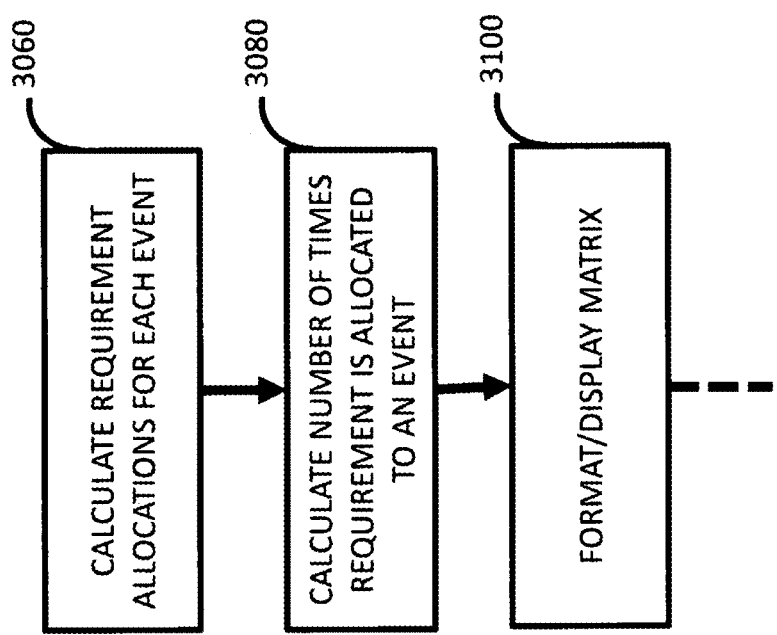

FIG. 23 describes the machine transformation, denoted as 5b (5b as in FIG. 17A). 5b denotes the second machine transformation of the verification event.

Figure 24:
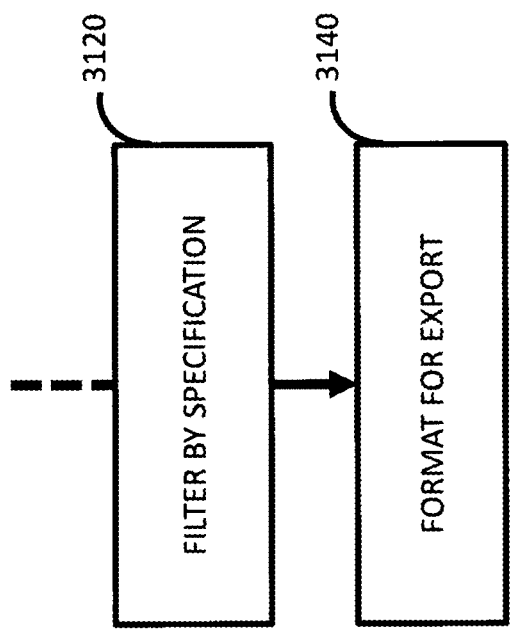

FIG. 24 describes the machine transformation, denoted as 5c (5c as in FIG. 17A). 5c denotes the third machine transformation of the verification event.

FIG. 25A describes module 3160 (3160 as in FIG. 17A). Furthermore, module 3160 has cells identified as A, B, C, D, E, F, G, H, I and J.

Figure 25I:
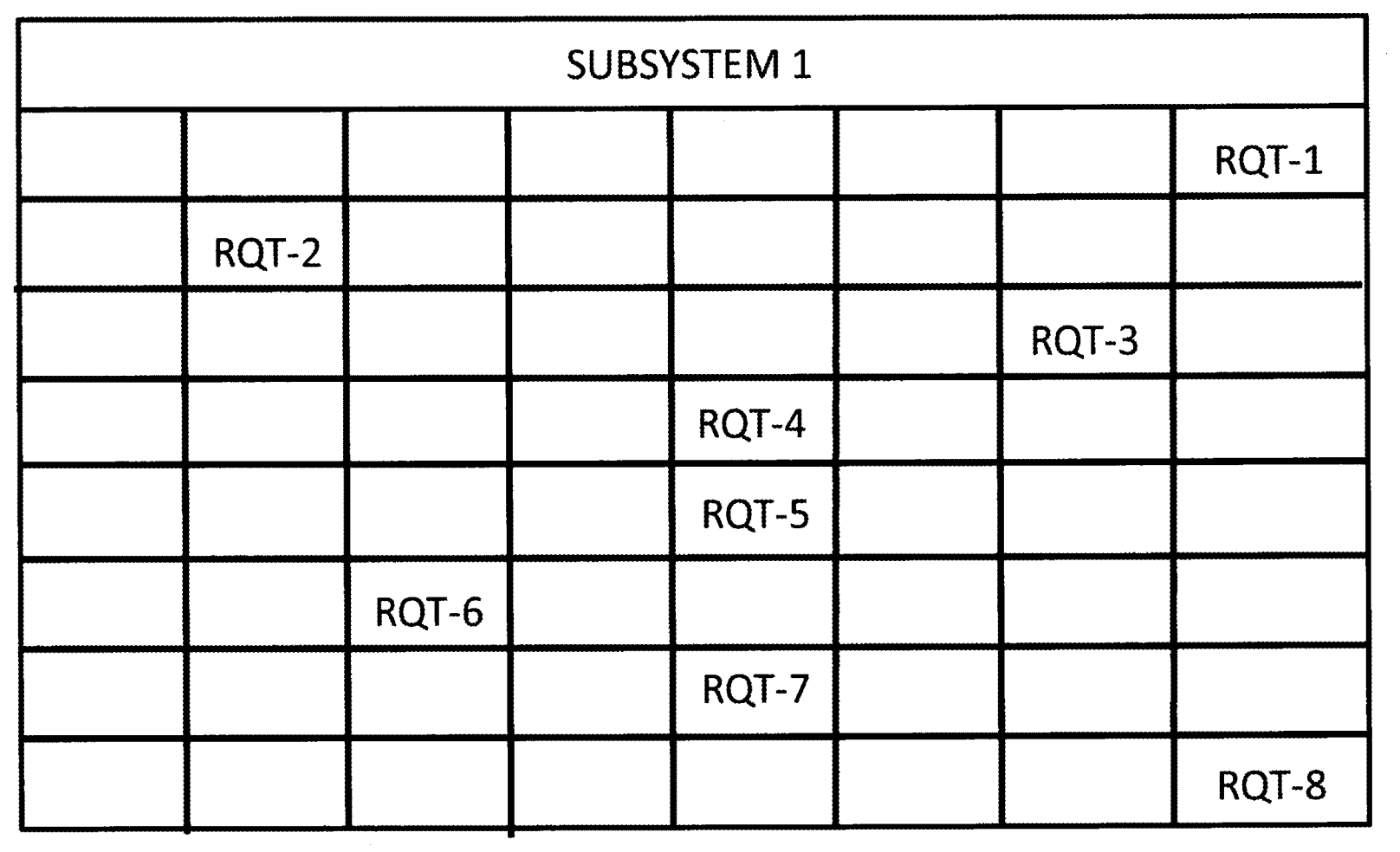
Figure 25J:
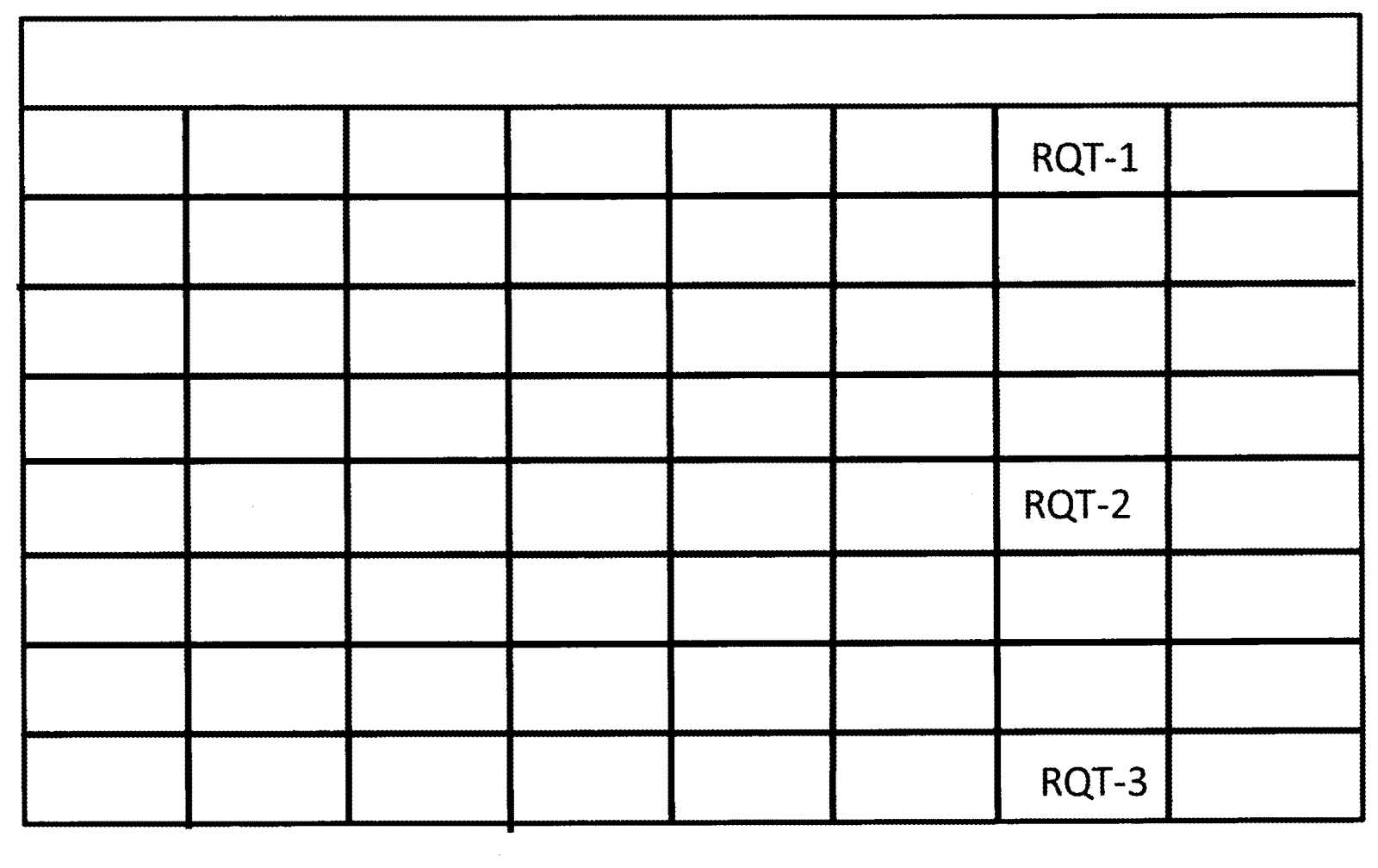
Figure 25K:
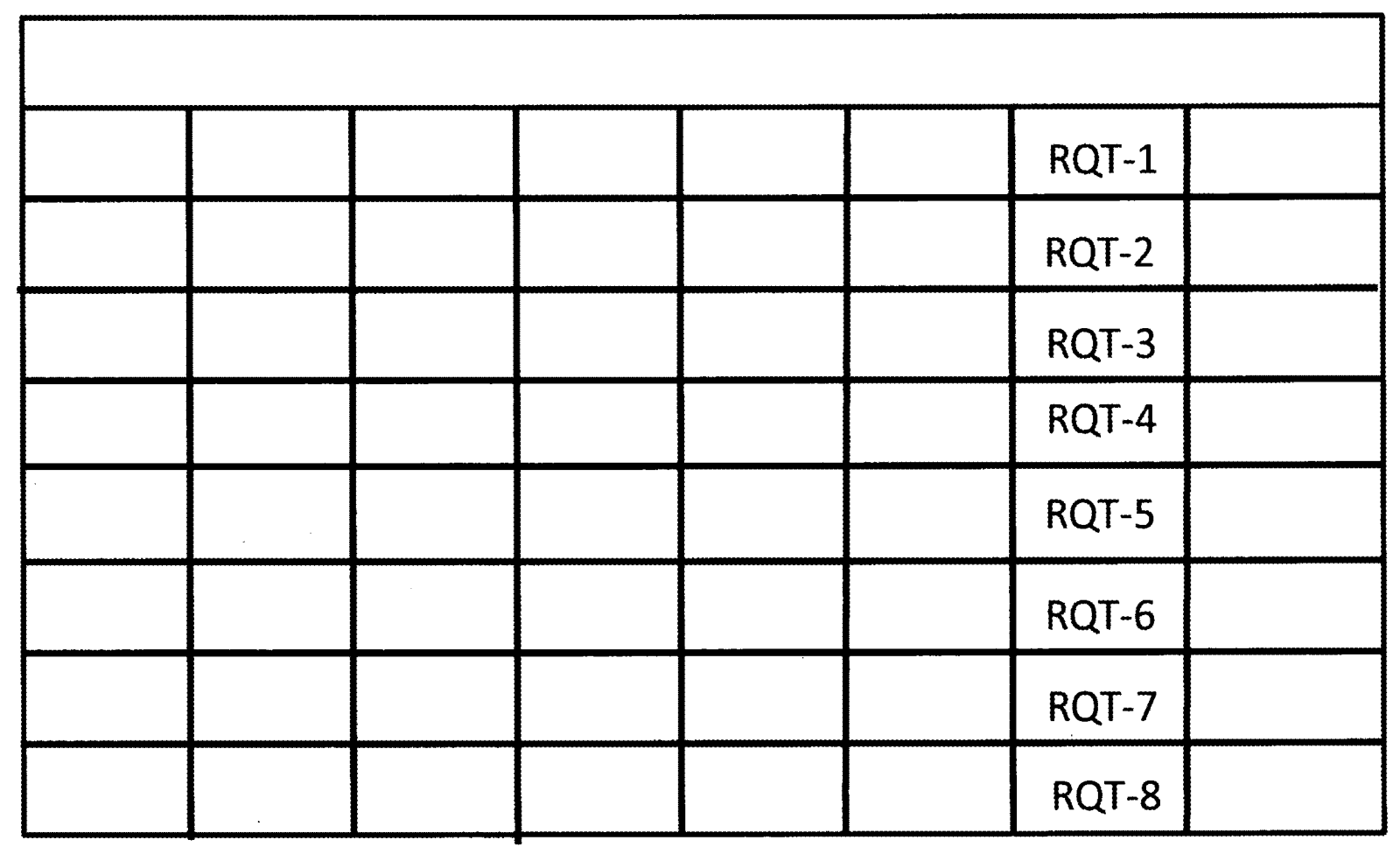

FIG. 25B describes cell A of module 3160. FIG. 25C describes cell B of module 3160. FIG. 25D describes cell C of module 3160. FIG. 25E describes cell D of module 3160. FIG. 25F describes cell E of module 3160. FIG. 25G describes cell F of module 3160. FIG. 25H describes cell G of module 3160. FIG. 25I describes cell H of module 3160. FIG. 25J describes cell I of module 3160. FIG. 25K describes cell J of module 3160.

Figure 26A:
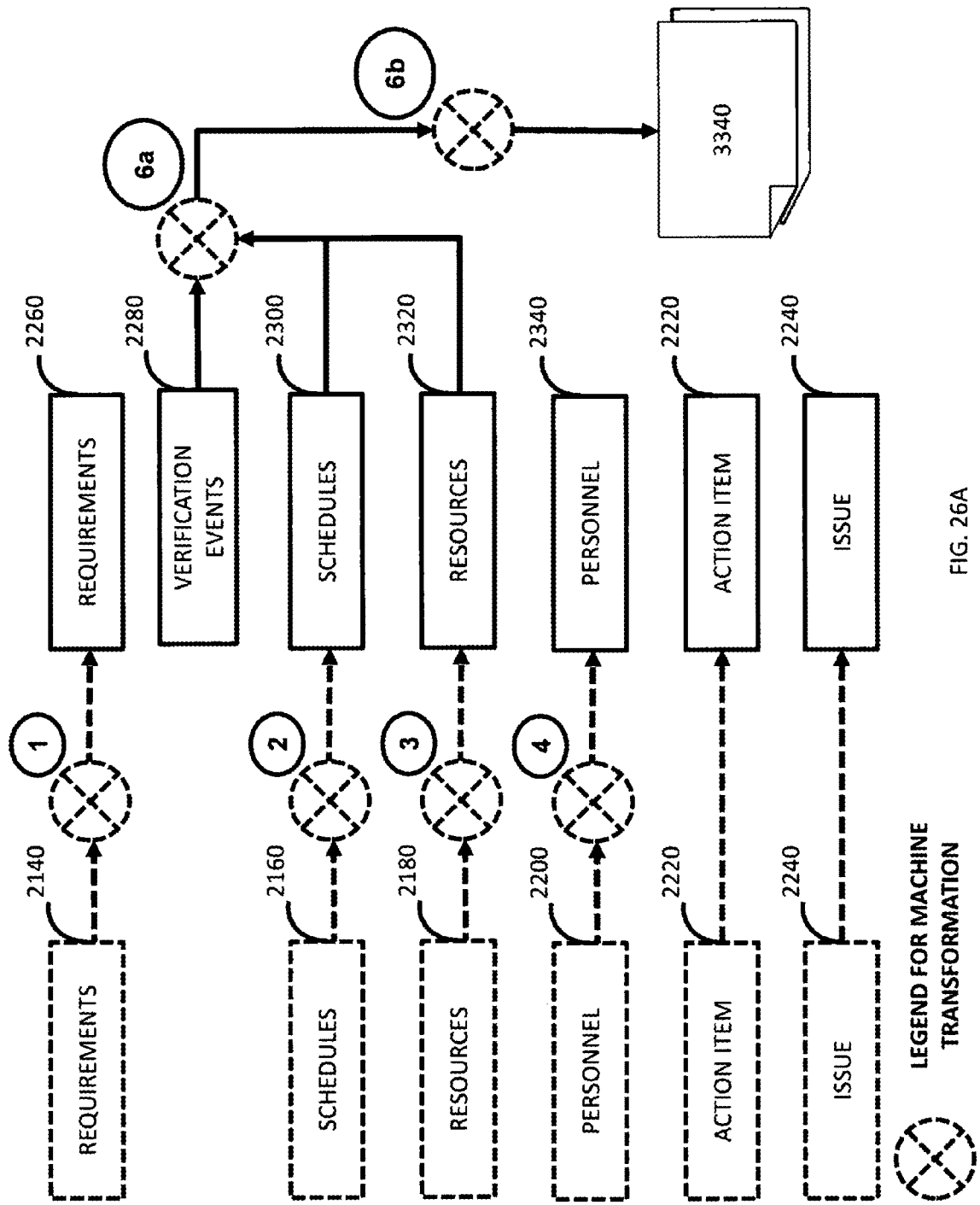

FIG. 26A describes requirements, schedules, resources and personnel before the machine transformation.

Figure 26B:
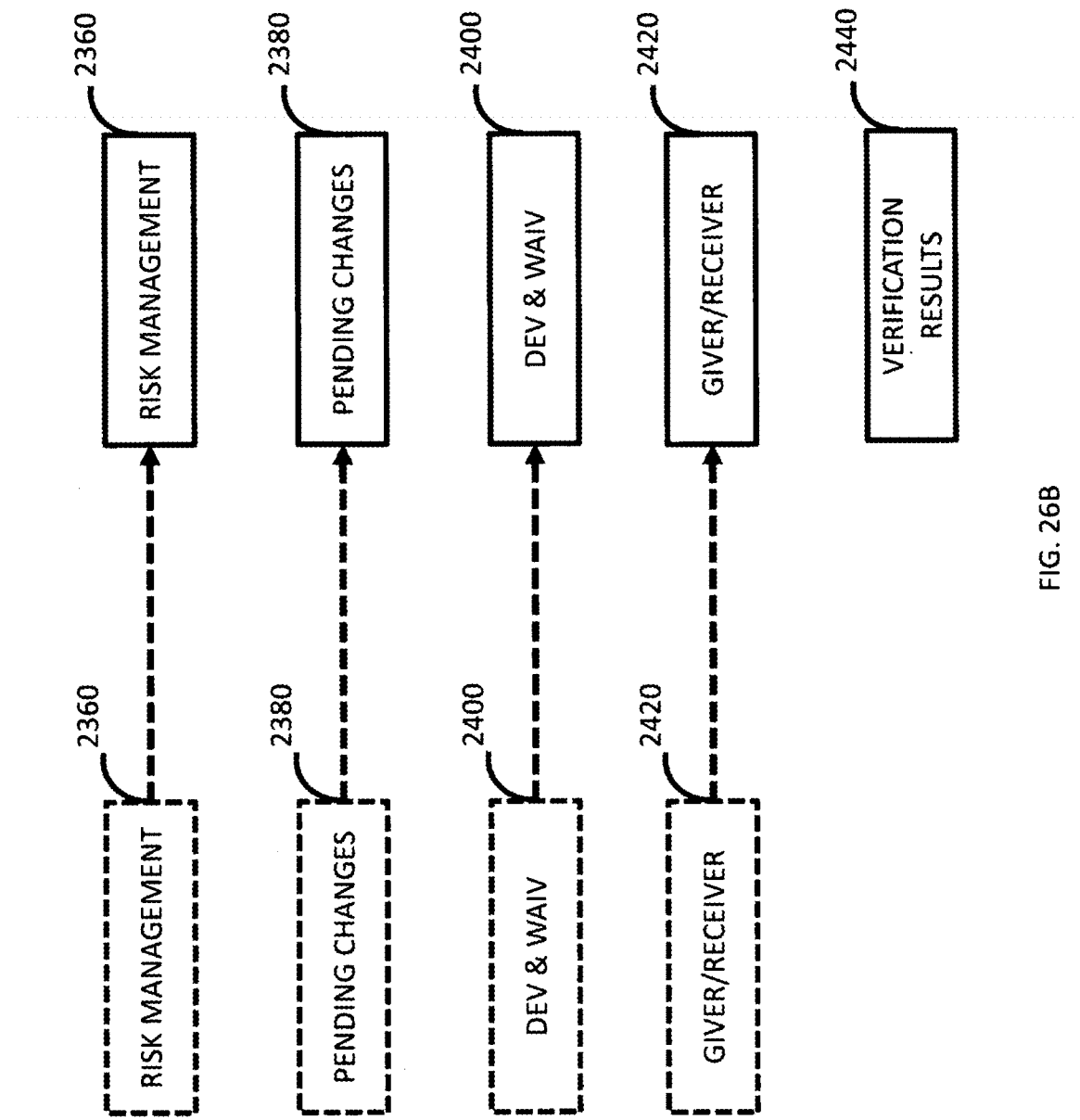

FIG. 26B describes risk management, pending changes, deviation and waiver ("dev & waiv"), giver/receiver and verification.

Figure 26C:
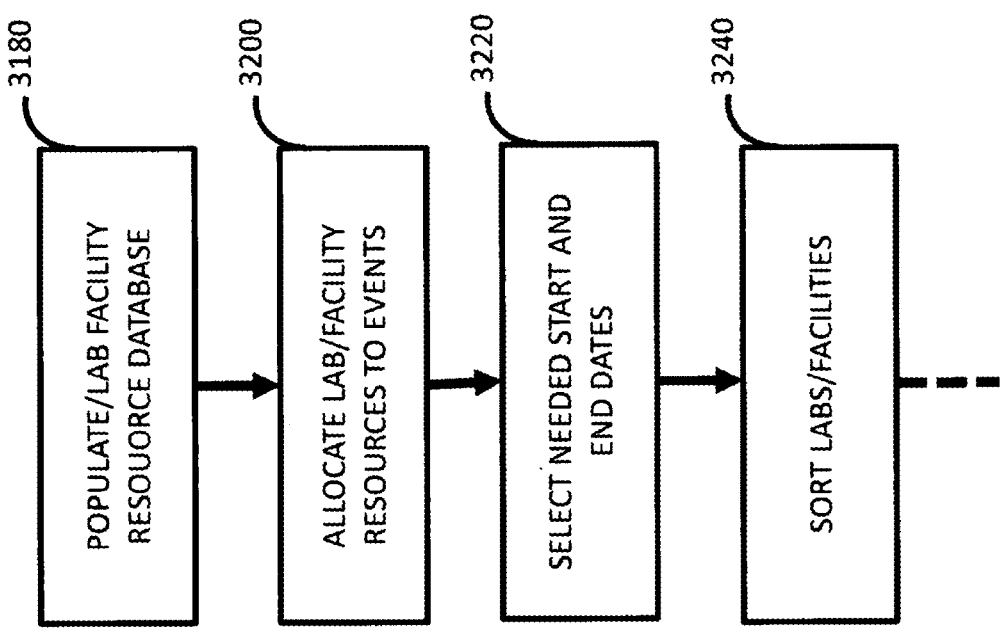

FIG. 26C describes the machine transformation, denoted as 6a (6a as in FIG. 26A). 6a denotes the first machine transformation of the verification event.

FIG. 26D describes the machine transformation, denoted as 6b (6b as in FIG. 26A). 6b denotes the second machine transformation of the verification event.

FIG. 26E describes the module 3340 (3340 as in FIG. 26A).

Figure 27A:
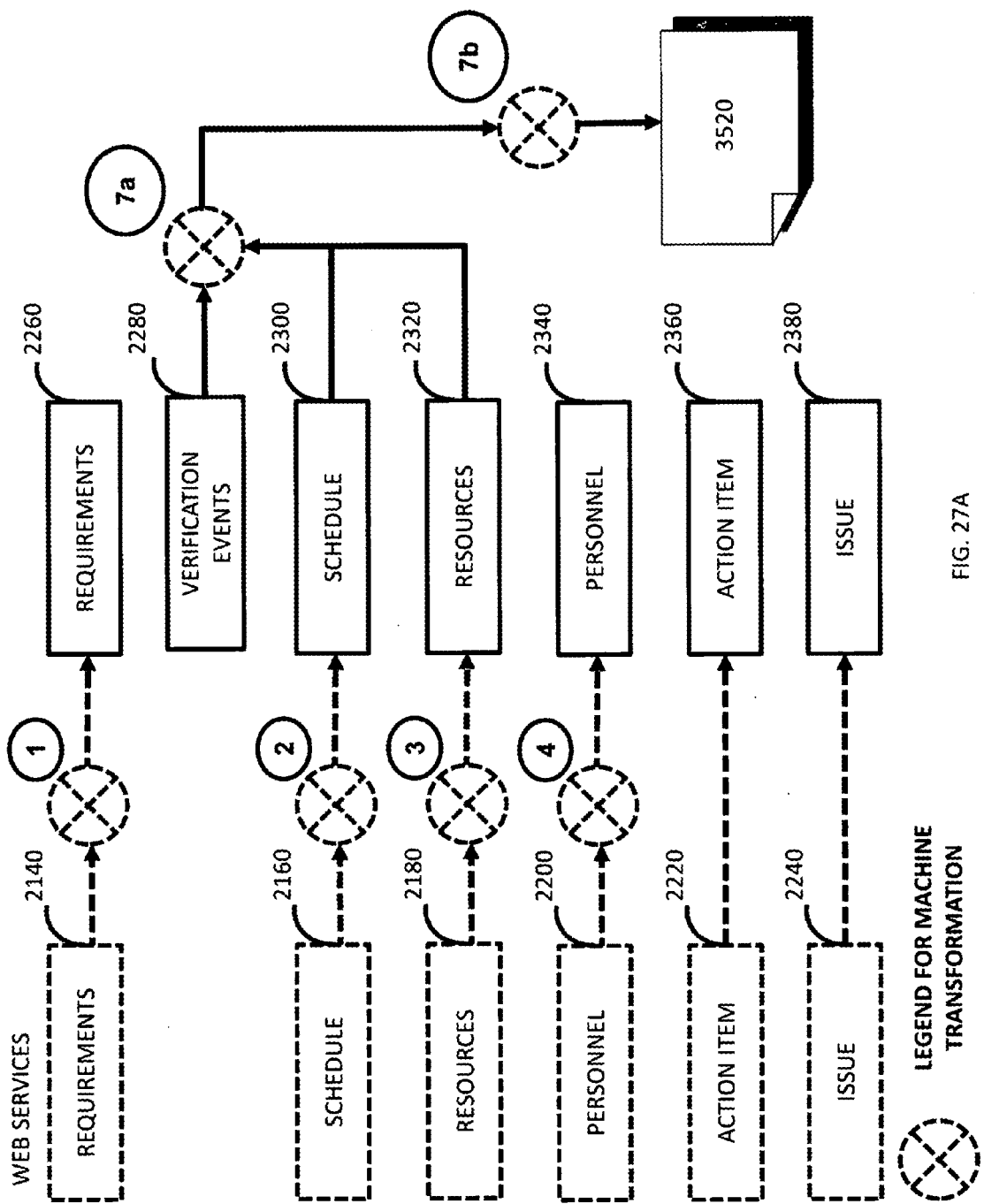

FIG. 27A describes requirements, schedules, resources and personnel before the machine transformation.

Figure 27B:
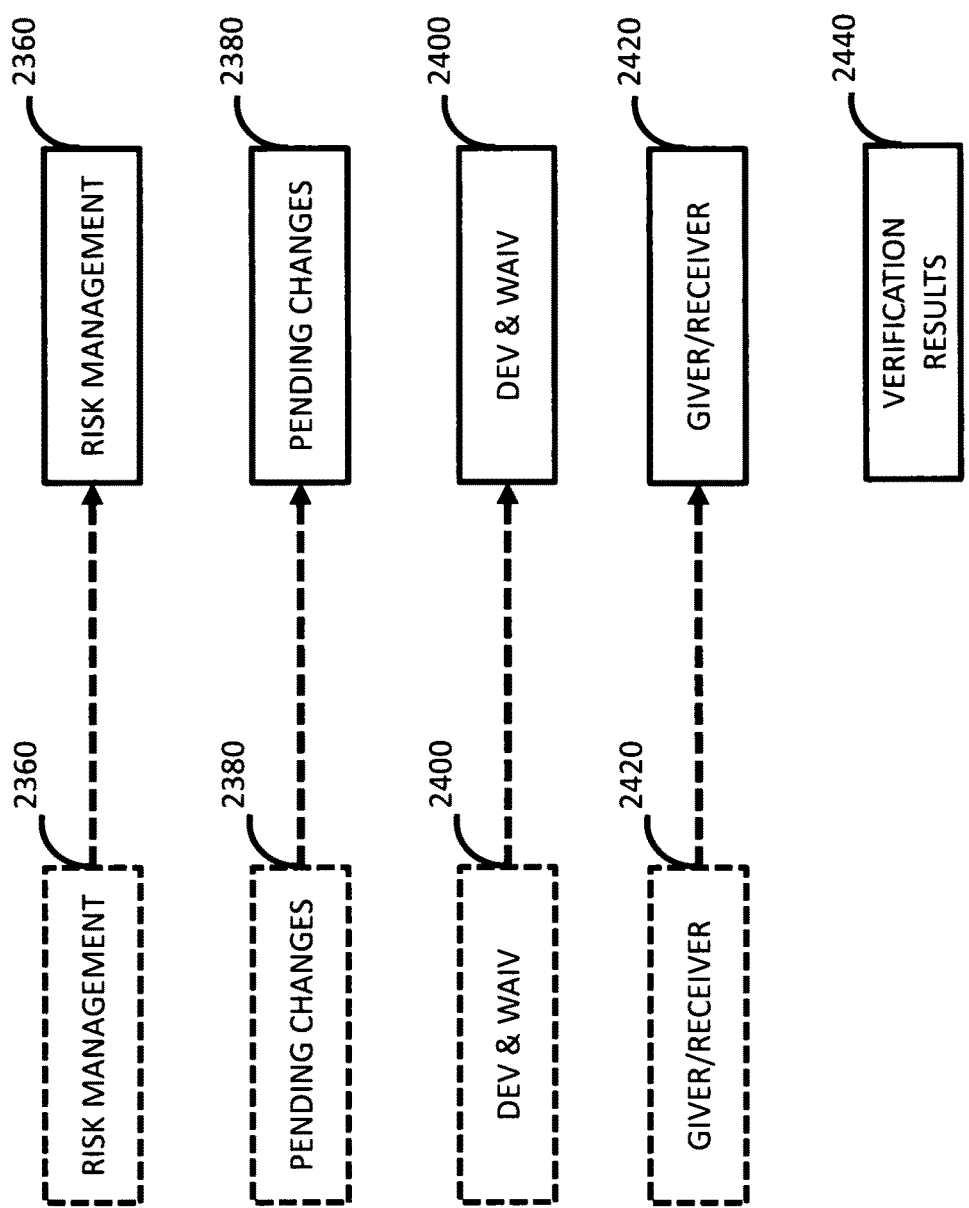

FIG. 27B describes risk management, pending changes, deviation and waiver ("dev & waiv"), giver/receiver and verification.

Figure 27C:
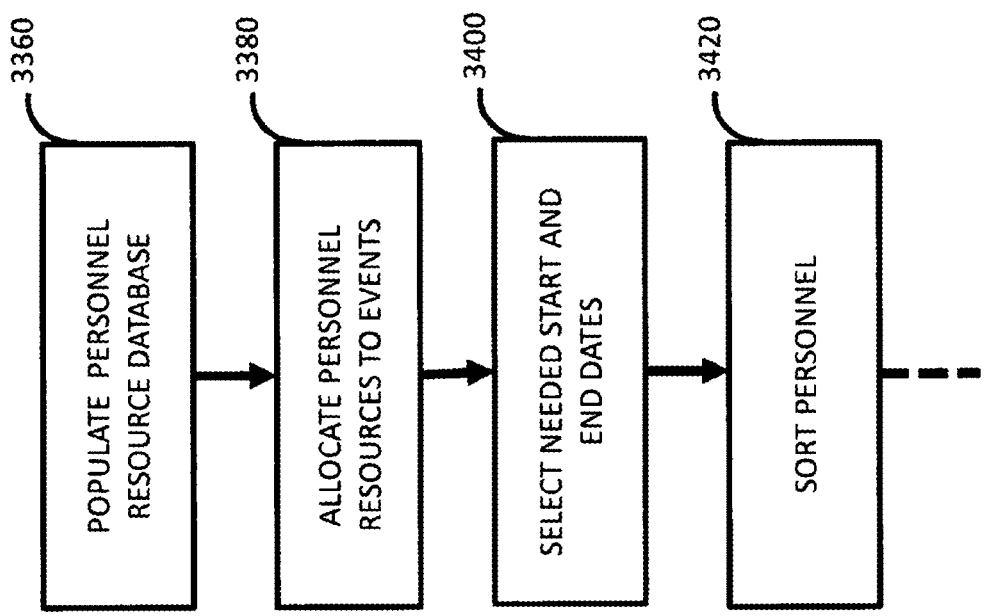

FIG. 27C describes the machine transformation, denoted as 7a (7a as in FIG. 27A). 7a denotes the first machine transformation of the verification event.

Figure 27D:
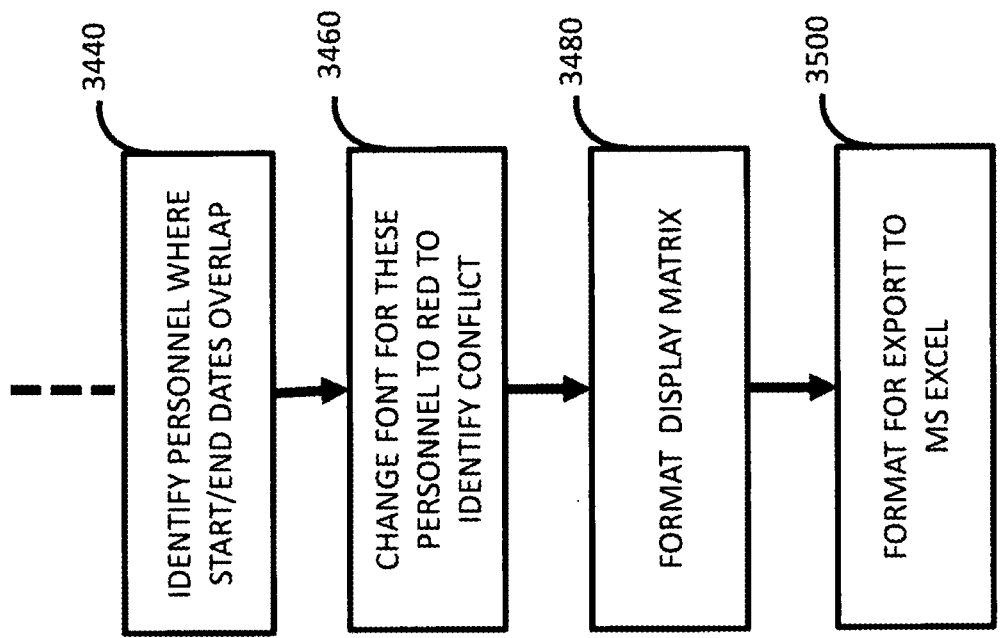

FIG. 27D describes the machine transformation, denoted as 7b (7b as in FIG. 27A). 7b denotes the second machine transformation of the verification event.

FIG. 27E describes the module 3520 (3520 as in FIG. 27A).

Figure 28A:
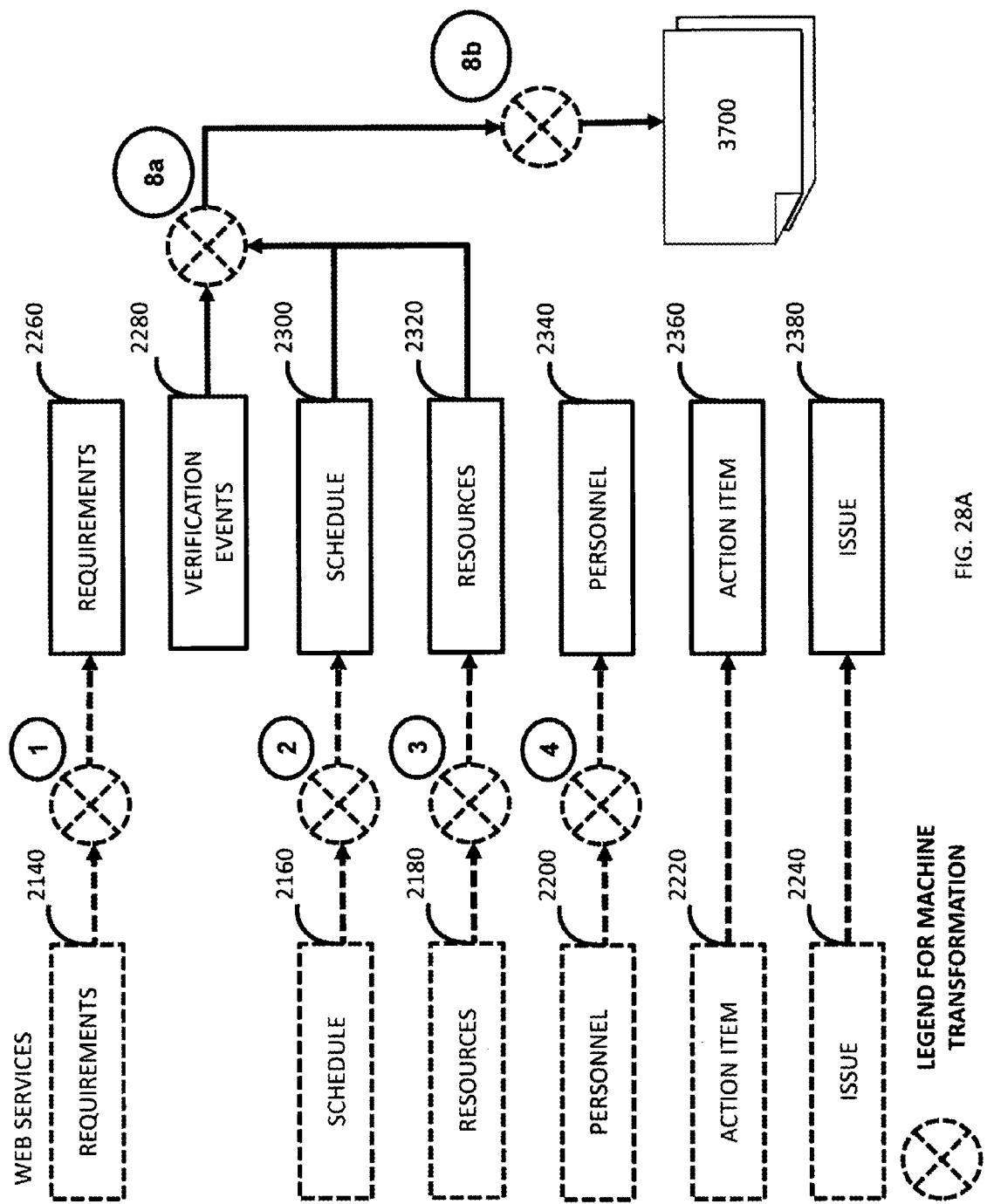

FIG. 28A describes requirements, schedules, resources and personnel before the machine transformation.

Figure 28B:
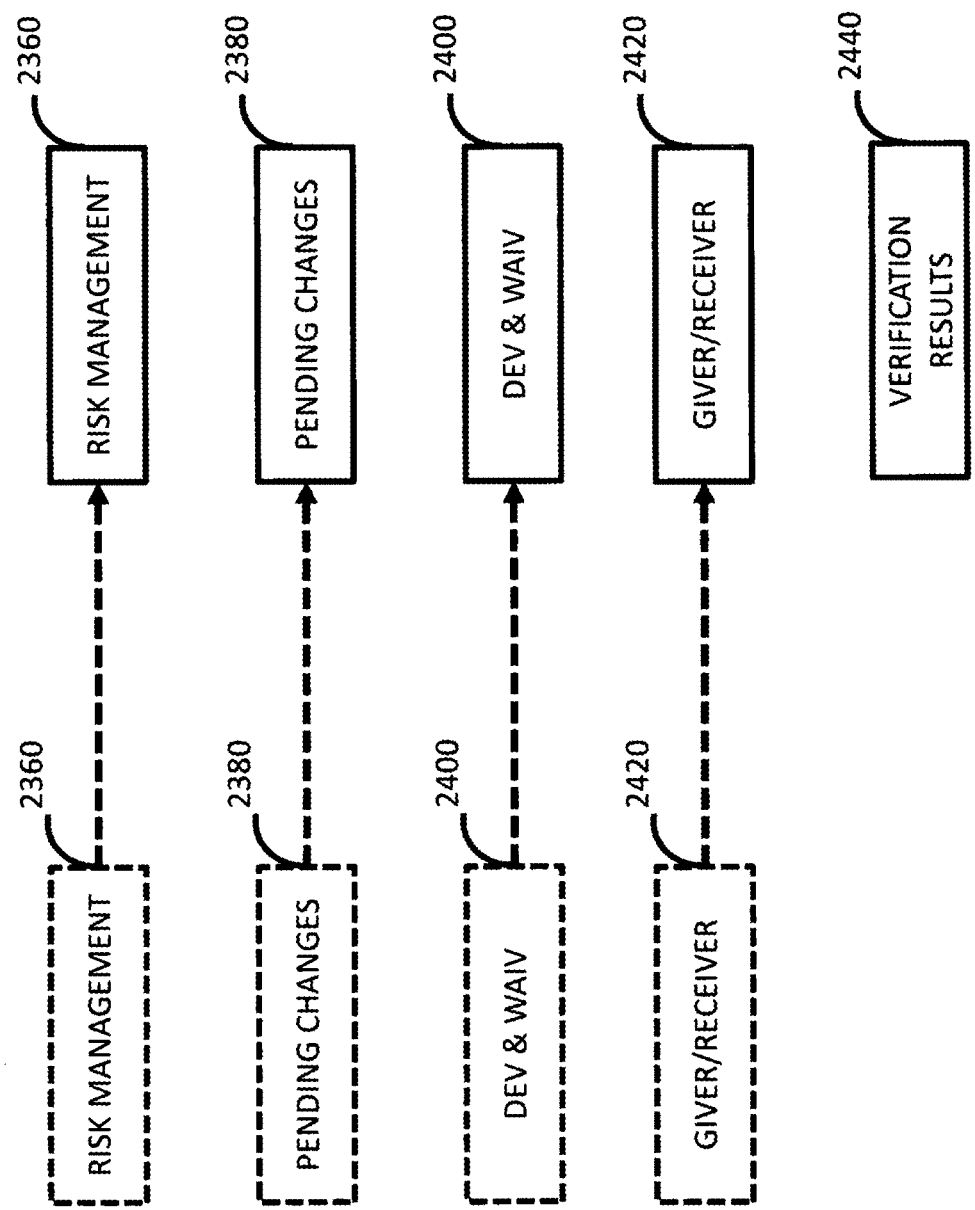

FIG. 28B describes risk management, pending changes, deviation and waiver ("dev & waiv"), giver/receiver and verification.

Figure 28C:
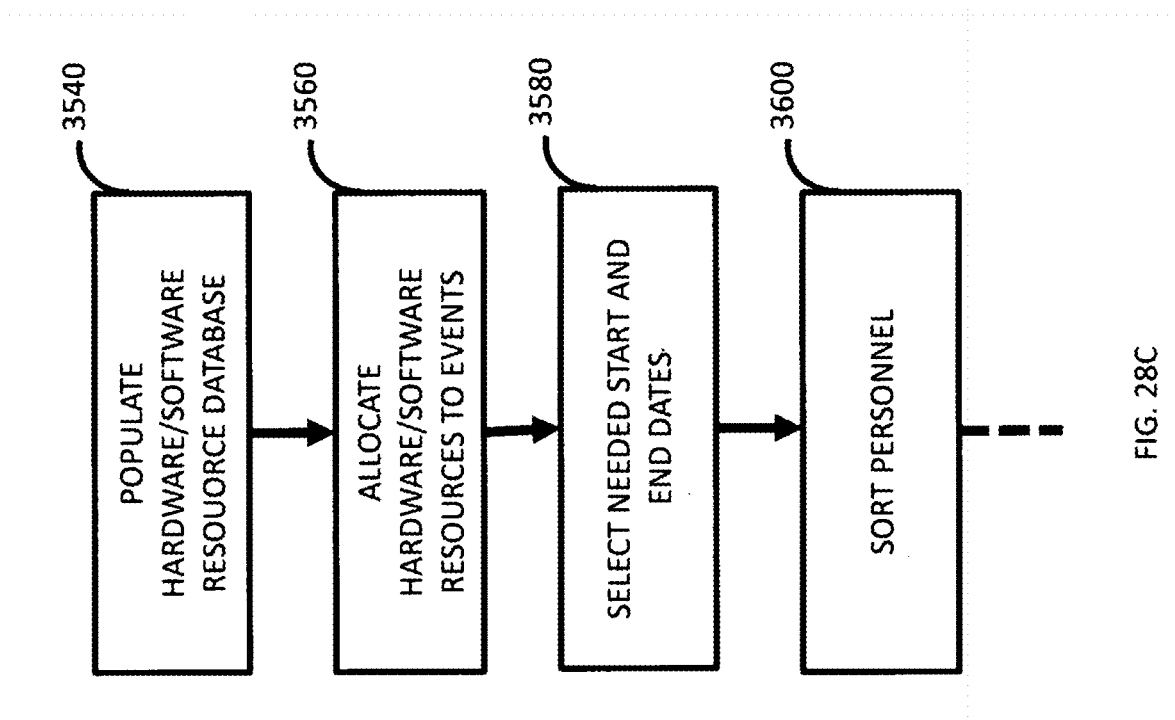

FIG. 28C describes the machine transformation, denoted as 8a (8a as in FIG. 28A). 8a denotes the first machine transformation of the verification event.

FIG. 28D describes the machine transformation, denoted as 8b (8b as in FIG. 28A). 8b denotes the second machine transformation of the verification event.

FIG. 28E describes the module 3700 (3700 as in FIG. 28A).

Figure 29A:
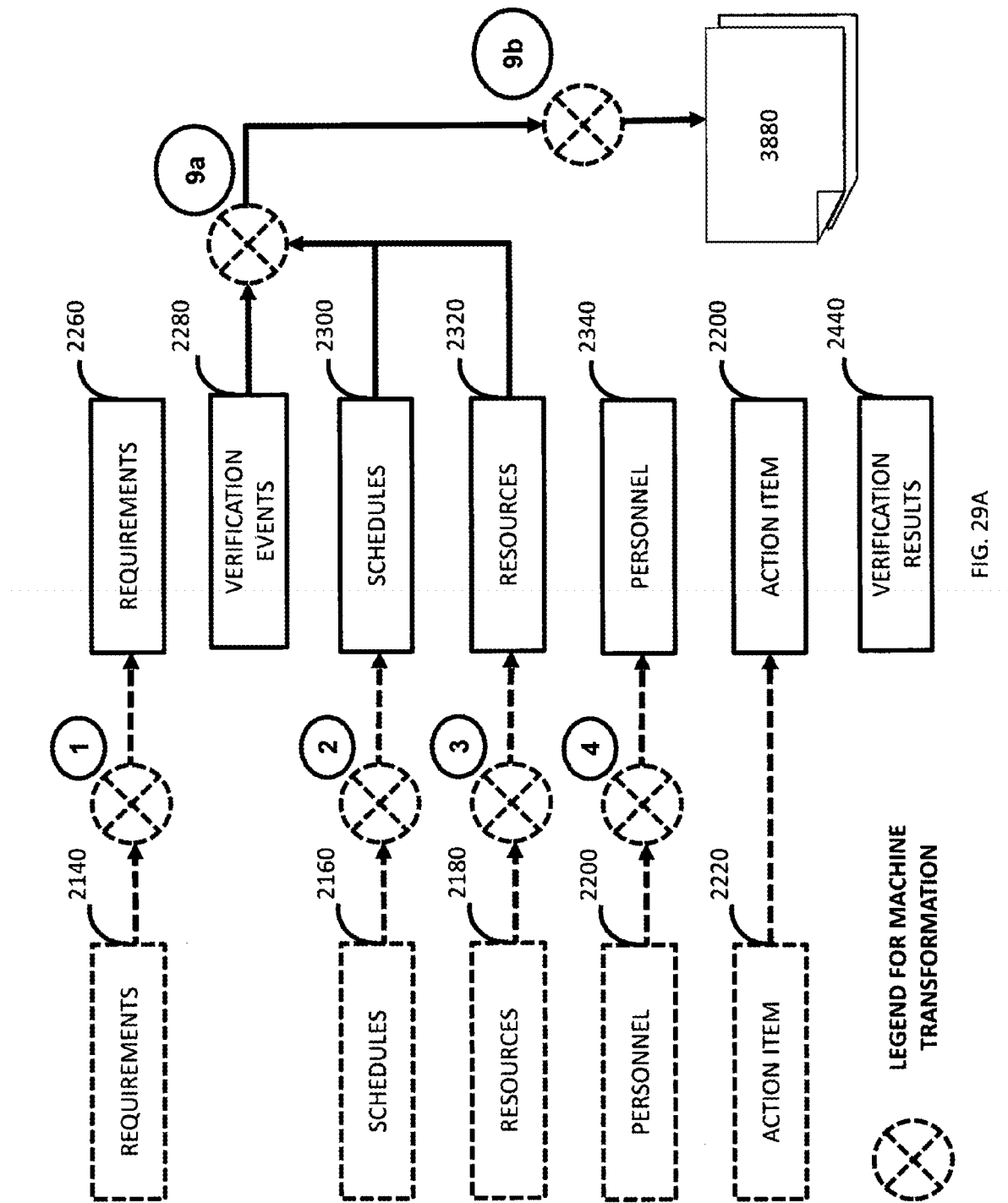

FIG. 29A describes requirements, schedules, resources and personnel before the machine transformation.

Figure 29B:
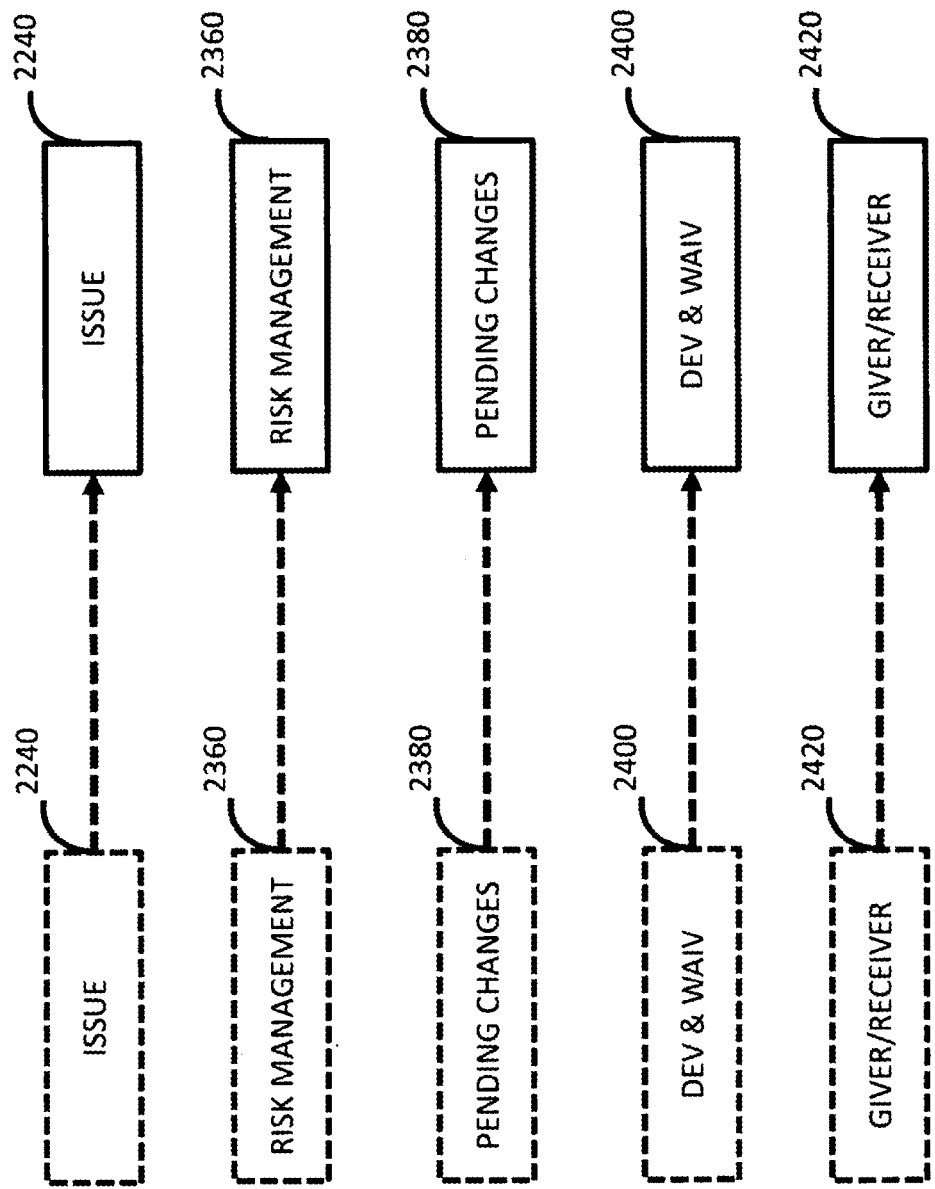

FIG. 29B describes risk management, pending changes, deviation and waiver ("dev & waiv"), giver/receiver and verification.

FIG. 29C describes the machine transformation, denoted as 9a (9a as in FIG. 29A). 9a denotes the first machine transformation of the verification event.

FIG. 29D describes the machine transformation, denoted as 9b (9b as in FIG. 29A). 9b denotes the second machine transformation of the verification event.

FIG. 29E describes the module 3880 (3800 as in FIG. 29A).

Figure 30A:
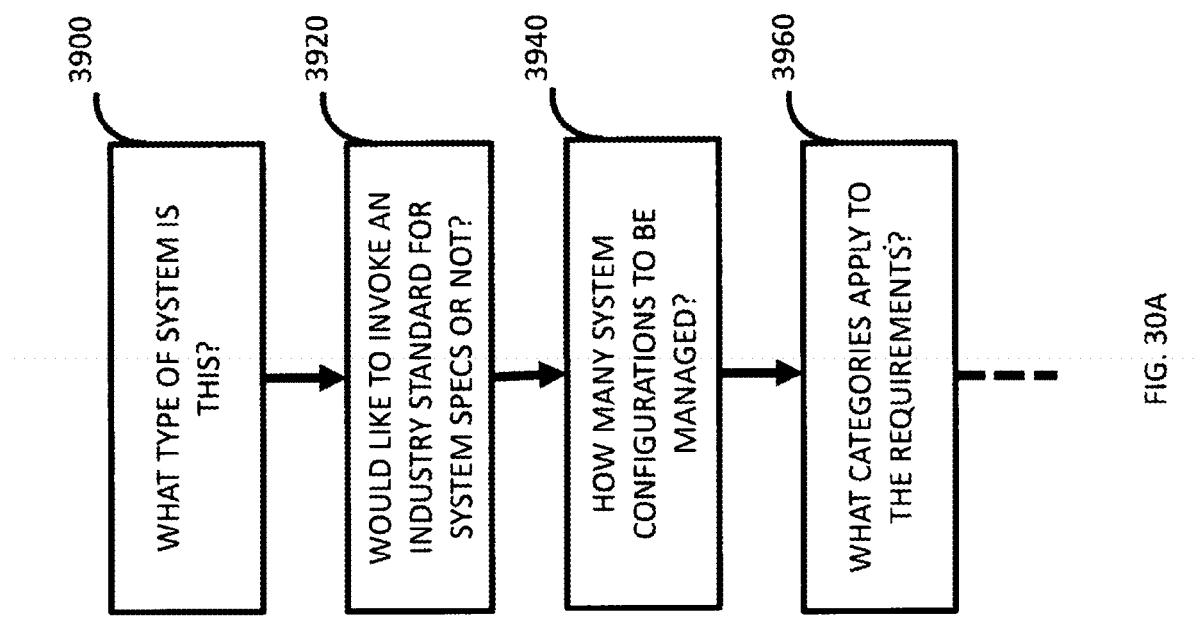
Figure 30B:
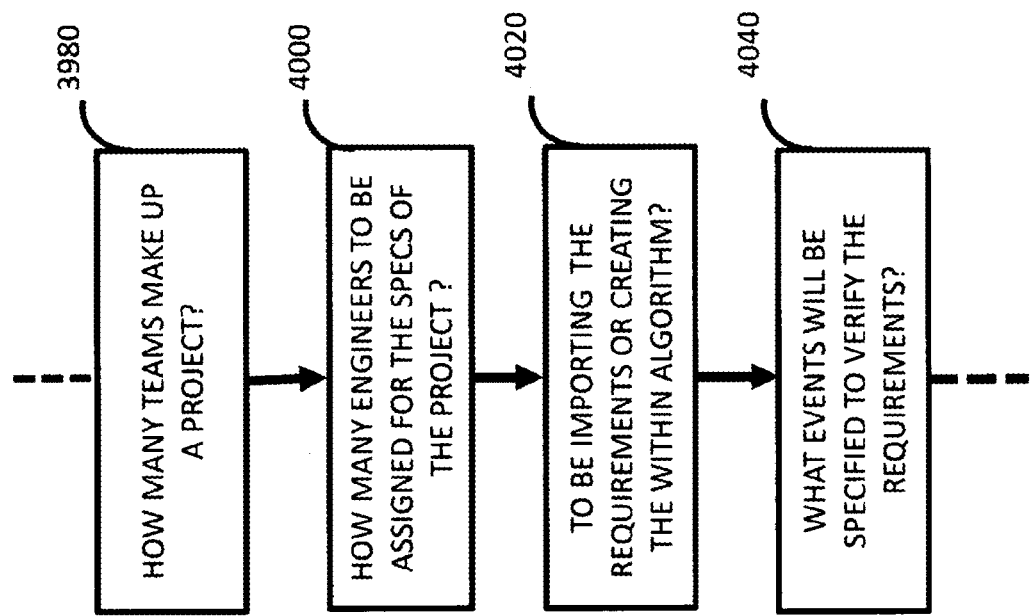
Figure 30C:
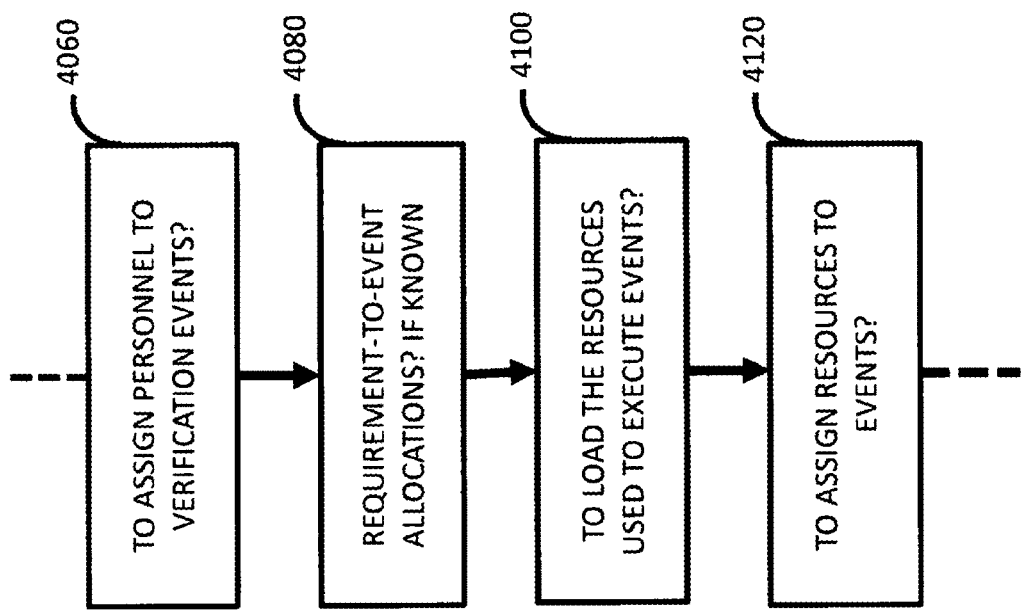
Figure 30D:
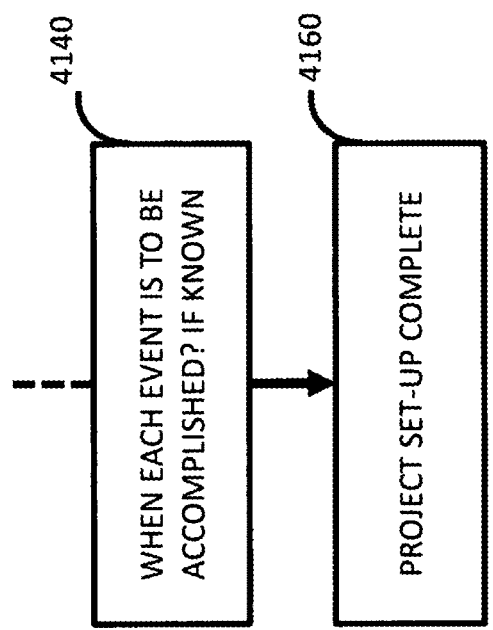

FIGS. 30A, 30B, 30C and 30D describe an example to establish a flowchart for the module 3880. FIG. 30B is continuation of FIG. 30A. FIG. 30C is continuation of FIG. 30B. FIG. 30D is continuation of FIG. 30C.

Figure 31A:
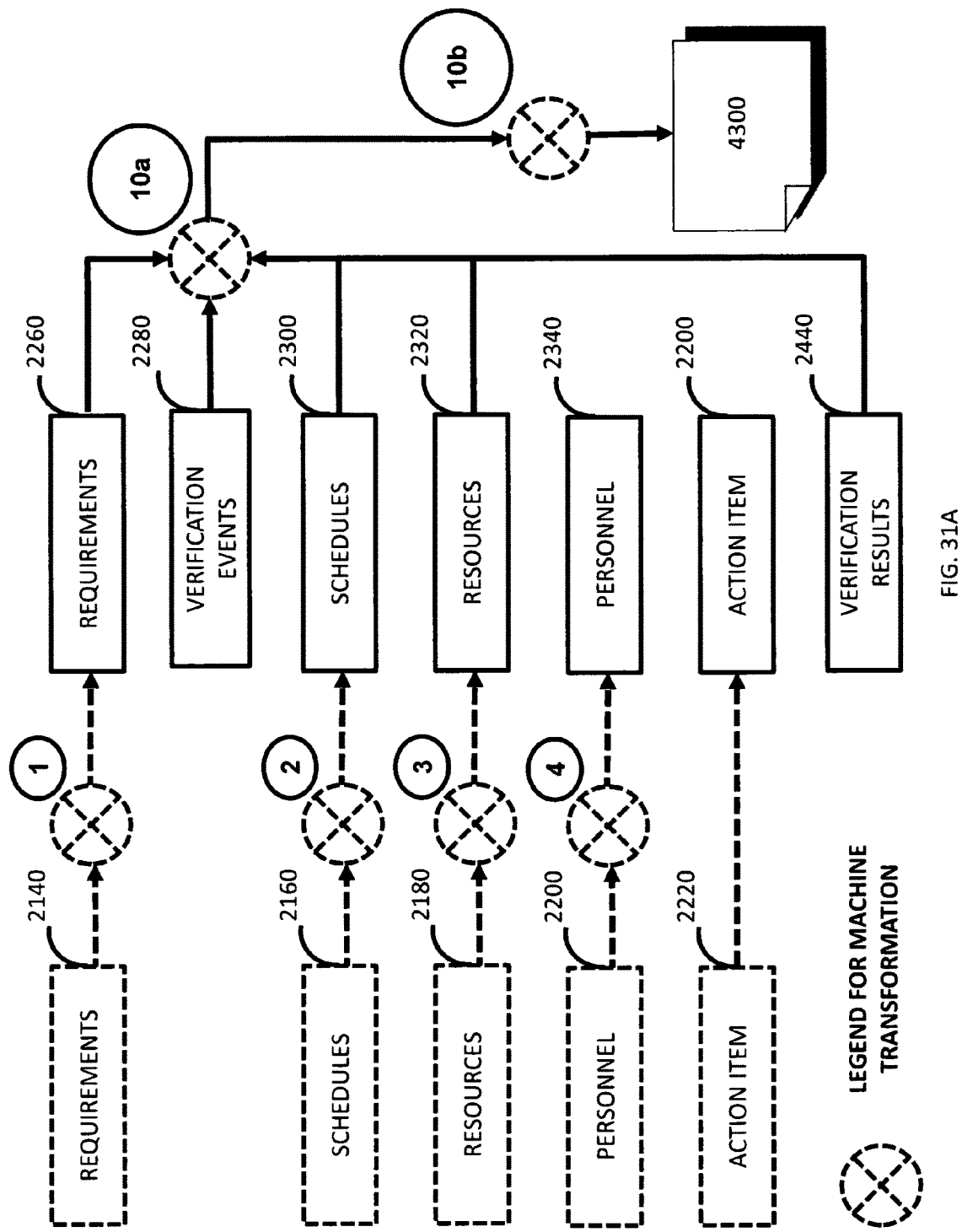

FIG. 31A describes requirements, schedules, resources and personnel before the machine transformation.

Figure 31B:
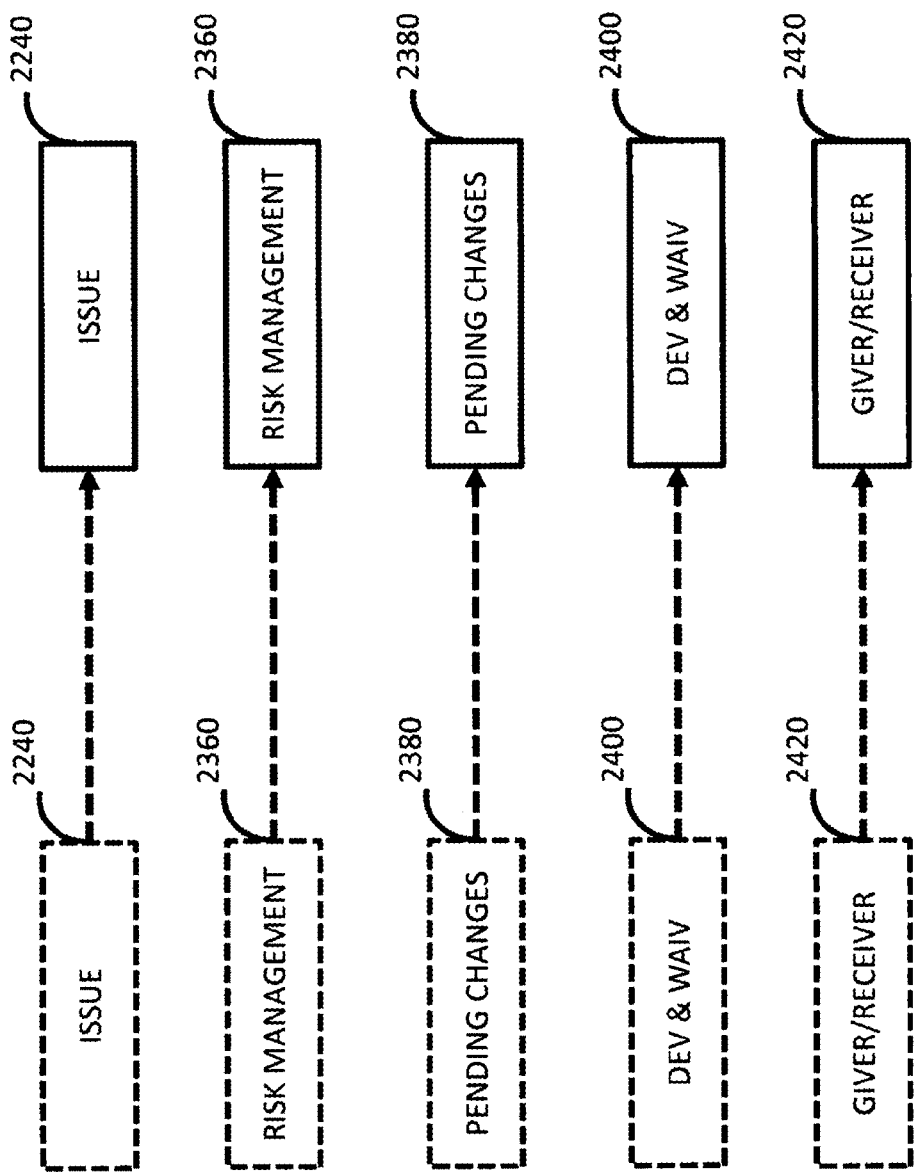

FIG. 31B describes risk management, pending changes, deviation and waiver ("dev & waiv"), giver/receiver and verification.

Figure 31C:
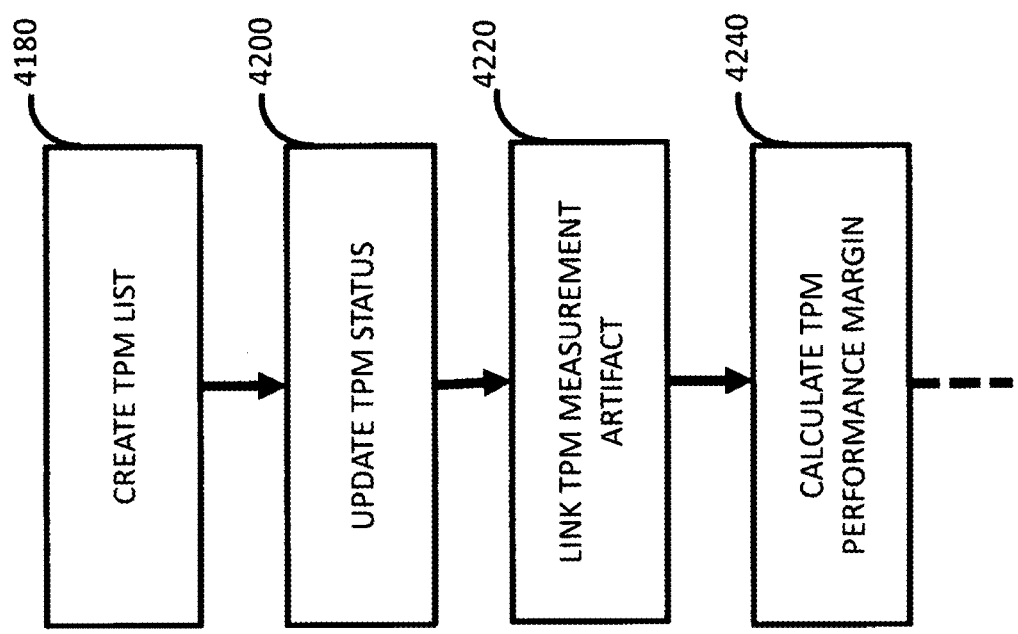

FIG. 31C describes the machine transformation, denoted as 10a (10a as in FIG. 31A). 10a denotes the first machine transformation of the verification event.

Figure 31D:
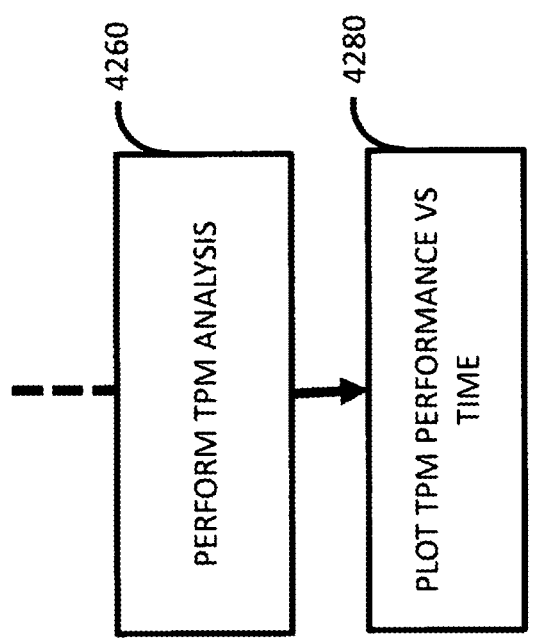

FIG. 31D describes the machine transformation, denoted as 10b (10b as in FIG. 31A). 10b denotes the second machine transformation of the verification event.

Figure 31E:
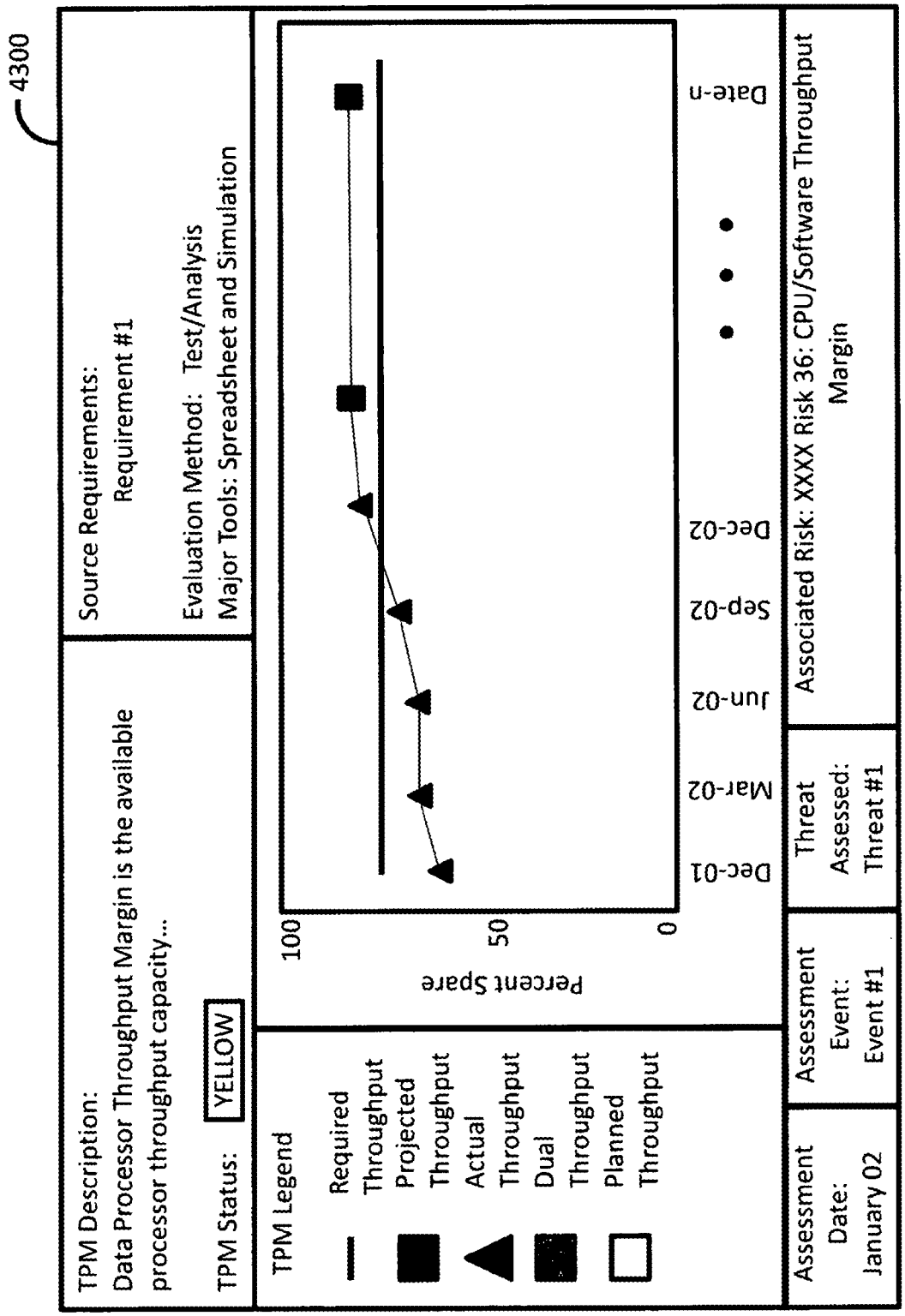

FIG. 31E describes the graphical output of the module 4300 (4300 as in FIG. 31A).

Figure 32A:
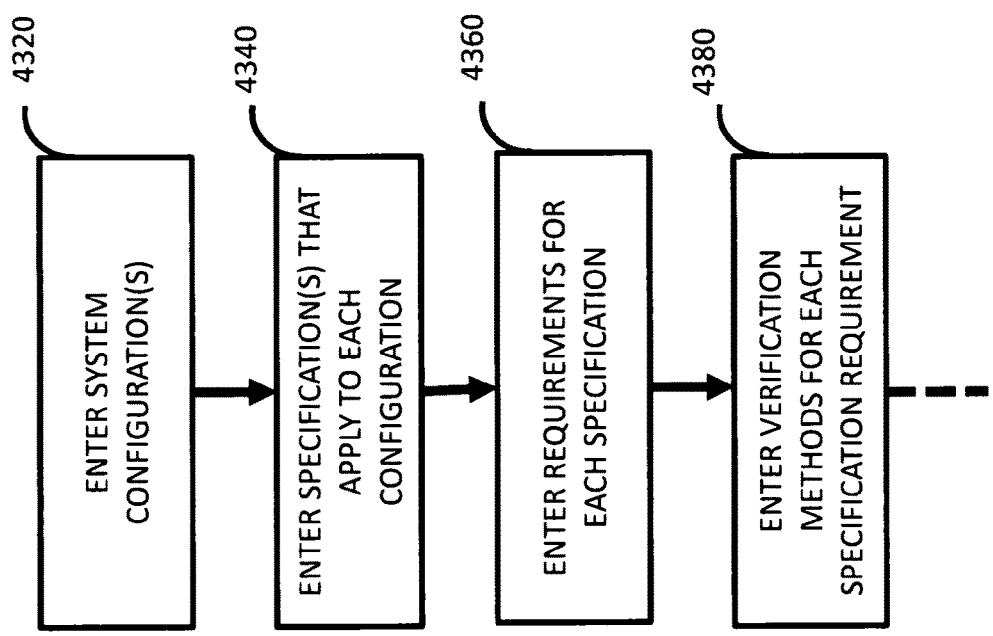
Figure 32B:
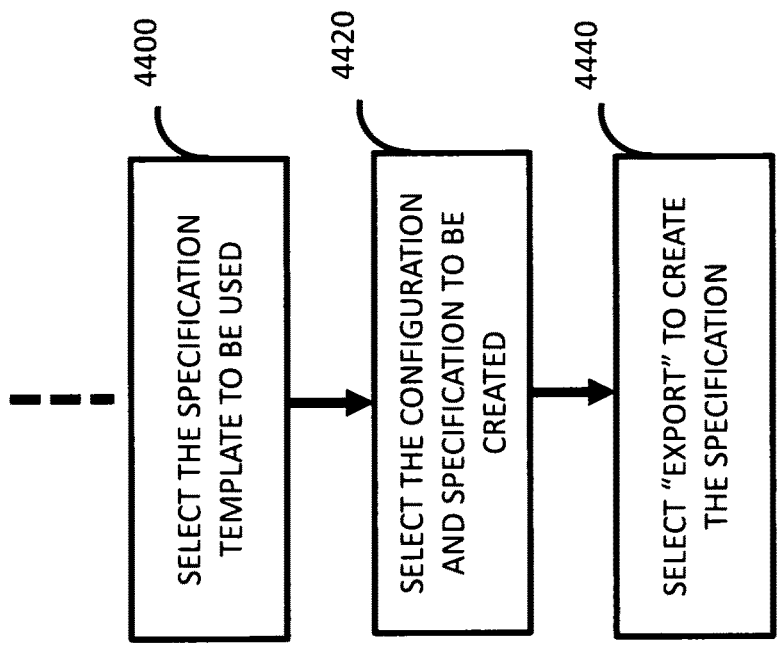

FIGS. 32A and 32B describe an example to establish a flowchart for the module 4300. FIG. 32B is continuation of FIG. 32A.

Figure 33A:
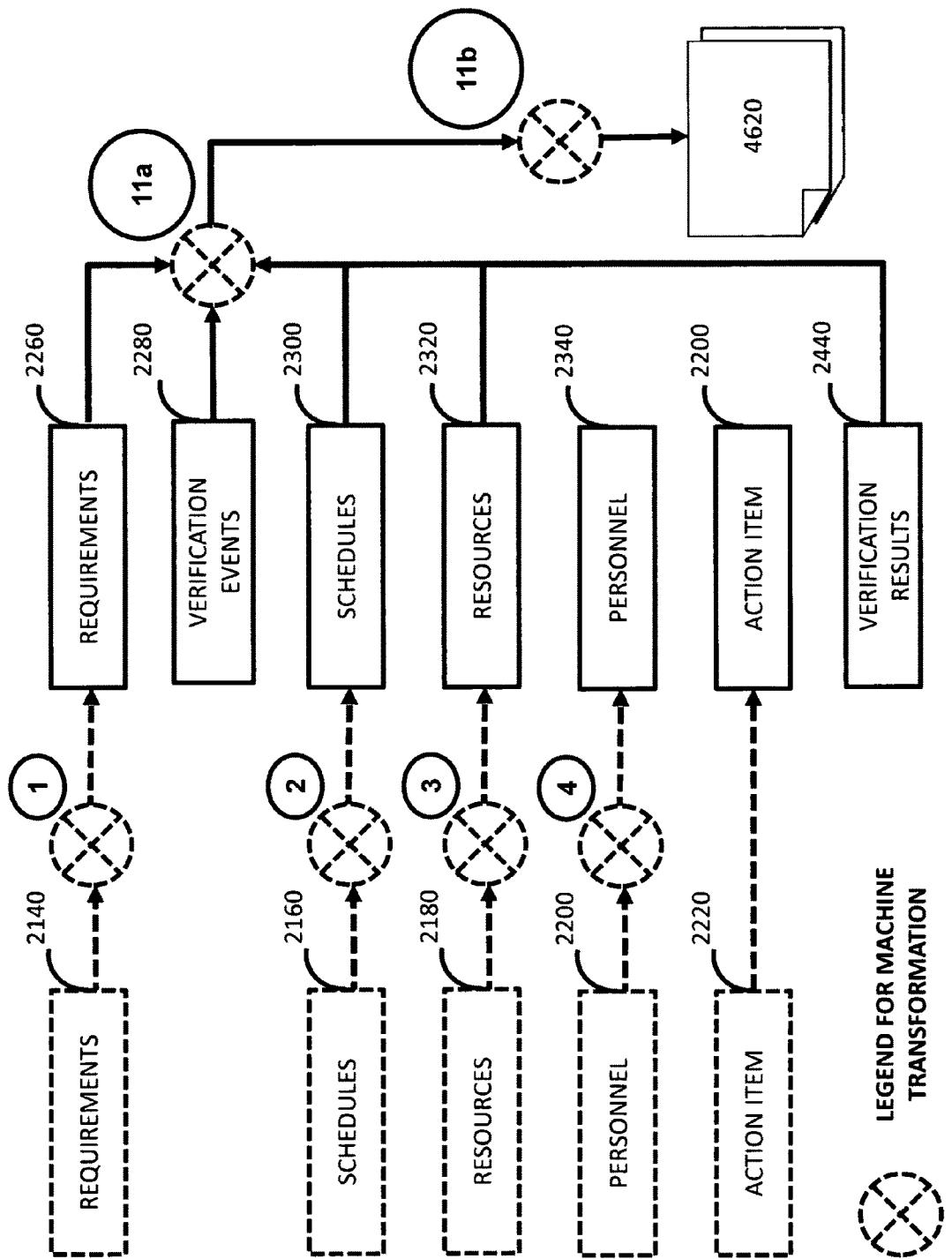

FIG. 33A describes requirements, schedules, resources and personnel before the machine transformation.

Figure 33B:
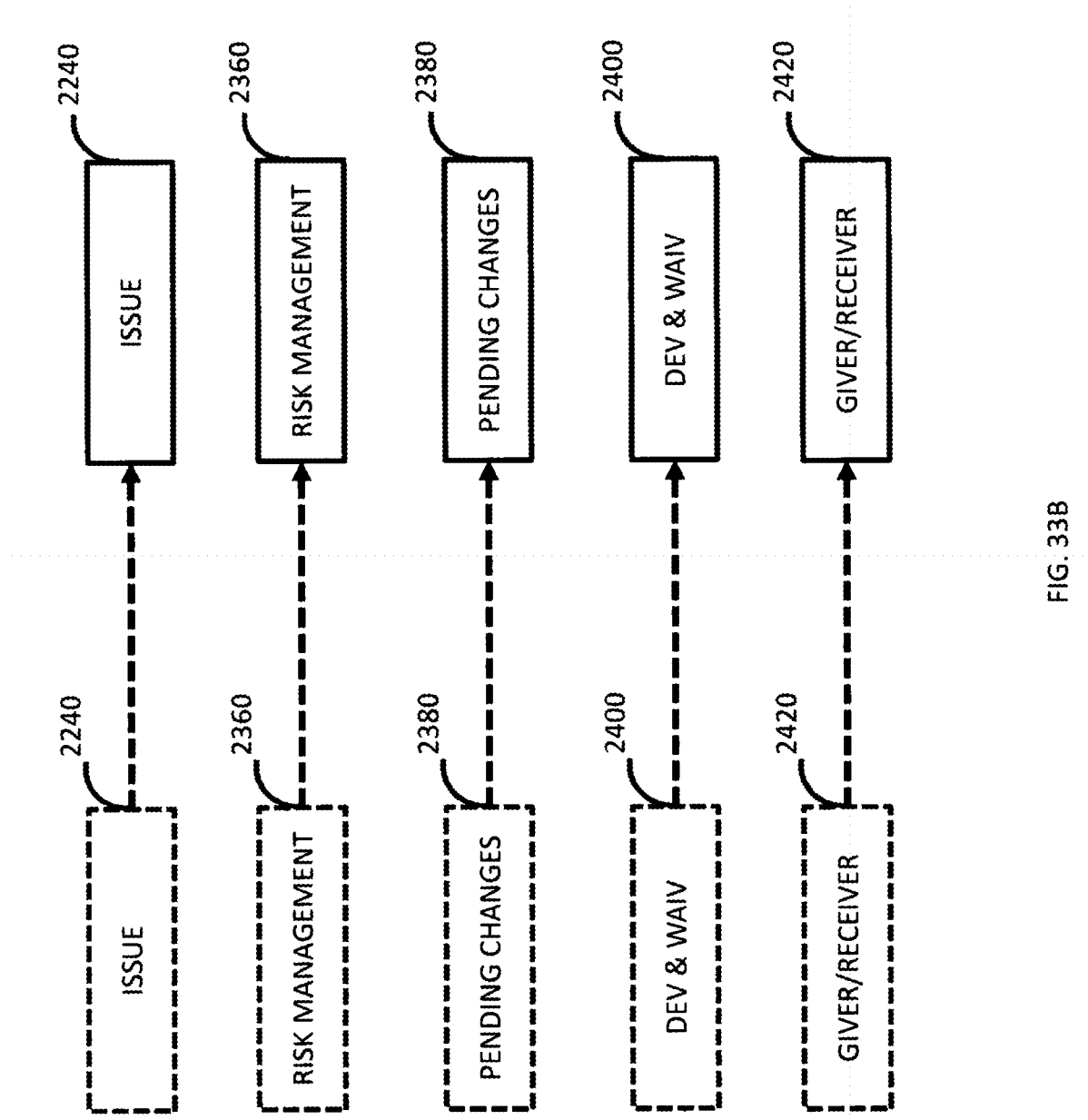

FIG. 33B describes risk management, pending changes, deviation and waiver ("dev & waiv"), giver/receiver and verification.

Figure 33C:
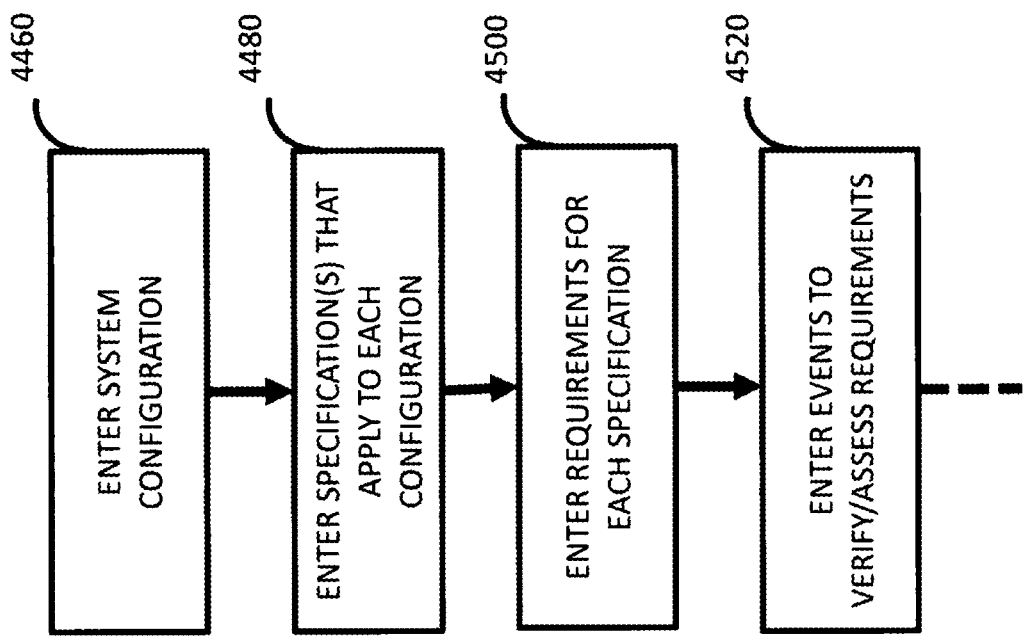

FIG. 33C describes the machine transformation, denoted as 11a (11a as in FIG. 33A). 11a denotes the first machine transformation of the verification event.

Figure 33D:
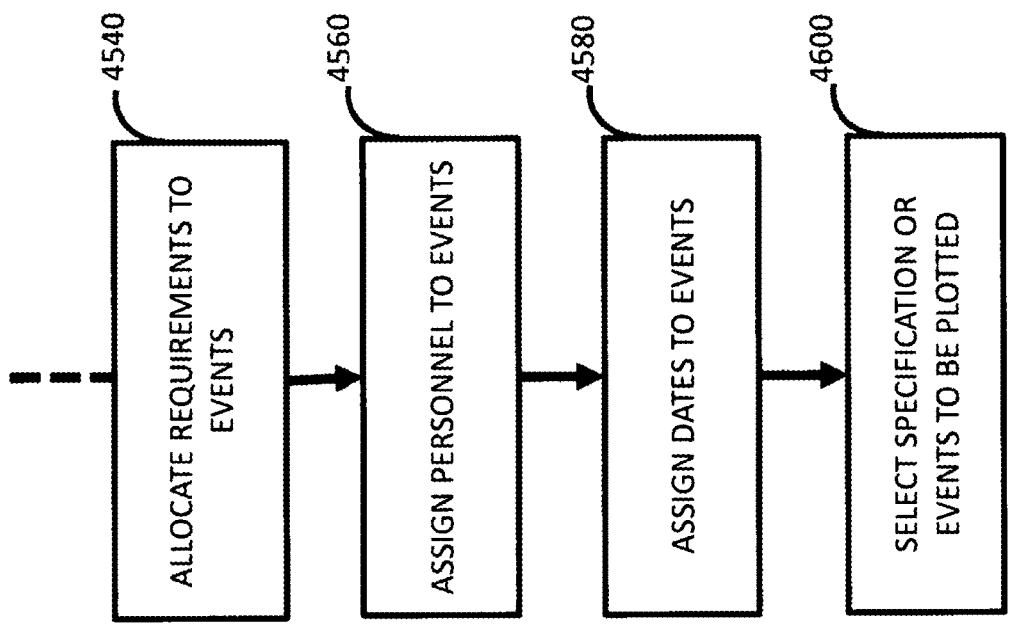

FIG. 33D describes the machine transformation, denoted as 11b (11b as in FIG. 33A). 11b denotes the second machine transformation of the verification event.

Figure 33E:
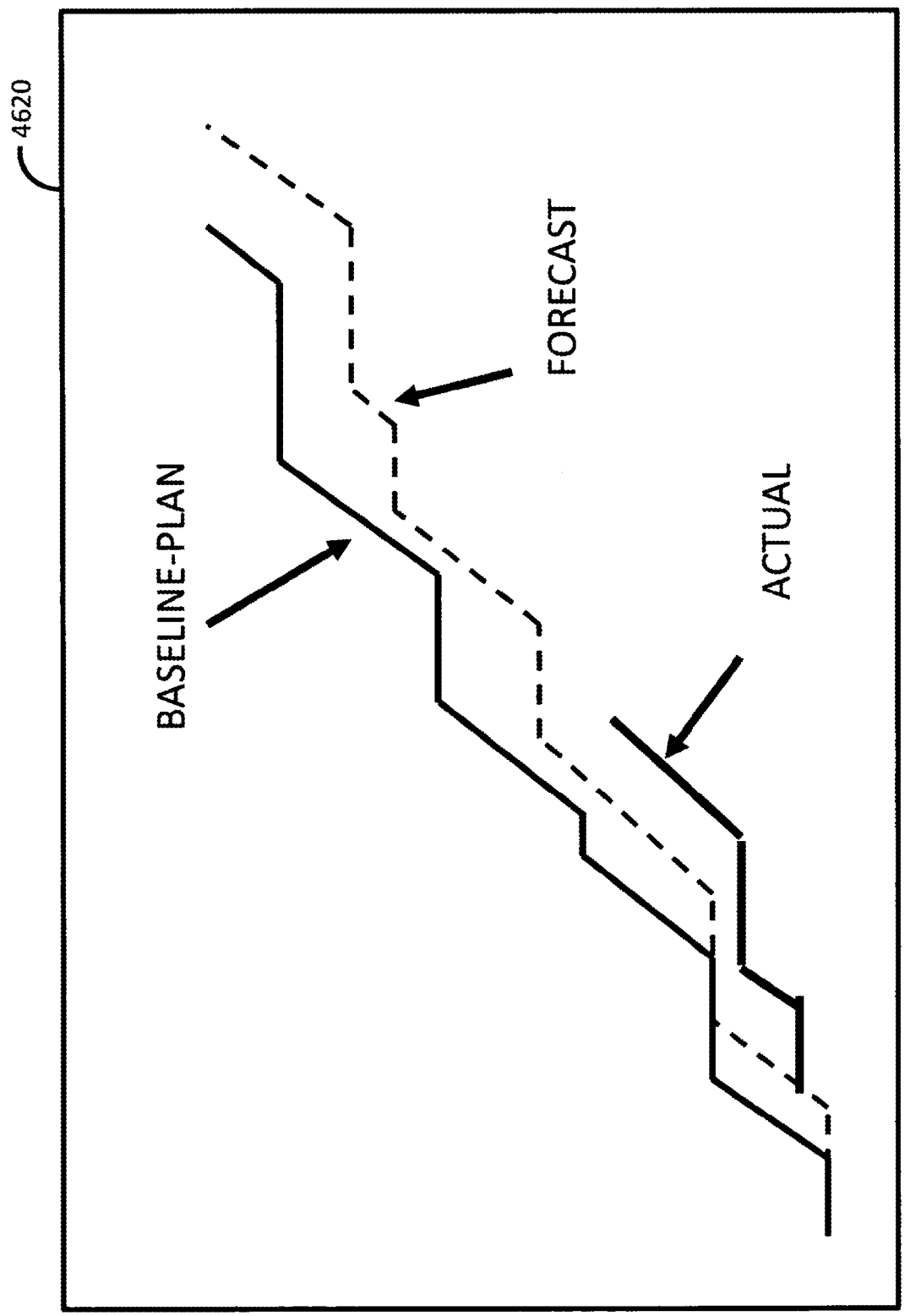

FIG. 33E describes the graphical output of the module 4620 (4620 as in FIG. 33A).

DETAIL DESCRIPTION OF THE PREFERRED EMBODIMENT OF THE INVENTION

FIG. 1 (schematic diagram) describes the various applications of the requirement, compliance and resource management methodology 100 (as described in FIG. 5A) or 120 (as described in FIG. 7A) or 140 (as described in FIG. 9A) in many industries (e.g., manufacturing, agriculture, pharmaceuticals, healthcare, energy, aerospace, defense and finance (including banking)).

Furthermore, the requirement, compliance and resource management methodology 100 or 120 or 140 can be customized to fit any product/service in any industry.

The requirement, compliance and resource management methodology 100 (as described in FIG. 5A) configured/enhanced with the question/answer format of a requirement input module and the fuzzy logic algorithm module can be designated as the requirement, compliance and resource management methodology 120 (as described in FIG. 7A).

Fuzzy means not clear (blurred). Fuzzy logic is a form of approximate reasoning, that can represent variation or imprecision in logic by making use of natural language (NL) in logic.

Approximation is inherent and inevitable in any process step and approximation can be modeled and managed explicitly. A fuzzy logic algorithm module can represent approximations for inputs and outputs in the requirement, compliance and resource management methodology 120.

The requirement, compliance and resource management methodology 120 (as described in FIG. 7A) further configured/enhanced with a statistical algorithm module and a weighting logic algorithm module can be designated as the requirement, compliance and resource management methodology 140 (as described in FIG. 9A).

Uncertainty/variation is inherent and inevitable in any process step and uncertainty/variation can be modeled and managed explicitly. A statistical algorithm module can represent uncertainty/variation for inputs and outputs in the requirement, compliance and resource management methodology 140.

The requirement, compliance and resource management methodology 100 or 120 or 140 can be integrated with an enterprise storage system (e.g., an enterprise server) and/or an enterprise device (e.g., a laptop and a mobile internet appliance).

Alternatively, the requirement, compliance and resource management methodology 100 or 120 or 140 can be located at a cloud storage system for software-as-a service (SaaS).

Furthermore, the requirement, compliance and resource management methodology 100 or 120 or 140 is scalable.

Many components of the requirement, compliance and resource management methodology 100 or 120 or 140 are modular to permit automating some functions, but not automating other functions.

Furthermore, the components of the requirement, compliance and resource management methodology 100 or 120 or 140 can include (a) transactional database, (b) management portal/dashboard, (c) business intelligence system, (d) customizable reporting, (e) external access via internet, (f) search, (g) document management, (h) messaging/chat and (i) workflow management.

Best practices can be incorporated in the requirement, compliance and resource management methodology 100 or 120 or 140. This means that the requirement, compliance and resource management methodology 100 or 120 or 140 can reflect a defined interpretation as the most effective way to perform a process step and a customer can also modify the best practices.

Furthermore, the requirement, compliance and resource management methodology 100 or 120 or 140 can be configured with an application programming interface (API) to integrate (e.g., direct integration and/or database integration) with other software programs (e.g., MS Word, MS Excel, MS Project and Enterprise Resource Planning (ERP)).

Enterprise Resource Planning (ERP) is an integrated software program/system that operates in near real time and/or real time, without relying on periodic updates with a common database, which supports (a) finance/accounting (general ledger, payables, cash management, fixed assets, receivables, budgeting and consolidation), (b) human resources (payroll, training, benefits, 401K, recruiting and diversity management), (c) manufacturing (bill of materials, engineering, work orders, scheduling, capacity, workflow management, quality control, cost management, manufacturing process, manufacturing projects, manufacturing flow, activity based costing and product life cycle management), (d) supply chain management (order to cash, inventory, order entry, purchasing, product configurator, supply chain planning, supplier scheduling, inspection of goods, claim processing and commissions), (e) project management (costing, billing, time and expense, performance units and activity management) and (f) customer relationship management (sales and marketing, commissions, service, customer contact and call center support).

FIG. 2 (schematic diagram) describes two-way connection of the requirement, compliance and resource management methodology 100 or 120 or 140 (located at an enterprise storage system) to many systems (e.g., work station) and/or devices (e.g., personal computer, laptop and internet appliance). The internet appliance can be a mobile internet appliance (e.g., iPad).

FIG. 2 (schematic diagram) also describes one-way connection of the requirement, compliance and resource management methodology 100 or 120 or 140 (located at an enterprise storage system) to a mobile phone. The one way connection can illustrate only summary result (summary dash board) with a mobile phone, due to a limitation of the available display screen size.

Figure 3:
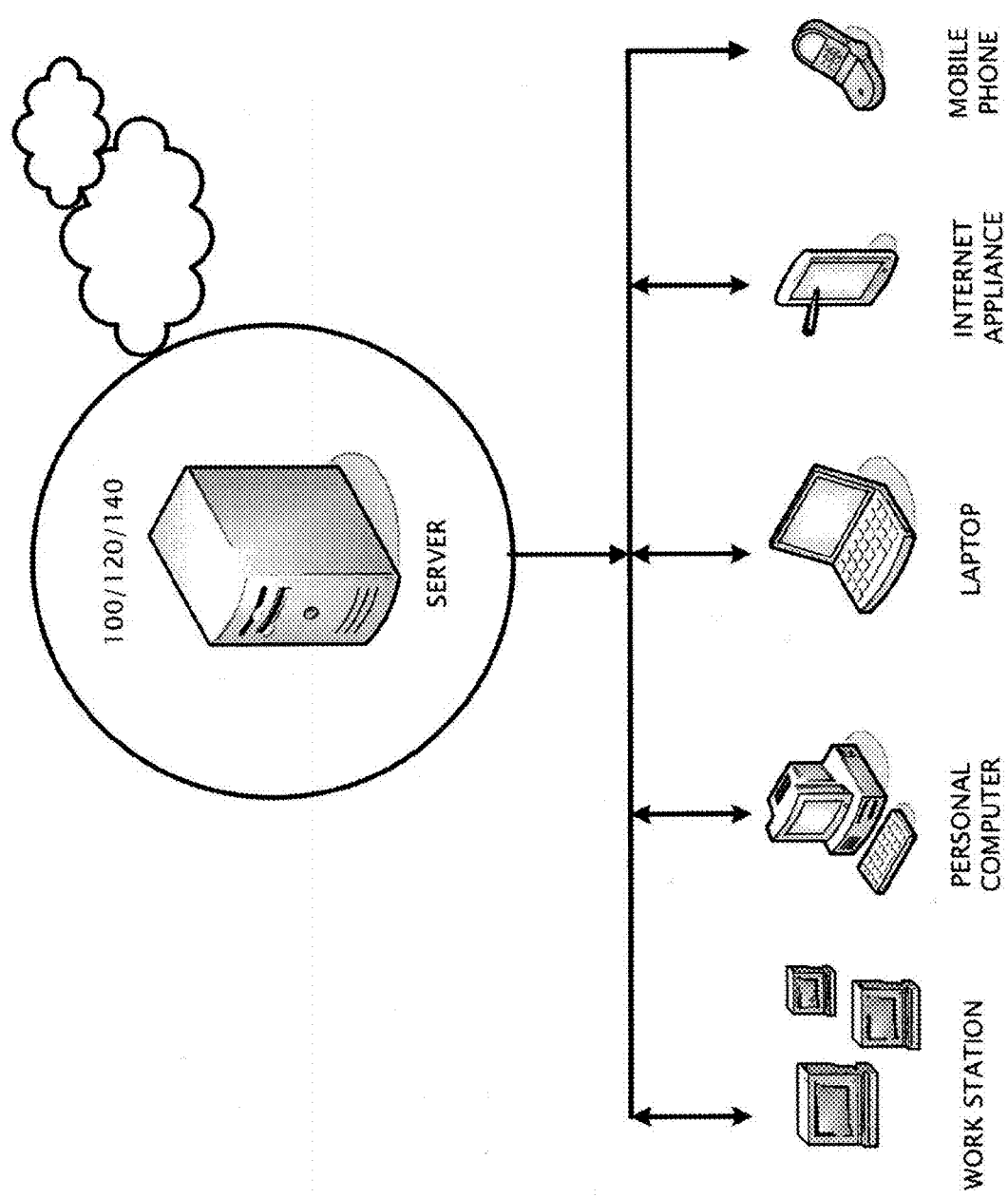
FIG. 3 (schematic diagram) describes the connectivity (both one-way and two-way connectivity) of the requirement, compliance and resource management methodology (located at a cloud server) with other external systems and/or devices.

FIG. 3 (schematic diagram) describes two-way connection of the requirement, compliance and resource management methodology 100 or 120 or 140 (located at a cloud storage system) to many systems (e.g., work station) and/or devices (e.g., personal computer, laptop and internet appliance). The internet appliance can be a mobile internet appliance (e.g., iPad).

FIG. 3 (schematic diagram) also describes one-way connection of the requirement, compliance and resource management methodology 100 or 120 or 140 (located at a cloud storage system) to a mobile phone. The one way connection can illustrate only summary result (summary dash board) with a mobile phone, due to a limitation of the available display screen size.

Figure 4:
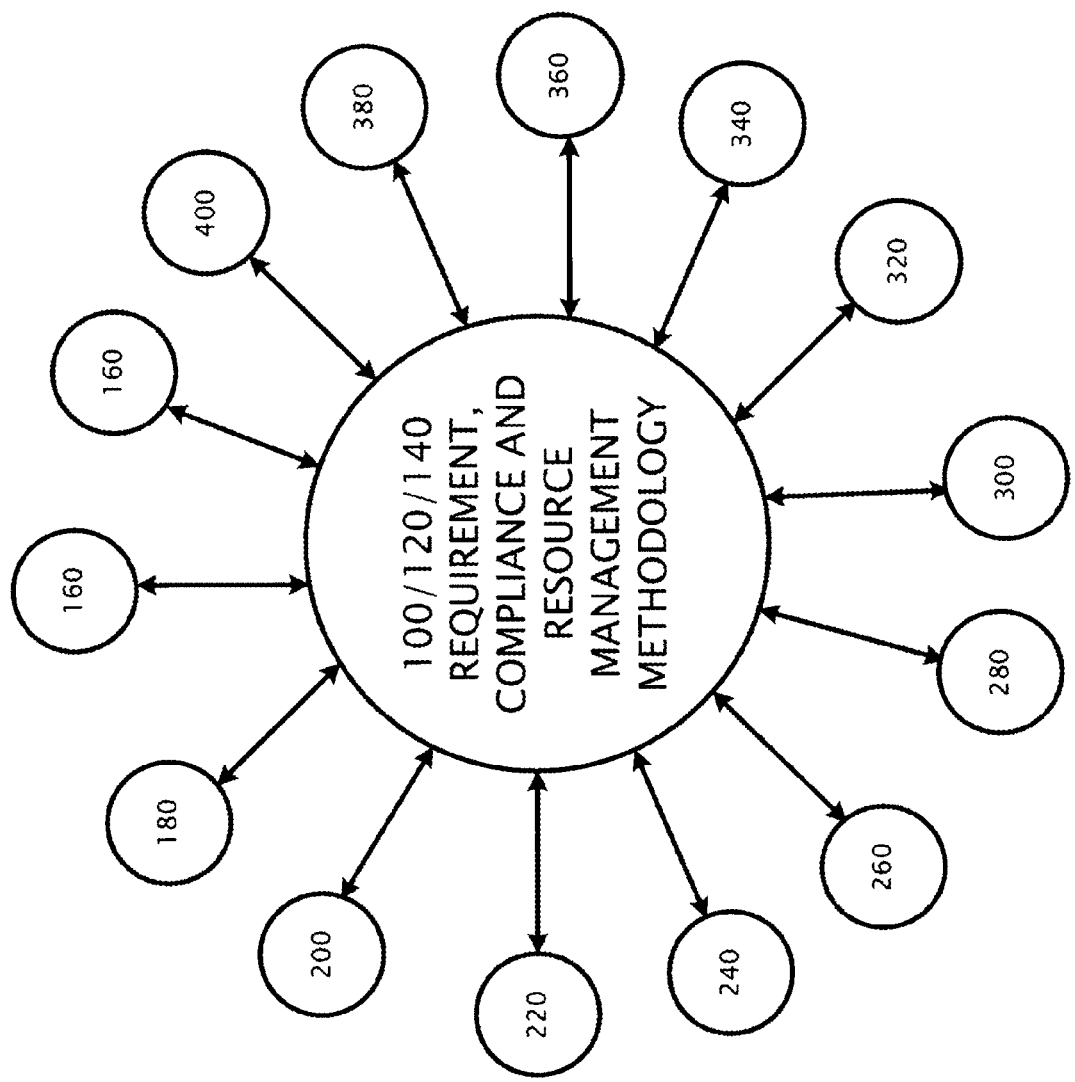
FIG. 4 (schematic diagram) describes the connectivity (two-way connectivity) of the requirement, compliance and resource management methodology with users for (a) near real time and/or real time collaboration between users, (b) product development, (c) procurement, system/test/QA engineering, (d) legal/compliance requirement/management, (e) product management, (f) product marketing, (g) technical support, (h) financial management and (i) executive management.

FIG. 4 (schematic diagram) describes two-way connection of the requirement, compliance and resource management methodology 100 or 120 or 140 to various functional modules. User is denoted by 160, Algorithm Engineering is denoted by 180, Hardware Engineering is denoted by 200, System Engineering is denoted by 220, Subcontracting is denoted by 240, Procurement is denoted by 260, Product Management is denoted by 280, Product Marketing is denoted by 300, Technical Support is denoted by 320, Internal Legal is denoted by 340, External Legal (Compliance) is denoted by 360, Financial Management is denoted by 380 and Executive (General) Management is denoted by 400.

FIG. 5A (block diagram) describes the requirement, compliance and resource management methodology 100 and all relevant modules are described below: Requirement Processing Module is denoted by 100A, Compliance & Legal Module is denoted by 100B, Requirement Input Module is denoted by 100C, Specifications and Matrices Module is denoted by 100D, Resource Allocation Module is denoted by 100E, Even Verification Module is denoted by 100F and Graphical User Interface Module is denoted by 100A1.

Event verification module 100F can be configured with an application programming interface (API) to integrate (e.g., direct integration and/or database integration) the requirement, compliance and resource management methodology 100 with other software programs (e.g., MS Word, MS Excel, MS Project and Enterprise Resource Planning (ERP)).

Graphical user interface module 100A1 can be configured a search interface for input data, interpretation of input data, analysis, output data and interpretation of output data.

The requirement processing module 100A can include an embedded constraint analysis tool. It adopts the common idiom that a chain is no stronger than its weakest link.

Assuming the goal of a project utilizing the requirement, compliance and resource management methodology and its success/failure measurements are clearly defined, then the process steps of the embedded constraint analysis tool are:
1. identifying all constraints
2. deciding to exploit the constraints (how to get the most out of the constraints)
3. making changes needed to break the first critical constraint
4. If the first critical constraint has been broken, then to go to step 3 in order to break the second critical constrain, the third critical constrain and so on.

Buffer can be used to protect the constraint from varying in the entire the requirement, compliance and resource management methodology. Buffer can also allow for normal variation and the occasional upset before and behind the constraint.

Figure 5E1:
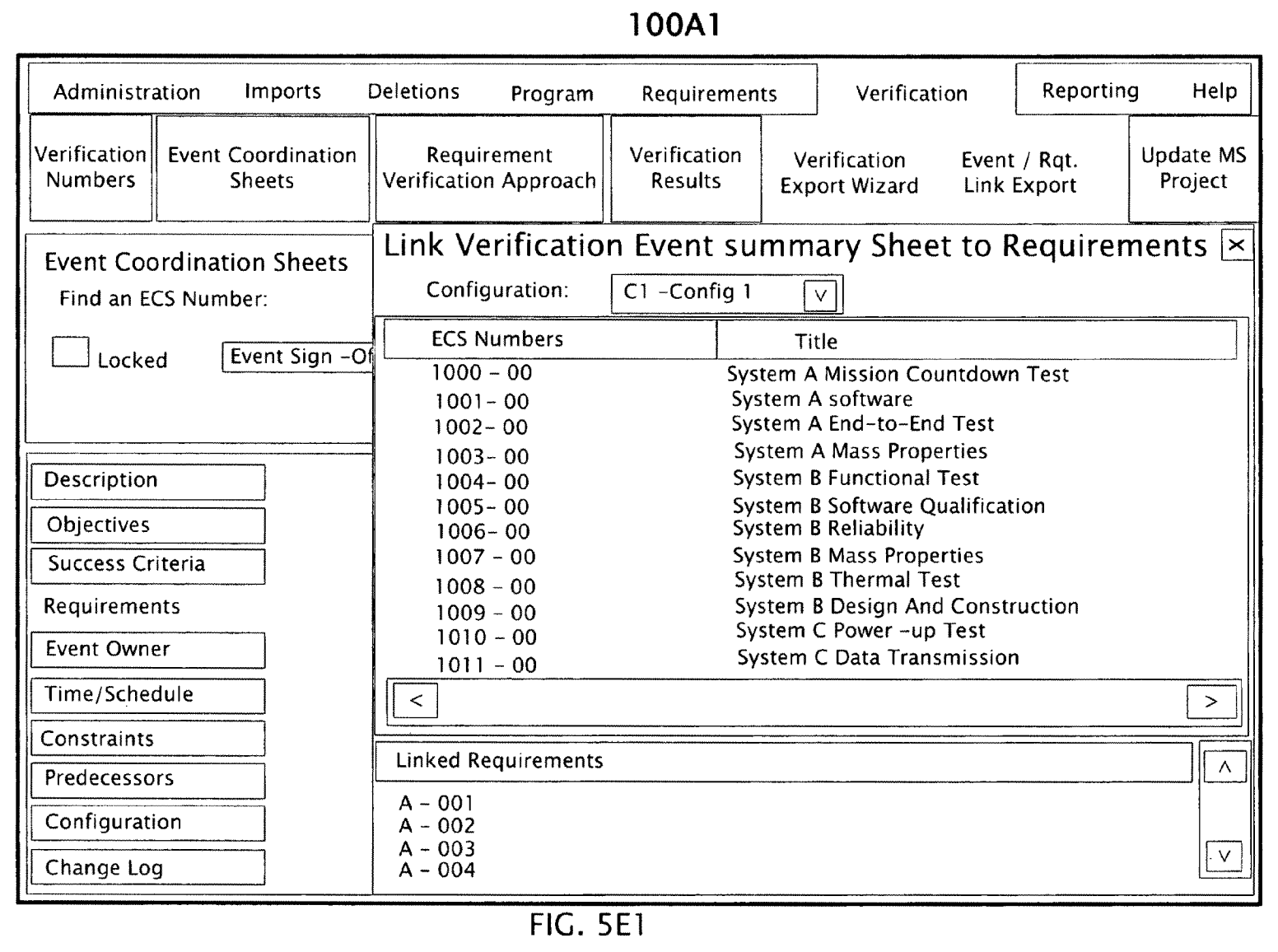

FIG. 5B1 and FIG. 5B2 are divided part of FIG. 5B. FIG. 5C1 and FIG. 5C2 are divided part of FIG. 5C. FIG. 5E1 and FIG. 5E2 are divided part of FIG. 5E. FIG. 5F1 and FIG. 5F2 are divided part of FIG. 5F. FIGS. 5B (schematic chart), 5C (schematic chart), 5D (schematic chart), 5E (schematic chart) and 5F (schematic chart) describe some typical outputs of some components of the embodiment of the requirement, compliance and resource management methodology 100 (as described in FIG. 5A).

An event coordination matrix (ECM) is a tool that can enable cross-functional and cross-enterprise coordination for facilitating verification, validation, certification and accreditation (VVC&A) planning and execution.

The development of the ECM can be driving factor in verification planning activities. Typically ECM can be developed early in the verification planning process to drive an early adoption amongst key stakeholders and also to allow for an identification of potential discrepancies as early as possible.

The responsibility of the development of the ECM primarily relies on inputs from a test and verification (T&V) team, a system engineering (SE) team and an enterprise integration (EI) team, with additional inputs provided by specialty engineering, quality assurance/mission assurance, information assurance and logistics planning.

The development of the ECM is a cross-enterprise activity and is comprised of a four-part process:
1. identification of requirements,
2. identification of analysis, inspection, demonstration and test (AIDT) events,
3. allocation of requirements to specific events, and
4. allocation of events to timelines or key events within schedules.

The development, population and refinement of the ECM is coordinated both within the system engineering & integration (SE&I) organization and prime contractor organization by the EI team to ensure a thorough and balanced approach across the enterprise.

Once all requirements (both imposed and derived) have been addressed through VVC&A and identified by the SE team, then all activities or events where the VVC&A will occur have been identified by the T&V team, the requirements are then allocated to the set of specific events.

As depicted in FIG. 5F, the left side of the ECM includes the requirements information and the top of the ECM addresses the individual events that are planned to accomplish the VVC&A.

Within the ECM, all activities and events (where VVC&A to be performed) are documented and tracked. The objective of the ECM is to correlate all requirements to specific activities and events. By focusing on all VVC&A activities (as opposed to test only), it becomes possible to optimize the T&V approach across the entire breadth of the program, allowing the T&V team to factor in analysis, inspection and demonstration events into their verification planning. By analyzing the VVC&A activities across the program, the T&V team can act in a truly integrated fashion, optimizing the development and re-use of test data, scenarios, run conditions, truth models, environmental conditions and even the execution of entire events to allow for efficient planning.

By looking at the complete picture of all integrated verification activities, the SE&I organization truly has insight and oversight into the planned activities of the prime contractors and can identify areas of the program, where there is either not enough verification being planned (for example, mission critical requirements (MCRs), interoperability requirements and critical technical parameter (CTP) requirements) or too much verification being planned (redundant or extraneous events).

An added benefit of this integrated approach to verification planning is that it now becomes possible for the T&V organization to report confidence to the customer about when technical functionality will come on-board and also to understand the impact of changes to schedule, performance and budget, thereby facilitating more accurate trade analysis and higher confidence recommendations on how to solve both programmatic and technical problems as they arise.

A key consideration to note is the time-phase approach to the identification of Analysis, Inspection, Demonstration & Test (AIDT) events. Identifying events that only represent final acceptance tests (FAT) as the primary focus of an integrated T&V approach is short-sighted and will not allow the SE&I to truly act as a system integrator, thereby making it much more difficult to report incremental progress (and thus confidence) to the customer. As the program progresses, the SE&I organization has identified analysis events that will occur prior to FAT. These analysis events allow the SE&I organization to analyze the technical details of the prime contractor's exercises, rehearsals and even internal verification activities.

By scheduling analysis events that are centered on both technical capability delivery and reasonable time-phasing, the SE&I organization can more accurately predict when technical capabilities will be delivered and provide more accurate, actionable data upon which the customer can make decisions.

Another key consideration is the design versus acceptance verification. The design verification encompasses those things typically performed once for a system (induced environments, etc.) and, in many cases, by inspection. The acceptance verification can occur on a component-by-component or build-by-build basis. As the requirements are allocated to the events, the verification type (AIDT) is captured in the ECM to ensure that the validation and verification is addressed adequately.

Given the considerations defined above, in order to optimize the benefit of a truly integrated SE&I methodology, all aspects of VVC&A have to be addressed in one matrix ensuring the AIDT and VVC&A activities can be performed once and at the lowest cost, risk and most optimum time/venue.

Tables 6A, 6B, 6C, 6D and 6E describe the features and benefits of the requirement, compliance and resource management methodology 100, as described in FIG. 5A.

The key features and benefits of the requirement, compliance and resource management methodology 100 are listed below:

Requirement Processing Module (100A) Feature: Specification author "book boss" assignments. Requirement Processing Module (100A) Benefit: Provides ability to assign personnel with read/write access to specifications and requirements.

Compliance & Legal Module (100B) Feature: Import legal/regularity requirements (i.e., HIPAA). Compliance & Legal Module (100B) Benefit: Single source for legal/regulatory requirement in a true relational database.

Requirement Input Module (100C) Feature (1): Import customer requirements from MS Word/MS Excel/pdf into database. Requirement Input Module (100C) Benefit (1): Seamless import allows users to consolidate requirements into single, true relational database. Requirement Input Module (100C) Feature (2): Incorporates non-textual objects and images into database. Requirement Input Module (100C) Benefit (2): Allows non-textual objects to be associated with requirements objects.

Specifications and Matrices Module (100D) Feature (1): TPM, risk, critical issue tracking and control. Specifications and Matrices Module (100D) Benefit (1): Insightful reporting capability provides visibility to critical issues and unresolved actions, enabling efficient resource allocation. Specifications and Matrices Module (100D) Feature (2): Overall project completion status. Specifications and Matrices Module (100D) Benefit (2): Simple dashboard metrics which provide completion status at all levels of integration up to final end-item delivery. Specifications and Matrices Module (100D) Feature (3): Open action status. Specifications and Matrices Module (100D) Benefit (3): Quick and easy access to program action items and completion status. Specifications and Matrices Module (100D) Feature (4): Program usage statistics. Specifications and Matrices Module (100D) Benefit (4): Real-time metrics which display iris user statistics such as user frequency and duration.

Resource Allocation Module (100E) Feature (1): Hardware/software resource management. Resource Allocation Module (100E) Benefit (1): Allows for quick and easy reservation of hardware/software components needed to perform verification activities in specific facilities/locations. Flags, if there is a scheduling conflict in hardware/software resource allocation. Provides resource time and cost for each event. Resource Allocation Module (100E) Feature (2): Personnel resource management. Resource Allocation Module (100E) Benefit (2): Allows for quick and easy reservation of personnel and subject matter experts needed to perform verification activities in specific facilities/locations. Flags, if there is a scheduling conflict in hardware/software resource allocation. Provides resource time and cost for each event.

Event Verification Module (100F) Feature (1): Allocation of requirements to verification events. Event Verification Module (100F) Benefit (1): Provides real-time visibility to verification strategies, configuration and objectives thereby providing programs the ability to leverage verification activities in support of agile acquisition initiatives. Enables collaboration ensuring early identification of risks. Event Verification Module (100F) Feature (2): Customizable verification event coordination matrix. Event Verification Module (100F) Benefit (2): Customizable event coordination matrix (ECM) generator which allows users to organize and group events by end-item deliverables and engineering disciplines. Provides ability for users to see if they can move requirements to another event and the event in question may also eliminated thereby streamlining verification activities. Event Verification Module (100F) Feature (3): Event resource management. Event Verification Module (100F) Benefit (3): Tightly couples required verification event resources to integrated schedules to better coordinate resources. Event Verification Module (100F) Feature (4): Event configuration control and change history. Event Verification Module (100F) Benefit (4): Ensures verification baseline is under strict configuration control. Maintains a detailed history of all changes against specific verification activities. Event Verification Module (100F) Feature (5): Traceability from requirements to compliance data artifacts. Event Verification Module (100F) Benefit (5): Provides closed-loop automated hyperlinks which provide quick access to requirements compliance data and related artifacts. Event Verification Module (100F) Feature (6): Verification activity linkage to MS project schedules. Event Verification Module (100F) Benefit (6): Tightly couples verification activities with program milestones to ensure timely end-item delivery. Event Verification Module (100F) Feature (7): Electronic signature (event planning and completion). Event Verification Module (100F) Benefit (7): Electronic signature capability dramatically reduces test activity approval cycle. Event Verification Module (100F) Feature (8): Enterprise integration with external data sources. Event Verification Module (100F) Benefit (8): Allows for correlation of data elements across the enterprise dramatically improving collaboration, increasing work force efficiency and reducing cost.

Graphical User Interface Module (100A1) Feature (1): Simple and intuitive GUI user interface. Graphical User Interface Module (100A1) Benefit (1): Simple, intuitive interface provides powerful capabilities for importing, linking, analyzing, reporting and managing requirements, including traceability to associated project verification events and team assignments. Requires minimal user training. Graphical User Interface Module (100A1) Feature (2): Ready for use upon installation. Graphical User Interface Module (100A1) Benefit (2): No custom scripting required results in lower implementation cost, faster usage. May be tailored to support specific project processes.

A major challenge in the requirement, compliance and resource management methodology 100 (as described in FIG. 5A) is in qualitative and imprecise terms.

The use of soft functional requirements in a task-based specification methodology can capture the imprecise requirements and formulate soft functional requirements using a fuzzy logic algorithm module. More specifically, the soft functional requirements can be represented by canonical form in test-score semantics.

FIG. 7A (block diagram) describes another embodiment of the requirement, compliance and resource management methodology, further enhanced by a question and answer format of a requirement input module 100 C 1 and a fuzzy logic algorithm module 100F1 and all relevant modules are described below: Requirement Processing Module is denoted by 100A, Compliance & Legal Module is denoted by 100B, Requirement Input Module is denoted by 100C, Specifications and Matrices Module is denoted by 100D, Resource Allocation Module is denoted by 100E, Event Verification Module is denoted by 100F, Graphical User Interface Module is denoted by 100A1, Question & Answer Format For Requirement Input Module is denoted by 100C1 and Fuzzy Logic Algorithm Module is denoted by 100F1.

FIGS. 7B (schematic diagram) and 7C (schematic diagram) describes the implementation of a fuzzy logic algorithm module 100F1.

A fuzzy logic algorithm module can be implemented as follows: (a) define linguistic variables and terms, (b) construct membership functions, (c) construct rule base, (d)

convert crisp inputs into fuzzy values, utilizing membership functions (fuzzification), (e) evaluate rules in the rule base (inference), (f) combine the results of each rules (inference) and (g) convert outputs into non-fuzzy values (de-fuzzification).

Fuzzy logic is a relatively new technique for solving problems related to requirement, compliance and resource management methodology. The key idea of fuzzy logic is that it uses a simple/easy way to secure the output(s) from the input(s), wherein the outputs can be related to the inputs by using if-statements.

Effective management of requirement, compliance and resource management methodology is crucial in producing a new product and/or new system.

In a competitive world, organizations are forced to look for scientific tools in evaluation of effective management of requirement, compliance and resource management methodology. The management team is responsible for producing an output and hence the management team must be constantly aware of the goal, purpose and management efficiency. Furthermore, effectiveness in requirement, compliance and resource management methodology, which is a synonym of a project success, is measured or assessed in terms of the degree of achievement of project objectives.

For example, if project time delay (PTD) is low (L) and project time delay gradient (PTDG) is high (H), then according to a fuzzy decision, the project management efficiency (PME) is very high (VH).

However, the boundaries of very high, high, medium and low of any decision variable are determined by expert knowledge.

A fuzzy decision making system is a scientific tool that can be used to solve the problem. This means that information of expert knowledge and experience in a fuzzy decision making system is used for determining the project management efficiency.

The development of such a fuzzy decision making system can be implemented by utilizing the Mathworks software. Fuzzy Logic Toolbox from Mathworks Software is a menu driven software that can allow the implementation of fuzzy constructs like membership functions and a database of decision rules.

Fuzzy Logic Toolbox from Mathworks Software also provides Mathworks Software's MATLAB functions, graphical tools and Mathworks Software's Simulink blocks for analyzing, designing and simulating systems based on fuzzy logic.

Furthermore, Fuzzy Logic Toolbox from Mathworks Software enables (a) design fuzzy inference systems, including fuzzy clustering and neuro-fuzzy system.

A neural network can approximate a function, but it is impossible to interpret the result in terms of natural language. The fusion of neural networks and fuzzy logic in neuro-fuzzy system can provide both learning as well as readability. Neuro-fuzzy system is based on combinations of artificial neural networks and fuzzy logic.

Neuro-fuzzy system can use fuzzy inference engine with fuzzy rules for modeling the project uncertainties which is enhanced through learning the various situations with a radial basis function (RBF) neural network.

A radial basis function (RBF) neural network consists of an input layer, hidden layer and output layer with the activation function of the hidden units being radial basis functions. Normally, an RBF consists of a hidden layer and a linear output layer. One of the most common kinds of radial basis function is the Gaussian bell-shaped distribution. The response of the hidden layer unit is dependent on the distance of an input is from the centre represented by the radial basis function (Euclidean Distance). Each radial function has two parameters: a centre and a width. The width of the basis function determines the spread of the function and how quickly the activation of the hidden node decreases with the input being an increased distance from the centre. The output layer neurons are weighted linear combination of the RBF in the hidden layer. RBF network can be modeled by the following equations:

$$y_j(x) = \sum_{i=1}^{n} w_{ji}\psi_i(x) + b_j$$

where yj(x) is the output at the jth node in the output layer, n is the number of hidden nodes, wji is the weight factor from the ith hidden node to the jth output node, $\Psi i(x)$ is the radial basis activation function of the hidden layer and bj is the bias parameter of the jth output node.

$$\psi_i(x) = \exp\left(\frac{-\|X - u_i\|^2}{2\sigma_i^2}\right)$$

where X is the input vector, ui is the center vector of ith hidden node and σ is the width of the basis function. There are two distinct types of Gaussian RBF architectures. The first type uses the exponential activation function, so the activation of the unit is a Gaussian bump as a function of the inputs. The second type of Gaussian RBF architecture uses the softmax activation function, so the activations of all the hidden units are normalized to sum to one. This type of network is often called a "normalized RBF" or NRBF network. An NRBF network with unequal widths and equal heights can be written as:

$$\psi_i(x)(softmax) = \frac{\exp(h_i)}{\sum_{i=1}^{n} \exp(h_i)}$$

$$h_i = \left(-\sum_{l=1}^{2} \frac{(X_l - u_{il})^2}{2\sigma_i^2}\right)$$

Again, X is the input vector, uil is the centre of the ith hidden node (i=1, . . . , 12) that is associated with the lth (l=1,2) input vector, σi is a common width of the ith hidden node in the layer and softmax (hi) is the output vector of the ith hidden node. The radial basis activation function used in this study is the softmax activation function. The NRBF neural network developed during this study consists of an input layer, a hidden layer and an output layer, which include 2, 12 and 1 node, respectively. At first, the input data is used to determine the centers and the widths of the basis functions for each hidden node. The second step includes the procedure, which is used to find the output layer weights that minimize the quadratic error between the predicted values and the target values. Mean square error (the average sum of squares error) can be defined as:

$$MSE = \frac{1}{N}\sum_{k=1}^{N}((TE)_k^{exp} - (TE)_k^{cal})^2$$

For inherent uncertainties in the requirement, compliance and resource management methodology 120/140 due to external factors, shifting business objectives and poorly defined methods, a neuro-fuzzy system can be utilized for scenario planning.

FIG. 7B describes crisp inputs are fed into fuzzifier module to inference module. Inference module is based on rules. The inference module is fed into defuzzifier module then to crisp outputs.

FIG. 7C describes an application of fuzzy logic in a test design. The test design takes into account of (a) basic information, (b) customer special requirements, (c) knowledge rules and (d) mathematical modeling. Test design then creates a list of tests based fuzzy logic rules (fuzzy logic rules are based on graded performance database and weighting coefficients) with ranking.

Fuzzy set theory is a generalization of the ordinary set theory. A fuzzy set is a set whose elements belong to the set with some degree of membership μ. Let X be a collection of objects. It is called universe of discourse. A fuzzy set A∈ X is characterized by membership function μA(x) represents the degree of membership, Degree of membership maps each element between 0 and 1. It is defined as: A={((x, $\mu_A(x)$); x∈ X}.

FIG. 7D illustrates the membership functions of three fuzzy sets viz. "small", medium" and "large" for a fuzzy variable X. The universe of discourse is all possible values of Xs.

It is X=[15;25]. At X of 18.75, the fuzzy set is a "small" with membership value of 0.6. Hence, $\mu_{small}$ (18.75) is 0.6; $\mu_{medium}$ (18.75) is 0.4 and $\mu_{large}$ (18.75) is 0.4.

Fuzzy inference system is a rule-based system. It is based on fuzzy set theory and fuzzy logic. Fuzzy inference system is mappings from an input space to an output space. Fuzzy inference system allows constructing structures which are used to generate responses (outputs) for certain stimulations (inputs). Response of fuzzy inference system is based on stored knowledge (relationships between responses and stimulations). Knowledge is stored in the form of a rule base. Rule base is a set of rules. Rule base expresses relations between inputs of system and its expected outputs. Knowledge is obtained by eliciting information from specialists. These systems are usually known as fuzzy expert systems. Another common denomination for fuzzy inference system is fuzzy knowledge-based systems. It is also called as data-driven fuzzy systems. A fuzzy decision making system is comprised of four main components: a fuzzification interface, a knowledge base, decision making logic, and a defuzzification interface. In essence, a fuzzy decision making system is a fuzzy expert system. A fuzzy expert system is oriented towards numerical processing where conventional expert systems are mainly symbolic reasoning engines.

FIG. 7E describes a decision flow chart of the fuzzy logic module of the requirement, compliance and resource management methodology 120, as described in FIG. 7A.

There are key four components in a decision flow chart of the fuzzy logic module: (a) The fuzzification interface: It measures the values of the input variables on their membership functions to determine the degree of truth for each rule premise, (b) The knowledge base: It comprises experts' knowledge of the application domain and the decision rules that govern the relationships between inputs and outputs. The membership functions of inputs and outputs are designed by experts based on their knowledge of the system and experience, (c) The decision making logic: It is similar to simulating human decision making in inferring fuzzy control actions based on the rules of inference in fuzzy logic. The evaluation of a rule is based on computing the truth value of its premise part and applying it to its conclusion part. This results in assigning one fuzzy subset to each output variable of the rule. In Min Inference the entire strength of the rule is considered as the minimum membership value of the input variables' membership values. A rule is said to be fire, if the degree of truth of the premise part of the rule is not zero, (d) The defuzzification interface: It converts a fuzzy control action (a fuzzy output) into a nonfuzzy control action (a crisp output). The most common used method in defuzzification is the center of area method (COA). The center of area method computes the crisp value as the weighted average of a fuzzy set.

Tables 8A, 8B, 8C, 8D and 8E describe the features and benefits of the requirement, compliance and resource management methodology 120, as described in FIG. 7A.

The key features and benefits of the requirement, compliance and resource management methodology 120 are listed below:

Requirement Processing Module (100A) Feature: Specification author "book boss" assignments. Requirement Processing Module (100A) Benefit: Provides ability to assign personnel with read/write access to specifications and requirements.

Compliance & Legal Module (100B) Feature: Import legal/regularity requirements (i.e., HIPPA). Compliance & Legal Module (100B) Benefit: Single source for legal/regulatory requirement in a true relational database.

Requirement Input Module (100C) Feature (1): Import customer requirements from MS Word/MS Excel/pdf into database. Requirement Input Module (100C) Benefit (1): Seamless import allows users to consolidate requirements into single, true relational database. Requirement Input Module (100C) Feature (2): Incorporates non-textual objects and images into database. Requirement Input Module (100C) Benefit (2): Allows non-textual objects to be associated with requirements objects.

Specifications and Matrices Module (100D) Feature (1): TPM, risk, critical issue tracking and control. Specifications and Matrices Module (100D) Benefit (1): Insightful reporting capability provides visibility to critical issues and unresolved actions, enabling efficient resource allocation. Specifications and Matrices Module (100D) Feature (2): Overall project completion status. Specifications and Matrices Module (100D) Benefit (2): Simple dashboard metrics which provide completion status at all levels of integration up to final end-item delivery. Specifications and Matrices Module (100D) Feature (3): Open action status. Specifications and Matrices Module (100D) Benefit (3): Quick and easy access to program action items and completion status. Specifications and Matrices Module (100D) Feature (4): Program usage statistics. Specifications and Matrices Module (100D) Benefit (4): Real-time metrics which display iris user statistics such as user frequency and duration.

Resource Allocation Module (100E) Feature (1): Hardware/software resource management. Resource Allocation Module (100E) Benefit (1): Allows for quick and easy reservation of hardware/software components needed to perform verification activities in specific facilities/locations. Flags, if there is a scheduling conflict in hardware/software resource allocation. Provides resource time and cost for each event. Resource Allocation Module (100E) Feature (2): Personnel resource management. Resource Allocation Module (100E) Benefit (2): Allows for quick and easy reservation of personnel and subject matter experts needed to perform verification activities in specific facilities/locations.

Flags, if there is a scheduling conflict in hardware/software resource allocation. Provides resource time and cost for each event.

Event Verification Module (100F) Feature (1): Allocation of requirements to verification events. Event Verification Module (100F) Benefit (1): Provides real-time visibility to verification strategies, configuration and objectives thereby providing programs the ability to leverage verification activities in support of agile acquisition initiatives. Enables collaboration ensuring early identification of risks. Event Verification Module (100F) Feature (2): Customizable verification event coordination matrix. Event Verification Module (100F) Benefit (2): Customizable event coordination matrix (ECM) generator which allows users to organize and group events by end-item deliverables and engineering disciplines. Provides ability for users to see if they can move requirements to another event and the event in question may also eliminated thereby streamlining verification activities. Event Verification Module (100F) Feature (3): Event resource management. Event Verification Module (100F) Benefit (3): Tightly couples required verification event resources to integrated schedules to better coordinate resources. Event Verification Module (100F) Feature (4): Event configuration control and change history. Event Verification Module (100F) Benefit (4): Ensures verification baseline is under strict configuration control. Maintains a detailed history of all changes against specific verification activities. Event Verification Module (100F) Feature (5): Traceability from requirements to compliance data artifacts. Event Verification Module (100F) Benefit (5): Provides closed-loop automated hyperlinks which provide quick access to requirements compliance data and related artifacts. Event Verification Module (100F) Feature (6): Verification activity linkage to MS project schedules. Event Verification Module (100F) Benefit (6): Tightly couples verification activities with program milestones to ensure timely end-item delivery. Event Verification Module (100F) Feature (7): Electronic signature (event planning and completion). Event Verification Module (100F) Benefit (7): Electronic signature capability dramatically reduces test activity approval cycle. Event Verification Module (100F) Feature (8): Enterprise integration with external data sources. Event Verification Module (100F) Benefit (8): Allows for correlation of data elements across the enterprise dramatically improving collaboration, increasing work force efficiency and reducing cost.

Graphical User Interface Module (100A1) Feature (1): Simple and intuitive GUI user interface. Graphical User Interface Module (100A1) Benefit (1): Simple, intuitive interface provides powerful capabilities for importing, linking, analyzing, reporting and managing requirements, including traceability to associated project verification events and team assignments. Requires minimal user training. Graphical User Interface Module (100A1) Feature (2): Ready for use upon installation. Graphical User Interface Module (100A1) Benefit (2): No custom scripting required results in lower implementation cost, faster usage. May be tailored to support specific project processes.

Question & Answer Format For Requirement Input Module (100C1) Feature (1) Project setup question and answer. Question & Answer Format For Requirement Input Module (100C1) Benefit (1): Step-by-step question and answer that allows user to quickly and easily set up a new project.

Fuzzy Logic Algorithm Module 100F1 Feature (1): Verification completion decision (fuzzy logic). Fuzzy Logic Algorithm Module 100F1 Benefit (1): Enables program decision makers to assess when verification is good enough.

Fuzzy Logic Algorithm Module 100F1 Feature (2): "Requirement goodness" estimation (fuzzy logic). Fuzzy Logic Algorithm Module 100F1 Benefit (2): Evaluates requirement goodness thereby reducing requirement rework and verification resource waste.

FIG. 9A (block diagram) describes another embodiment of the requirement, compliance and resource management methodology 140, further enhanced by a question and answer format of requirement input module 100C1, a fuzzy logic algorithm module 100F1, a statistical algorithm module 100F2 and a weighting logic algorithm module 100F3 and all relevant modules are described below: Requirement Processing Module is denoted by 100A, Compliance & Legal Module is denoted by 100B, Requirement Input Module is denoted by 100C, Specifications and Matrices Module is denoted by 100D, Resource Allocation Module is denoted by 100E, Event Verification Module is denoted by 100F, Graphical User Interface Module is denoted by 100A1, Question & Answer Format For Requirement Input Module is denoted by 100C1, Fuzzy Logic Algorithm Module is denoted by 100F1, Statistical Algorithm Module is denoted by 100F2 and Weighting Logic Algorithm Module is denoted by 100F3.

FIG. 9B (schematic chart) describes the implementation result of a statistical algorithm module 100F2.

Statistical Algorithm Module (100F2) Feature (1): Statistics variability. Statistical Algorithm Module (100F2) Benefit (1): Provides statistical estimating capability for empirical results that require statistical modeling to assess performance variability.

Furthermore the statistical algorithm module (100F2) can be also configured with a Monte Carlo simulation.

A Monte Carlo simulation can help solve problems that are too complicated to solve using equations or problems for which no equations exist. It is useful for problems which have lots of uncertainty in inputs.

In cost management, one can use Monte Carlo simulation to better understand project budget and estimate final budget at completion. Instead of assigning a probability distribution to the project task durations, project manager assigns the distribution to the project costs. These estimates are normally produced by a project cost expert, and the final product is a probability distribution of the final total project cost. Project managers often use this distribution to set aside a project budget reserve, to be used when contingency plans are necessary to respond to risk events. Monte Carlo simulation can also be used when making capital budgeting and investment decisions. Risk analysis is part of every decision made in the requirement, compliance and resource management.

The requirement, compliance and resource management is constantly faced with uncertainty, ambiguity and variability. And even though there may be an unprecedented access to information, one can't accurately model the future.

A Monte Carlo simulation allows seeing all the possible outcomes of decisions and assessing the impact of risk, allowing for better decision making under uncertainty for requirement, compliance and resource management.

A Monte Carlo simulation can be added utilizing add-ins such as @ Risk or Risk+algorithm.

A Monte Carlo simulation encompasses a technique of statistical sampling to approximate a solution to a quantitative problem.

The requirement, compliance and resource management methodology contains many variables. However, each variable has many possible values represented by a probability distribution function p(x).

Probability distribution function p(x) of each variable is a realistic way of describing uncertainty in each variable in a risk analysis.

By contrast, a Monte Carlo simulation can sample probability distribution function for each variable to produce hundreds or thousands of possible outcomes. The results are analyzed to get probabilities of different outcomes occurring.

In contrast to a Monte Carlo simulation, a spreadsheet project cost model utilizes traditional "what if" scenarios, wherein "what if" analysis gives equal weight to all scenarios.

Common probability distribution functions p(x) are: Normal/"Bell Curve"—The user simply defines the mean or expected value and a standard deviation to describe the variation about the mean. Values in the middle near the mean are most likely to occur. Lognormal—Values are positively skewed, not symmetric like a normal distribution. It is used to represent values that don't go below zero but have unlimited positive potential. Uniform—All values have an equal chance of occurring, and the user simply defines the minimum and maximum. Triangular—The user defines the minimum, most likely, and maximum values. Values around the most likely are more likely to occur. Variables that could be described by a triangular distribution include past sales history per unit of time and inventory levels. PERT—The user defines the minimum, most likely, and maximum values, just like the triangular distribution. Values around the most likely are more likely to occur. However values between the most likely and extremes are more likely to occur than the triangular; that is, the extremes are not as emphasized. Discrete—The user defines specific values that may occur and the likelihood of each.

A Monte Carlo simulation performs a risk analysis by building models of possible results by substituting a range of values-a probability distribution p(x) for any variable/factor that has an inherent uncertainty. It then calculates results over and over, each time using a different set of random values from the probability function p(x). Depending on the number of uncertainties and the ranges specified for them, a Monte Carlo simulation could involve thousands or tens of thousands of recalculations before it is completed. A Monte Carlo simulation produces distributions of possible outcome values.

A Monte Carlo simulation simulates the requirement, compliance and resource management methodology many times (thousands or tens of thousands of recalculations) and each time selecting a value of each variable from its probability distribution function p(x).

The outcome is a probability distribution of overall compliance and resource management methodology 140 through iterations of the model.

A Monte Carlo simulation is a powerful tool to quantify the potential effects of uncertainties of many variables in the requirement, compliance and resource management methodology 140.

But it should be noted a Monte carol simulation is only as good as model it is simulating and data/information/probability distribution function p(x) of a variable is fed into.

Furthermore, open-ended distributions (e.g., lognormal distribution) can be preferable than closed-ended (e.g., triangular distribution) distributions in a Monte carol simulation.

A Monte Carlo simulation can generally answer to the questions e.g., what is the probability of meeting the project budget? or what is the probability of meeting the project time deadline? or what is an optimum value of a project cost?

A Monte Carlo simulation provides a number of advantages over deterministic or "single-point estimate" analysis.

For example: Probabilistic Results. Results show not only what could happen, but how likely each outcome is.

For example: Graphical Results. Because of the data a Monte Carlo simulation generates, it is easy to create graphs of different outcomes and their chances of occurrence. This is important for communicating findings to all stakeholders.

For example: Sensitivity Analysis. With just a few cases, deterministic analysis makes it difficult to see which variables impact the outcome the most. In a Monte Carlo simulation, it is easy to see which inputs had the biggest effect on bottom-line results.

For example: Scenario Analysis: In deterministic models, it is very difficult to model different combinations of values for different inputs to see the effects of truly different scenarios. Using a Monte Carlo simulation, analysts can see exactly which inputs had which values together when certain outcomes occurred. This is invaluable for pursuing further analysis.

For example: Correlation of Inputs. In a Monte Carlo simulation, it's possible to model interdependent relationships between input variables. It's important for accuracy to represent how, in reality, when some factors go up, others go up or down accordingly.

FIG. 9C (statistical distribution plot) describes an outcome/output distribution of a project cost based on a Monte Carlo simulation.

FIGS. 9D (statistical distribution plot), 9E (statistical distribution plot) and 9F (statistical distribution plot) are typical inputs of a Monte Carlo simulation.

FIGS. 9G (schematic chart), 9H (schematic chart) and 9I (schematic chart) describes an implementation of the weighting logic algorithm.

Top-level requirements are decomposed into lower level requirements in a tree format as shown in FIG. 9G.

In FIG. 9G the weighting logic algorithm module 100F3 provides a method of increasing confidence in the prediction of TPMs. Parametric values are vertically summed for each level of integration for a given system (i.e., System, Segment, Element and Assembly) and shown in the "Spec Sum" row. An arbitrary numeric scaling factor or weight is applied to each level of assembly, thereby increasing the influence that the summed value has on the overall system for that particular level of integration. Summed values are multiplied by respective scale factors to produce a scaled total which is then added to yield an overall verification amount, 485 in this example. The system level parametric value of 15 is then divided by 485 to yield 0.0309, an effective system-level scaling factor which can be applied to each measured value of the overall system.

In FIG. 9H the system level scaling factor (0.0309) is multiplied by each measured value in the "tree", then multiplied by the Spec Scale factor from FIG. 9C. To obtain the "Scaled Total" values, the system level scaling factor (0.0309) is multiplies by the "Spec Sum" which is then multiplied by the scale factor for each level of integration. For example, the "Scaled Total" value for the "Segment" level of integration would be: system level scaling factor (0.0309)*Spec Scale Factor (2)*"Spec Sum" (21)=1.30.

In FIG. 9I to obtain the percent total that each level of integration's verification data contributes to the overall system-level TPM, the "Scaled Total" values from FIG. 9D is divided by the System-level requirement value (15). For example, the assembly level contribution would be 9.40/15 or 62.7%.

The requirement, compliance and resource management methodology can provide a method of predicting system performance parameters throughout the program development life cycle. As top-level system requirements or technical performance measurements (TPMs) are assessed, a statistical weighting algorithm gives users the ability to weight or influence the empirical data of some elements more than others in the same set.

As measurements are collected to verify lower level requirements, the requirement, compliance and resource management methodology can provide users with the ability to assign an arbitrary weighting coefficient to these measurements to increase their influence on the top-level performance prediction at a given point in time.

Lower level measurement weighting coefficients are typically greater than higher level coefficients, since there are a fewer system elements (variables) associated with the lower level measurement, thereby increasing measurement confidence.

Tables 10A, 10B, 10C, 10D, 10E and 10F describe the features/benefits of the requirement, compliance and resource management methodology 140, as described in FIG. 9A.

The key features and benefits of the requirement, compliance and resource management methodology 140 are listed below:

Requirement Processing Module (100A) Feature: Specification author "book boss" assignments. Requirement Processing Module (100A) Benefit: Provides ability to assign personnel with read/write access to specifications and requirements.

Compliance & Legal Module (100B) Feature: Import legal/regularity requirements (i.e., HIPPA). Compliance & Legal Module (100B) Benefit: Single source for legal/regulatory requirement in a true relational database.

Requirement Input Module (100C) Feature (1): Import customer requirements from MS Word/MS Excel/pdf into database. Requirement Input Module (100C) Benefit (1): Seamless import allows users to consolidate requirements into single, true relational database. Requirement Input Module (100C) Feature (2): Incorporates non-textual objects and images into database. Requirement Input Module (100C) Benefit (2): Allows non-textual objects to be associated with requirements objects.

Specifications and Matrices Module (100D) Feature (1): TPM, risk, critical issue tracking and control. Specifications and Matrices Module (100D) Benefit (1): Insightful reporting capability provides visibility to critical issues and unresolved actions, enabling efficient resource allocation. Specifications and Matrices Module (100D) Feature (2): Overall project completion status. Specifications and Matrices Module (100D) Benefit (2): Simple dashboard metrics which provide completion status at all levels of integration up to final end-item delivery. Specifications and Matrices Module (100D) Feature (3): Open action status. Specifications and Matrices Module (100D) Benefit (3): Quick and easy access to program action items and completion status. Specifications and Matrices Module (100D) Feature (4): Program usage statistics. Specifications and Matrices Module (100D) Benefit (4): Real-time metrics which display iris user statistics such as user frequency and duration.

Resource Allocation Module (100E) Feature (1): Hardware/software resource management. Resource Allocation Module (100E) Benefit (1): Allows for quick and easy reservation of hardware/software components needed to perform verification activities in specific facilities/locations. Flags, if there is a scheduling conflict in hardware/software resource allocation. Provides resource time and cost for each event. Resource Allocation Module (100E) Feature (2): Personnel resource management. Resource Allocation Module (100E) Benefit (2): Allows for quick and easy reservation of personnel and subject matter experts needed to perform verification activities in specific facilities/locations. Flags, if there is a scheduling conflict in hardware/software resource allocation. Provides resource time and cost for each event.

Event Verification Module (100F) Feature (1): Allocation of requirements to verification events. Event Verification Module (100F) Benefit (1): Provides real-time visibility to verification strategies, configuration and objectives thereby providing programs the ability to leverage verification activities in support of agile acquisition initiatives. Enables collaboration ensuring early identification of risks. Event Verification Module (100F) Feature (2): Customizable verification event coordination matrix. Event Verification Module (100F) Benefit (2): Customizable event coordination matrix (ECM) generator which allows users to organize and group events by end-item deliverables and engineering disciplines. Provides ability for users to see if they can move requirements to another event and the event in question may also eliminated thereby streamlining verification activities. Event Verification Module (100F) Feature (3): Event resource management. Event Verification Module (100F) Benefit (3): Tightly couples required verification event resources to integrated schedules to better coordinate resources. Event Verification Module (100F) Feature (4): Event configuration control and change history. Event Verification Module (100F) Benefit (4): Ensures verification baseline is under strict configuration control. Maintains a detailed history of all changes against specific verification activities. Event Verification Module (100F) Feature (5): Traceability from requirements to compliance data artifacts. Event Verification Module (100F) Benefit (5): Provides closed-loop automated hyperlinks which provide quick access to requirements compliance data and related artifacts. Event Verification Module (100F) Feature (6): Verification activity linkage to MS project schedules. Event Verification Module (100F) Benefit (6): Tightly couples verification activities with program milestones to ensure timely end-item delivery. Event Verification Module (100F) Feature (7): Electronic signature (event planning and completion). Event Verification Module (100F) Benefit (7): Electronic signature capability dramatically reduces test activity approval cycle. Event Verification Module (100F) Feature (8): Enterprise integration with external data sources. Event Verification Module (100F) Benefit (8): Allows for correlation of data elements across the enterprise dramatically improving collaboration, increasing work force efficiency and reducing cost.

Graphical User Interface Module (100A1) Feature (1): Simple and intuitive GUI user interface. Graphical User Interface Module (100A1) Benefit (1): Simple, intuitive interface provides powerful capabilities for importing, linking, analyzing, reporting and managing requirements, including traceability to associated project verification events and team assignments. Requires minimal user training. Graphical User Interface Module (100A1) Feature (2): Ready for use upon installation. Graphical User Interface Module (100A1) Benefit (2): No custom scripting required results in lower implementation cost, faster usage. May be tailored to support specific project processes.

Question & Answer Format For Requirement Input Module (100C1) Feature (1) Project setup question and answer. Question & Answer Format For Requirement Input Module (100C1) Benefit (1): Step-by-step question and answer that allows user to quickly and easily set up a new project.

Fuzzy Logic Algorithm Module 100F1 Feature (1): Verification completion decision (fuzzy logic). Fuzzy Logic Algorithm Module 100F1 Benefit (1): Enables program decision makers to assess when verification is good enough. Fuzzy Logic Algorithm Module 100F1 Feature (2): "Requirement goodness" estimation (fuzzy logic). Fuzzy Logic Algorithm Module 100F1 Benefit (2): Evaluates requirement goodness thereby reducing requirement rework and verification resource waste.

Weighting Logic Algorithm Module (100F3) Feature (1): TPM calculator (weighting logic). Weighting Logic Algorithm Module (100F3) Benefit (1): Allows program to calculate value of TPM throughout integration process.

FIGS. 11A (schematic chart) and 11B (schematic chart), describe specification development of a process implementation.

FIG. 11C (schematic chart) describes a typical verification summary sheet of a process implementation.

FIG. 11D (schematic chart) describes interaction between summary sheet of a process implementation (as described in FIG. 11C), simulation plans, test plans, test procedures, data verification and data analysis (as described in FIG. 11D) and simulation specifications (as described in FIG. 11E).

FIG. 11E (schematic chart) describes a typical simulation specification of a process implementation.

FIG. 11F (schematic chart) describes a typical integrated master schedule of a process implementation.

FIG. 11G (schematic chart) describes a requirement verification schedule of a process implementation.

In FIGS. 11A-11B the development of the Event Coordination Sheets (ECS) starts with the baseline specifications. In section 4.0 of system specifications, verification methods are assigned to each requirement in accordance with applicable standards. Requirements are then mapped into verification events based on the event objectives. One approach to defining verification events and determining which requirements should be mapped into specific verification events is to develop a spreadsheet similar to that shown in FIGS. 11A and 11B. TPMs and Mission Critical requirements are then identified. A balanced VSS approach will carefully allocate requirements into appropriate venues such that redundant verification, or "double-booking", is minimized.

In FIGS. 11C-11E once requirements have been allocated into verification venues, the ECS can now be created using the instructions below:

Description: A concise statement delineating the verification to be performed. If the verification has more than one sequence, break the sequence out here. Describe relationships among verification methods (e.g., where test output will be used to perform an analysis). If verification activities have been completed, type "Refer to referenced report(s)." If N/A, provide a brief explanation.

Objectives: Provide a concise overview of verification activity objectives. If the verification activity is conducted in several sequences, objectives may be written for each sequence, provided they address the requirements.

Success Criteria: Provide a brief description of verification activity pass/fail criteria. This must include the specific data and the results of any analyses that may be required to interpret the data and conclude whether or not the requirement has been successfully verified.

Requirements: (Include requirement paragraph and/or requirement ID.): Provide a comprehensive list of all the requirements that have been allocated to a given verification activity.

Timeline/Schedule: Define the expected duration of the verification activity relative to program milestones. Includes the expected duration of the entire verification activity including verification activity preparation, execution, data acquisition and data post processing and data analysis.

Constraints: Identify limitations on the extent of the verification activity conducted. Identify any special conditions on the test setup, test article, environmental conditions etc.

Pre-Test Requirements: Identify any special test equipment or resources. Reference report number and title only. (Applies only if verification procedure has been completed and report written.) If not applicable ("N/A"), to provide a brief explanation.

Configuration: Identify the hardware or software configuration for use during this verification procedure(s).

Data Acquisition Requirements: List verification procedure data requirements and products. Reference report number and title only. (Applies only if verification procedure has been completed and report written.).

Evidence of Closure: Identify the document title and number of the referenced report that contains the data which verifies that this (these) requirement(s) have been met. Attach referenced material to verification event form.

Each event will be coordinated using the requirement, compliance and resource management methodology (100/120/140)' dynamic schedule linking capability, which synchronizes events with the Integrated Master Schedule as shown in FIGS. 11F and 11G.

FIGS. 12A and 12B describe a process flowchart for requirement specification within a project setup.

In step 1020 one can create a user account, in step 1040 one can assign an access to a user and in step 1060 one can assign a level of access to the user.

In step 1080 the user can create a requirement specification tree, in step 1100 the user can name a requirement specification document, in step 1120 the user can describe the requirement specification document, in step 1140 the user can create the requirement specification document version number, in step 1160 the user can assign an access to other users, regarding the requirement specification document with a specific version, in step 1180 the user can create the requirement specification document directly, or otherwise in step 1220 the user can import the requirement specification document utilizing MS Excel program. In step 1240 if the imported requirement specification document is OK, then the user can stop in step 1280; otherwise the user can review the integrity of the imported requirement specification document in step 1260.

FIG. 13 describes a process flowchart for a requirement of parent/child (also known as master/slave) relationship within a project setup.

In step 1300 the user can define a requirement of importing parent/child relationship. In step 1320 the user can create the requirement of parent/child relationship directly and if this direct creation of the requirement of parent/child relationship is successful, then the user can stop in step 1340; otherwise, in step 1360 the user can import the parent/child relationship template by utilizing MS Excel program, in step 1380 the user can review the integrity of the imported parent/child relationship template. In step 1400 the user can import a requirement of parent/child relationship, in step 1420 the user can verify the integrity of the imported requirement of parent/child relationship utilizing a parent/child flow down report. In step 1440, if the imported requirement of parent/child relationship is OK, then the user can stop in step 1460; otherwise the user can reiterate to step 1380.

FIG. 14 describes a process flowchart for a requirement category within a project setup.

In step 1480 the user can define a requirement category. In step 1500 the user can create a requirement category directly. If the direct creation of the requirement category is successful, then the user can stop in step 1520; otherwise in step 1540 the user can import a requirement category template utilizing MS Excel program. In step 1560 the user can review the integrity of the imported requirement category template, in step 1580 the user can import a requirement category and in step 1600 the user can verify the integrity of the imported requirement category utilizing category filters. In step 1620 if the imported requirement category is OK, then the user can stop in step 1640; otherwise the user can reiterate to step 1560.

FIG. 15 describes process flowchart for a requirement verification event within a project setup. A verification event is a generic activity used to verify requirements by inspection, demonstration, analysis and test.

In step 1660 the user can define a requirement verification event within a project setup. In step 1680 the user can create a requirement verification event directly. If the direct creation of requirement verification event is successful, then the user can stop in step 1700; otherwise in step 1720 the user can import a requirement verification event template utilizing MS Excel program. In step 1740 the user can review the integrity of the imported requirement verification event template, in step 1760 the user can import a requirement verification event, in step 1780 the user can verify the integrity of the imported requirement verification event, utilizing a verification event report, in step 1800 if the imported requirement verification event is OK, then the user can stop in step 1820; otherwise the user can reiterate to step 1740.

FIG. 16 describes process flowchart for a resource allocation process within a project setup.

In step 1840 the user can ask a question if there are required resources to execute the event, if the answer is no, then the user can stop in step 1860. However, if the answer to the above question is yes, then the user can proceed to step 1880.

In step 1880 the user can ask a question if there are required software to execute the event, if the answer is no, then the user can proceed to step 2000. However, if the answer to the above question is yes, then the user can proceed to step 1900.

In step 1900 the user can input site location, where software will be used. In step 1920 the user can input lab/facility (within the site location) where the software will be used. In step 1940 the user can input required software component name and version. In step 1960 the user can input software start date and end date.

If the answer to the question (is there specific hardware to execute the event?) in step 2000 is yes then the user can proceed to step 2040; otherwise the user can stop at 2020. In step 2040 the user can input site location, where hardware will be used. In step 2060 the user can input lab/facility (within the site location) where the hardware will be used. In step 2080 the user can input required hardware component name and version. In step 2100 the user can input hardware start date and end date and stop is indicated as step 2120.

In FIG. 17A, requirements, schedules, resources and personnel are identified as 2140, 2160, 2180 and 2200 respectively before the machine transformation.

In FIG. 17A, requirements, schedules, resources and personnel are identified as 2260, 2300, 2320 and 2340 respectively after the machine transformation.

In FIG. 17A, action item, issue and verification events are identified as 2220, 2240 and 2280 respectively.

Furthermore, FIG. 17A, incorporates various machine transformations, which are denoted as 1, 2, 3, 4, 5a, 5b and 5c.

Furthermore, in FIG. 17B, risk management, pending changes, deviation and waiver ("dev & waiv"), giver/receiver and verification results are denoted by 2360, 2380, 2400, 2420 and 2440 respectively.

FIGS. 18A and 18B illustrate the machine transformation of requirements denoted as 1.

In FIG. 18A, in step 2460 purge requirements from data tables, in step 2480 import requirements from web services, in step 2500 purge specification names/versions from data tables, in step 2520 import specification names/versions from web services.

In FIG. 18B, in step 2540 purge specification document phases, in step 2560 import specification document phases from web services, in step 2580 purge requirements from data tables and in step 2600 import requirements from web services.

FIG. 19 illustrates the machine transformation of schedules denoted as 2. In step 2620 purge event dates from tables, in step 2640 import event dates from web services, in step 2660 purge event names from data tables and in step 2680 import event names from web services.

FIGS. 20A and 20B illustrate the machine transformation of resources denoted as 3.

In FIG. 20A, in step 2700 purge "facilities" field from data tables, in step 2720 import "facilities" field from web services, in step 2740 purge "hardware" field from data tables and in step 2760 import "hardware" field from web services.

In FIG. 20B, in step 2780 purge "software" field from data tables, in step 2800 import "software" field from web services, in step 2820 purge "software" field from data tables and in step 2840 import "software" field from web services.

FIG. 21 illustrates the machine transformation of personnel and the machine transformation of personnel is denoted as 4.

In FIG. 21, in step 2860 purge "team" field from data tables and in step 2880 import "team" field from web services.

FIG. 22 illustrates the machine transformation, denoted as 5a. In FIG. 22, in step 3000 list requirement parameter, ID, name and text, in step 3020 list event ID, name, event developer and conductor and in step 3040 correlate requirement numbers with event numbers.

FIG. 23 illustrates the machine transformation, denoted as 5b. In FIG. 23, in step 3060 calculate requirement allocations for each event, in step 3080 calculate number of times requirement is allocated to an event and in step 3100 enables format/display matrix.

FIG. 24 illustrates the machine transformation, denoted as 5c. In FIG. 24, in step 3120 enables filter by specification and in step 3140 enables format for export.

FIG. 25A illustrates module 3160 with cells identified as A, B, C, D, E, F, G, H, I and J. 3160 module is a matrix correlating verification events, as illustrated in A, B, C, event EIS developer/conductor (Event Integration Sheet—

EIS), as illustrated in D, E, F with specified requirements and/or compliance attributes as illustrated in G.

FIGS. 25B, 25C, 25D, 25E, 25F, 25G, 25H, 25I, 25J and 25 K illustrate cells A, B, C, D, E, F, G, H, I and J respectively for module 3160.

In FIG. 26A, requirements, schedules, resources and personnel are identified as 2140, 2160, 2180 and 2200 respectively before the machine transformation.

In FIG. 26A, requirements, schedules, resources and personnel are identified as 2260, 2300, 2320 and 2340 respectively after the machine transformation.

In FIG. 26A, action item, issue and verification events are identified as 2220, 2240 and 2280 respectively.

Furthermore, FIG. 26A, incorporates various machine transformations, which are denoted as 1, 2, 3, 4, 6a and 6b.

The machine transformations denoted as 1, 2, 3 and 4 have been illustrated in previous paragraphs from 254 to 262.

In FIG. 26B, risk management, pending changes, dev & waiv, giver/receiver and verification results are denoted by 2360, 2380, 2400, 2420 and 2440 respectively.

FIG. 26C illustrates the machine transformation, denoted as 6a. In FIG. 26C, in step 3180 populate/lab facility resource database, in step 3200 allocate lab/facility resources to events, in step 3220 select needed start and end date and in step 3240 sort labs/facilities.

FIG. 26D illustrates the machine transformation, denoted as 6b. In FIG. 26D, in step 3260 identify labs/facilities where start/end dates overlap, in step 3280 change font for these labs/facilities to red to identify conflict, in step 3300 format display matrix and in step 3320 format for export to MS Excel.

FIG. 26E illustrates a module 3340, which is a consolidated lab facilities resource management and verification event reservation output display. Lab facilities resources with conflicting schedules are highlighted in red text for resolution.

In FIG. 27A, requirements, schedules, resources and personnel are identified as 2140, 2160, 2180 and 2200 respectively before the machine transformation.

In FIG. 27A, requirements, schedules, resources and personnel are identified as 2260, 2300, 2320 and 2340 respectively after the machine transformation.

In FIG. 27A, action item, issue and verification events are identified as 2220, 2240 and 2280 respectively.

Furthermore, FIG. 27A, incorporates various machine transformations, which are denoted as 1, 2, 3, 4, 7a and 7b.

The machine transformations denoted as 1, 2, 3 and 4 have been illustrated in paragraphs from 254 to 262.

In FIG. 27B, risk management, pending changes, dev & waiv, giver/receiver and verification results are denoted by 2360, 2380, 2400, 2420 and 2440 respectively.

FIG. 27C illustrates the machine transformation, denoted as 7a. In FIG. 27C, in step 3360 populate personnel resource database, in step 3380 allocate personnel resources to events, in step 3400 select needed start and end dates and in step 3420 sort personnel.

FIG. 27D illustrates the machine transformation, denoted as 7b. In FIG. 27D, in step 3440 identify personnel where start/end dates overlap, in step 3460 change font for the personnel to red to identify conflict, in step 3480 format display matrix and in step 3500 format for export to MS Excel.

FIG. 27E illustrates a module 3520, which is a consolidated personnel resource management and verification event reservation output display. Personnel resources with conflicting schedules are highlighted in red text for resolutions.

In FIG. 28A, requirements, schedules, resources and personnel are identified as 2140, 2160, 2180 and 2200 respectively before the machine transformation.

In FIG. 28A, requirements, schedules, resources and personnel are identified as 2260, 2300, 2320 and 2340 respectively after the machine transformation.

In FIG. 28A, action item, issue and verification events are identified as 2220, 2240 and 2280 respectively.

Furthermore, FIG. 28A, incorporates various machine transformations, which are denoted as 1, 2, 3, 4, 8a and 8b.

The machine transformations denoted as 1, 2, 3 and 4 have been illustrated in paragraphs from 254 to 262.

In FIG. 28B, risk management, pending changes, dev & waiv, giver/receiver and verification results are denoted by 2360, 2380, 2400, 2420 and 2440 respectively.

FIG. 28C illustrates the machine transformation, denoted as 8a. In FIG. 28C, in step 3540 populate hardware/software resource database, in step 3560 allocate hardware/software resource to events, in step 3580 select needed start and end dates and in step 3600 sort personnel.

FIG. 28D illustrates the machine transformation, denoted as 8b. In FIG. 28D, in step 3620 identify hardware/software where start/end dates overlap, in step 3640 change font for this hardware/software to red to identify conflict, in step 3660 format display matrix and in step 3680 format for export to MS Excel.

FIG. 28E illustrates a module 3700, which is a consolidated hardware and software resource management and verification event reservation output display. Hardware and software resources with conflicting schedules are highlighted in red text for resolutions.

In FIG. 29A, requirements, schedules, resources and personnel are identified as 2140, 2160, 2180 and 2200 respectively before the machine transformation.

In FIG. 29A, requirements, schedules, resources and personnel are identified as 2260, 2300, 2320 and 2340 respectively after the machine transformation.

In FIG. 29A, action item, verification events and verification results are identified as 2220, 2280 and 2440 respectively.

Furthermore, FIG. 29A, incorporates various machine transformations, which are denoted as 1, 2, 3, 4, 9a and 9b.

The machine transformations denoted as 1, 2, 3 and 4 have been illustrated in paragraphs from 254 to 262.

In FIG. 29B, issue, risk management, pending changes, dev & waiv, and giver/receiver are denoted by 2240, 2360, 2380, 2400 and 2420 respectively.

FIG. 29C illustrates machine transformation, denoted as 9a. In FIG. 29C, in step 3720 select event to begin verification process, in step 3740 select requirement to be verified, in step 3760 enter verification reference documentation and in step 3780 check "verified" box as applicable.

FIG. 29D illustrates machine transformation, denoted as 9b. In FIG. 29D, in step 3800 enter explanation to substantiate verification, in step 3820 link compliance artifacts to event, in step 3840 format display event verification report and in step 3860 format for export.

FIG. 29E illustrates a module 3880, which is an example output display of results of verification events by requirement and/or compliance attributes. Actual analysis or test documentation details are hyperlinked.

In FIG. 30A, in step 3900 describes the type of system, in step 3920 if or not an industry standard for system specification is used, in step 3940 to specify how many configurations to be managed and in step 3960 apply categories to the requirements.

In FIG. 30B, in step 3980 specify how many teams in a project, in step 4000 if engineers are to be assigned to the specifications of the project, in step 4020 if requirements are to be imported or to be created within the algorithm and in step 4040 specify events to verify requirements, if known.

In FIG. 30C, in step 4060 assign personnel to verification events, in step 4080 specify requirement-to-event allocations, if known, in step 4100 if resources to execute events to be loaded, and in step 4120 if resources to be assigned to events.

In FIG. 30D, in step 4140, to specify when (time frame) each event to be completed, if known and in step 4160 complete the project set up.

In FIG. 31A, requirements, schedules, resources and personnel are identified as 2140, 2160, 2180 and 2200 respectively before the machine transformation.

In FIG. 31A, requirements, schedules, resources and personnel are identified as 2260, 2300, 2320 and 2340 respectively after the machine transformation.

In FIG. 31A, action item, verification events and verification results are identified as 2220, 2280 and 2440 respectively.

Furthermore, FIG. 31A, incorporates various machine transformations, which are denoted as 1, 2, 3, 4, 10a and 10b.

The machine transformations denoted as 1, 2, 3 and 4 have been illustrated in previous paragraphs from 254 to 262.

In FIG. 31B, issue, risk management, pending changes, dev & waiv, and giver/receiver are denoted by 2240, 2360, 2380, 2400 and 2420 respectively.

In FIG. 31C, in step 4180 create technical performance measure (TPM) list, in step 4200 update TPM status, in step 4220 link TPM measurement artifact and in step 4240 calculate TPM performance margin.

In FIG. 31D, in step 4260 perform TPM analysis and in step 4280 plot TPM performance versus time.

FIG. 31E illustrates module a 4300, which is an example output display of identified system and/or subsystem technical performance measures indicating compliance to technical attributes, tolerances and margins. Such an output display of identified system and/or subsystem technical performance measures is tracked over a specified time span.

In FIG. 32A, in step 4320 enter system configuration(s), in step 4340 enter specification(s) that apply to each configuration, in step 4360 enter requirements for each specification and in step 4380 enter verification methods for each specification requirement.

In FIG. 32B, in step 4400 select specification template to be used, in step 4420 select the configuration and specification to be created and in step 4440 select "export" to create the specification.

In FIG. 33A, requirements, schedules, resources and personnel are identified as 2140, 2160, 2180 and 2200 respectively before the machine transformation.

In FIG. 33A, requirements, schedules, resources and personnel are identified as 2260, 2300, 2320 and 2340 respectively after the machine transformation.

In FIG. 33A, action item, verification events and verification results are identified as 2220, 2280 and 2440 respectively.

Furthermore, FIG. 33A, incorporates various machine transformations, which are denoted as 1, 2, 3, 4, 11a and 11b.

The machine transformations denoted as 1, 2, 3 and 4 have been illustrated in previous paragraphs from 254 to 262.

In FIG. 33B, issue, risk management, pending changes, dev & waiv, and giver/receiver are denoted by 2240, 2360, 2380, 2400 and 2420 respectively.

In FIG. 33C, in step 4460 enter system configuration, in step 4480 enter specification(s) that apply to each configuration, in step 4500 enter requirement for each specification and in step 4520 enter events to verify/assess requirements.

In FIG. 33D, in step 4540 allocate requirements to events, in step 4560 assign personnel to events, in step 4580 assign dates to events and in step 4600 select specification or events for plotting.

FIG. 33E illustrates a module 4620, which is an example output display metric of verification event-baseline plan vs. forecast vs. actual. Such a metric of verification event is tracked over a specified time span.

In the above disclosed specifications "/" has been used to indicate an "or". In the above disclosed specifications "module" has been used to indicate a "software module" or an "algorithm module". An algorithm can generally comprise a step-by-step instruction for calculation, data processing, automated reasoning and automated reasoning with machine transformation. Furthermore, a software module can generally comprise an array of algorithm modules.

Any example in the above disclosed specifications is by way of an example and not by way of any limitation. The above disclosed specifications are the preferred embodiments of the present invention. However, they are not intended to be limiting only to the preferred embodiments of the present invention. Numerous variations and/or modifications are possible within the scope of the present invention. Accordingly, the disclosed preferred embodiments are to be construed as illustrative only. Those who are skilled in the art can make various variations and/or modifications without departing from the scope and spirit of this invention. Therefore, the scope and spirit of this invention shall be defined by the claims and the equivalents of the claims only. The exclusive use of all variations and/or modifications within the scope of the claims is reserved.

We claim:
1. A method of requirement, compliance and resource management algorithm utilizes:
   a computer system, wherein the computer system comprising: a premise computer system, a mobile computer system and a cloud computer system;
   wherein the computer system comprising: one or more hardware processors in communication with a computer readable medium;
   wherein the computer readable medium stores one or more software modules, including instructions for the method of requirement, compliance and resource management algorithm, that are executable by the one or more hardware processors;
   wherein the method of requirement, compliance and resource management algorithm comprises the steps, at least in an ordered sequence:
   (a) a requirement input collection algorithm for collecting a requirement or a requirement input data from a data source or an inputting device;
   (b) a compliance requirement input collection algorithm for collecting compliance or a compliance input data from a data source or an inputting device;
   (c) a requirement analysis algorithm for analyzing the requirement, the requirement input data, the compliance or the compliance input data;
   (d) a specification generation algorithm for generating a specification of the requirement based on the analysis of the requirement, the requirement input data, the compliance or the compliance input data;

(e) a resource allocation algorithm for allocating a resource, wherein the resource consisting of: a hardware resource, a software resource, a human resource and a financial resource;

(f) a verification algorithm for verifying the requirement, the requirement input data, the compliance or the compliance input data;

(g) a fuzzy logic algorithm for accounting for inexactness of the requirement input data or inexactness of interpretation of the requirement input data;

(h) a statistical analysis algorithm for accounting for variability of the requirement input data or variability of interpretation of the requirement input data;

(i) interfacing at least to search for a keyword, utilizing a graphical user interface;

(j) searching for the keyword, utilizing the graphical user interface; and (k) a traceability generation algorithm for tracing the requirement input data or the requirement output data, wherein the method of requirement, compliance and resource management algorithm is coupled with a set of instructions for interfacing with a software program, utilizing an application programming interface.

2. The method of requirement, compliance and resource management algorithm in claim 1, is further coupled with a set of instructions for collecting the requirement or the requirement input data in a question and answer format.

3. The method of requirement, compliance and resource management algorithm in claim 1, further comprising: a set of weighting logic instructions for estimating importance of the requirement input data.

4. The method of requirement, compliance and resource management algorithm in claim 1, further comprising: a neuro-fuzzy logic algorithm to account for inexactness of an output data of the requirement.

5. The method of requirement, compliance and resource management algorithm in claim 1, further comprising: a neuro-fuzzy logic algorithm to account for inexactness of interpretation of an output data of the requirement.

6. The method of requirement, compliance and resource management algorithm in claim 1, further comprising: a Monte Carlo method based algorithm.

7. The method of requirement, compliance and resource management algorithm in claim 1, further comprising: a set of constraint analysis instructions for an assessment of constraints of the requirement.

8. The method of requirement, compliance and resource management algorithm in claim 1, is further coupled with a set of instructions for identifying a risk, when the requirement changes.

9. The method of requirement, compliance and resource management algorithm in claim 1, is further coupled with a set of instructions for collaboration between users.

10. A method of requirement, compliance and resource management algorithm utilizes:

a computer system, wherein the computer system comprising: a premise computer system, a mobile computer system and a cloud computer system;

wherein the computer system comprising: one or more hardware processors in communication with a computer readable medium;

wherein the computer readable medium stores one or more software modules, including instructions for the method of requirement, compliance and resource management algorithm, that are executable by the one or more hardware processors;

wherein the method of requirement, compliance and resource management algorithm comprises the steps, at least in an ordered sequence:

(a) a requirement input collection algorithm for collecting a requirement or a requirement input data from a data source or an inputting device;

(b) a requirement analysis algorithm for analyzing the requirement or the requirement input data;

(c) a specification generation algorithm for generating a specification of the requirement based on the analysis of the requirement or the requirement input data;

(d) a resource allocation algorithm for allocating a resource, wherein the resource consisting of: a hardware resource, a software resource, a human resource and a financial resource;

(e) a verification algorithm for verifying the requirement or the requirement input data;

(f) a fuzzy logic algorithm for accounting for inexactness of the requirement input data or inexactness of interpretation of the requirement input data;

(g) a statistical analysis algorithm for accounting for variability of the requirement input data or variability of interpretation of the requirement input data;

(h) interfacing at least to search for a keyword, utilizing a graphical user interface;

(i) searching for the keyword, utilizing the graphical user interface; and (j) a traceability generation algorithm for tracing the requirement input data or the requirement output data, wherein the method of requirement, compliance and resource management algorithm is coupled with a set of instructions for interfacing with a software program, utilizing an application programming interface.

11. The method of requirement, compliance and resource management algorithm in claim 10, is further coupled with a set of instructions for collecting the requirement or the requirement input in a question and answer format.

12. The method of requirement, compliance and resource management algorithm in claim 10, further comprising: a set of weighting logic instructions for estimating importance of the requirement input data.

13. The method of requirement, compliance and resource management algorithm in claim 10, further comprising: a neuro-fuzzy logic algorithm to account for inexactness of an output data of the requirement.

14. The method of requirement, compliance and resource management algorithm in claim 10, further comprising: a neuro-fuzzy logic algorithm to account for inexactness of interpretation of an output data of the requirement.

15. The method of requirement, compliance and resource management algorithm in claim 10, further comprising: a Monte Carlo method based algorithm.

16. The method of requirement, compliance and resource management algorithm in claim 10, further comprising: a set of constraint analysis instructions for an assessment of constraints of the requirement.

17. The method of requirement, compliance and resource management algorithm in claim 10, is further coupled with a set of instructions for identifying a risk, when the requirement changes.

18. The method of requirement, compliance and resource management algorithm in claim 10, is further coupled with a set of instructions for collaboration between users.

19. A method of requirement, compliance and resource management algorithm utilizes:
- a computer system, wherein the computer system comprising: a premise computer system, a mobile computer system and a cloud computer system;
- wherein the computer system comprising: one or more hardware processors in communication with a computer readable medium;
- wherein the computer readable medium stores one or more software modules, including instructions for the method of requirement, compliance and resource management algorithm, that are executable by the one or more hardware processors;
- wherein the method of requirement, compliance and resource management algorithm comprises the steps, at least in an ordered sequence:
  - (a) a requirement input collection algorithm for collecting a requirement or a requirement input data from a data source or an inputting device;
  - (b) a requirement analysis algorithm for analyzing the requirement or the requirement input data;
  - (c) a specification generation algorithm for generating a requirement of the specification based on the analysis of the requirement or the requirement input data;
  - (d) a resource allocation algorithm for allocating a resource, wherein the resource consisting of: a hardware resource, a software resource, a human resource and a financial resource;
  - (e) a verification algorithm for verifying the requirement or the requirement input data;
  - (f) a neuro-fuzzy logic algorithm for accounting for inexactness of the requirement input data or inexactness of interpretation of the requirement input data;
  - (g) a statistical analysis algorithm for accounting for variability of the requirement input data or variability of interpretation of the requirement input data;
  - (h) interfacing at least to search for a keyword, utilizing a graphical user interface;
  - (i) searching for the keyword, utilizing the graphical user interface; and
  - (j) a traceability generation algorithm for tracing the requirement input data or the requirement output data,
- wherein the method of requirement, compliance and resource management algorithm is coupled with a set of instructions for interfacing with a software program, utilizing an application programming interface.

20. The method of requirement, compliance and resource management algorithm in claim 19, is further coupled with a set of instructions for collecting the requirement or the requirement input in a question and answer format.

21. The method of requirement, compliance and resource management algorithm in claim 19, further comprising: a set of weighting logic instructions for estimating importance of the requirement input data.

22. The method of requirement, compliance and resource management algorithm in claim 19, further comprising: a Monte Carlo method based algorithm.

23. The method of requirement, compliance and resource management algorithm in claim 19, further comprising: a set of constraint analysis instructions for an assessment of constraints of the requirement.

24. The method of requirement, compliance and resource management algorithm in claim 19, is further coupled with a set of instructions for identifying a risk, when the requirement changes.

25. The method of requirement, compliance and resource management algorithm in claim 19, is further coupled with a set of instructions for collaboration between users.

* * * * *